(12) United States Patent
Yasui

(10) Patent No.: US 8,005,605 B2
(45) Date of Patent: Aug. 23, 2011

(54) CONTROL SYSTEM AND METHOD FOR INTERNAL COMBUSTION ENGINE AND ENGINE CONTROL UNIT

(75) Inventor: Yuji Yasui, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 140 days.

(21) Appl. No.: 12/572,227

(22) Filed: Oct. 1, 2009

(65) Prior Publication Data

US 2010/0256894 A1    Oct. 7, 2010

(30) Foreign Application Priority Data

Oct. 14, 2008   (JP) .................................. 2008-265786

(51) Int. Cl.
*F02D 41/26*   (2006.01)
*F02D 41/30*   (2006.01)

(52) U.S. Cl. ........................................ 701/109; 701/110

(58) Field of Classification Search .......... 701/103–105, 701/109–110; 123/436, 672, 676, 299, 300
See application file for complete search history.

(56) References Cited

U.S. PATENT DOCUMENTS 7,669,579 B2 *   3/2010   Lang et al. .................... 123/299
2007/0266700 A1   11/2007   Lang et al.

FOREIGN PATENT DOCUMENTS

| DE | 102006020675 | A1 | 11/2007 |
|---|---|---|---|
| EP | 0800125 | A1 | 10/1997 |
| EP | 1388659 | A2 | 2/2004 |
| EP | 1077319 | A2 | 2/2008 |
| EP | 1887202 | A1 | 2/2008 |
| EP | 1959110 | A1 | 8/2008 |
| JP | 09-273438 | A | 10/1997 |
| JP | 2000-008922 | A | 1/2000 |
| JP | 2000-230417 | A | 8/2000 |
| JP | 2002-047969 | A | 2/2002 |
| JP | 2002-097978 | A | 4/2002 |
| JP | 2005-275489 | A | 10/2005 |
| JP | 2005-299424 | A | 10/2005 |
| JP | 2007-100530 | A | 4/2007 |

* cited by examiner

*Primary Examiner* — Hai H Huynh
(74) *Attorney, Agent, or Firm* — Arent Fox LLP

(57) ABSTRACT

A control system for an internal combustion engine, which is capable of properly controlling both the temperature of an exhaust system and the air-fuel ratio of exhaust gases even when the control range of the air-fuel ratio of a combustion air-fuel mixture is limited, thereby improving the reduction of exhaust emissions. In the control system, a demanded torque-calculating section calculates a demanded torque. A first controller calculates a target equivalent ratio such that a DeNOx catalyst temperature converges to a predetermined target temperature. A second controller calculates three feedback correction values such that an output value from an oxygen concentration sensor converges to a target output value. A third controller calculates a torque fuel injection amount for generating the combustion air-fuel mixture, a post fuel injection amount for supplying unburned fuel to a DeNOx catalyst, etc. based on five values.

42 Claims, 19 Drawing Sheets

F I G. 1
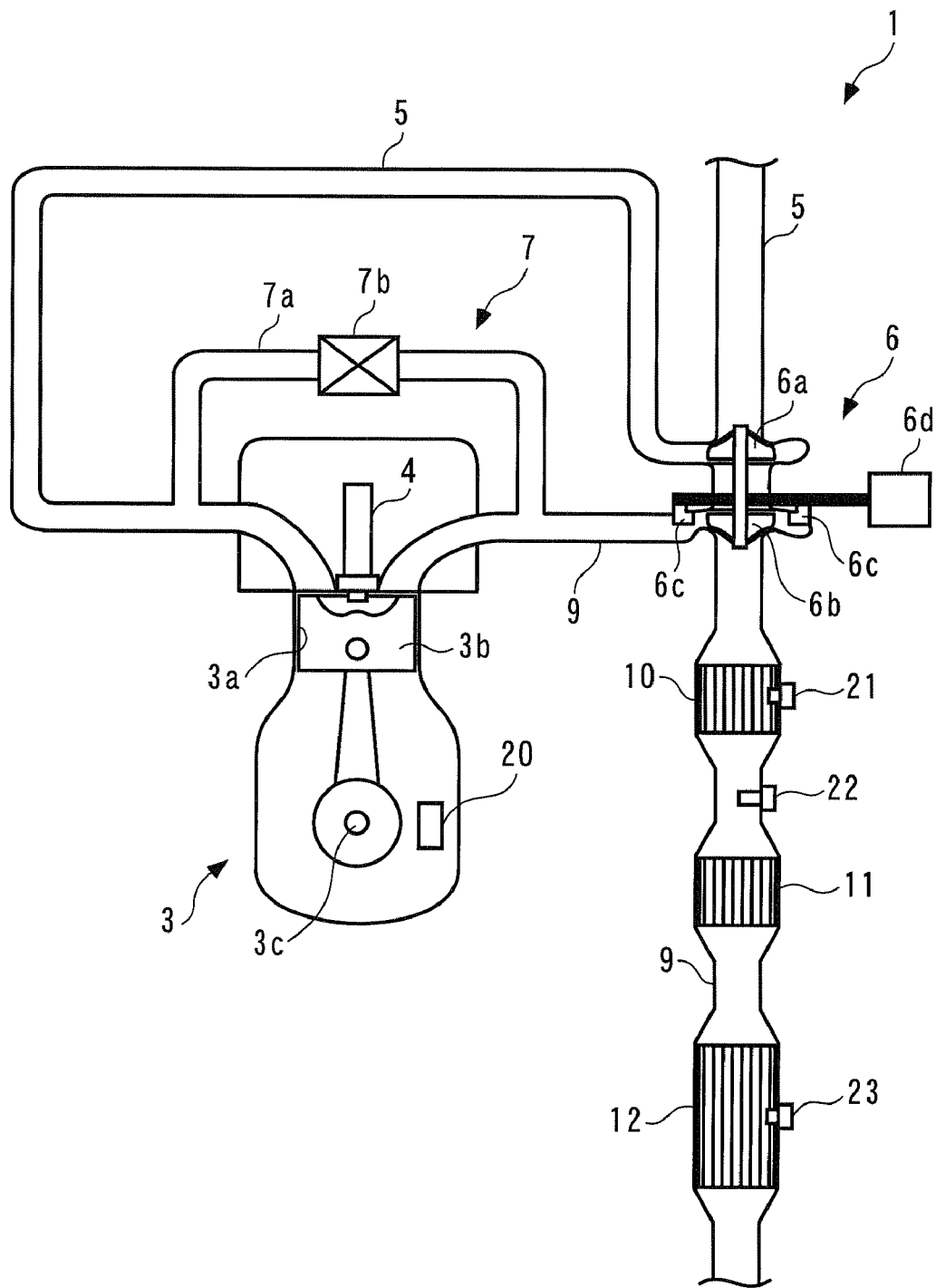

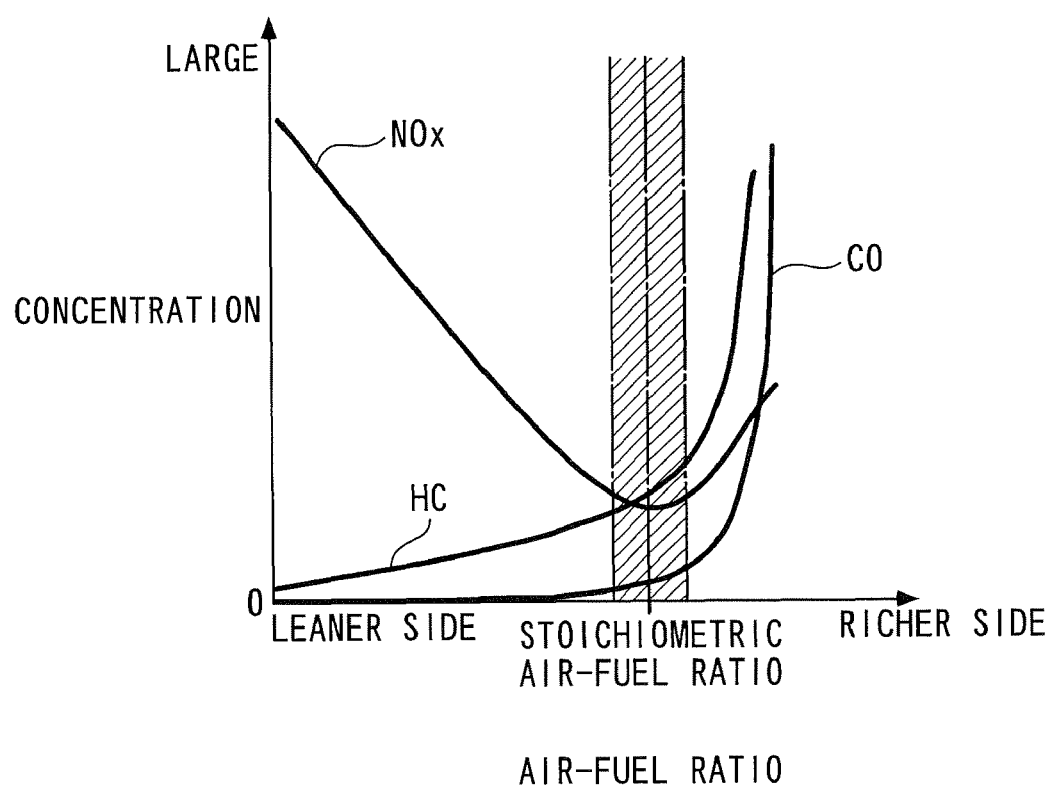
F I G. 1 3

CONTROL SYSTEM AND METHOD FOR INTERNAL COMBUSTION ENGINE AND ENGINE CONTROL UNIT

BACKGROUND OF THE INVENTION

1. Field of the Invention

The present invention relates to a control system and method for an internal combustion engine having an exhaust system provided with an exhaust gas purification device for purifying exhaust gases, and an engine control unit, which control the temperature of the exhaust system and the air-fuel ratio of exhaust gases.

2. Description of the Related Art

Conventionally, as a control system for an internal combustion engine, the present assignee has already proposed a control system disclosed in Japanese Laid-Open Patent Publication (Kokai) No. H09-273438. This control system is for controlling the air-fuel ratio of exhaust gases flowing through an exhaust passage of the engine. A LAF sensor, an upstream catalyst, an oxygen concentration sensor and a downstream catalyst are arranged in the exhaust passage of the engine from upstream to downstream in the mentioned order. The oxygen concentration sensor detects the concentration of oxygen in exhaust gases between the upstream catalyst and the downstream catalyst. The oxygen concentration sensor has characteristics that when the exhaust gases have a richer air-fuel ratio than a stoichiometric air-fuel ratio, an output therefrom takes a high-level voltage value, whereas when the exhaust gases have a leaner air-fuel ratio than the stoichiometric air-fuel ratio, the output therefrom takes a low-level voltage value. Further, when the air-fuel ratio of exhaust gases is close to the stoichiometric air-fuel ratio, the output therefrom takes a predetermined appropriate value q between the high-level and low-level voltage values (see FIG. 2 in Japanese Laid-Open Patent Publication (Kokai) No. H09-273438).

In the control system, by an air-fuel ratio control process, described hereinafter, the output value is controlled such that it converges to the predetermined appropriate value q. First, a basic fuel injection amount Tim and a total correction coefficient KTOTAL for correcting the basic fuel injection amount Tim are calculated based on operating conditions of the engine. Next, a reference air-fuel ratio KBS is calculated according to the rotational speed of the engine and intake pressure. Further, an adaptive sliding mode control process separate from the present process is carried out to calculate a correction value Usl for causing the output value of the oxygen concentration sensor to converge to the predetermined appropriate value q, and by adding the correction value Usl to the reference air-fuel ratio KBS, a target air-fuel ratio KCMD is calculated.

Then, the target air-fuel ratio KCMD is corrected by taking charging efficiency into account, whereby a corrected target air-fuel ratio KCMDM is calculated, and further feedback coefficients #nKLAF and KFB are calculated. Subsequently, the basic fuel injection amount Tim is multiplied by the total correction coefficient KTOTAL, the corrected target air-fuel ratio KCMDM and the feedback coefficients #nKLAF and KFB, whereby a fuel injection amount #nTout for each cylinder is calculated, and further is subjected to a fuel attachment-dependent correction process. After that, a drive signal based on the fuel injection amount #nTout subjected to the fuel attachment-dependent correction process is output to a fuel injection device.

As described above, according to the above air-fuel ratio control system, an actual air-fuel ratio detected by the LAF sensor is controlled such that it converges to the target air-fuel ratio KCMD, whereby the output value of the oxygen concentration sensor is controlled such that it converges to the predetermined appropriate value q. This makes it possible to ensure excellent reduction of exhaust emissions.

According to the above-described conventional control system, when the output value of the oxygen concentration sensor has converged to the predetermined appropriate value q, the air-fuel ratio of exhaust gases is controlled to a value close to the stoichiometric air-fuel ratio, so that when the engine is a gasoline engine, it is possible to hold the output value of the oxygen concentration sensor at the predetermined appropriate value q in the substantially whole operating region, whereby it is possible to ensure excellent reduction of exhaust emissions. However, when the control range of the air-fuel ratio of a combustion air-fuel mixture of the engine is limited, for example, in the case of a diesel engine in which a combustion air-fuel mixture is controlled to a leaner value than the stoichiometric air-fuel ratio, during normal time, it is difficult to continuously control the air-fuel ratio of exhaust gases to a value close to the stoichiometric air-fuel ratio, which can result in increased exhaust emissions. Further, from a technical point of view, to ensure excellent reduction of exhaust emissions, it is necessary to quickly increase the temperature of a catalyst up to an activation temperature range for activating the catalyst, during the start of the engine, and it is necessary to hold the temperature of the catalyst within the activation temperature range, during operation of the engine. However, the above-described control system is not configured from the above technical point of view. Therefore, it sometimes takes a long time for the catalyst temperature to reach the activation temperature range during the start of the engine, and the catalyst temperature sometimes deviates from the activation temperature range during operation of the engine. In such cases, exhaust emissions are increased.

SUMMARY OF THE INVENTION

It is an object of the present invention to provide a control system and method for an internal combustion engine and an engine control unit, which are capable of properly controlling both the temperature of an exhaust system and the air-fuel ratio of exhaust gases, even when the control range of the air-fuel ratio of a combustion air-fuel mixture is limited, thereby making it possible to improve the reduction of exhaust emissions.

To attain the above object, in a first aspect of the present invention, there is provided a control system for an internal combustion engine that has an exhaust system provided with a first exhaust gas purification device for purifying exhaust gases, the engine having fresh air drawn into a cylinder, fuel for combustion in the cylinder being supplied to the cylinder as first fuel, and unburned fuel being supplied to the first exhaust gas purification device as second fuel, the control system controlling an amount of the fresh air, an amount of the first fuel and an amount of the second fuel to thereby control an exhaust system temperature as a temperature of the exhaust system, and an air-fuel ratio of exhaust gases on a downstream side of the first exhaust gas purification device, the control system comprising exhaust system temperature-detecting means for detecting the temperature of the exhaust system, oxygen concentration-detecting means provided at a location downstream of the first exhaust gas purification device, for outputting a signal indicative of a concentration of oxygen in exhaust gases, target output value-setting means for setting a target output value that serves as a target of an output value from the oxygen concentration-detecting means, first fuel amount-calculating means for calculating the amount of the first fuel, target air-fuel ratio parameter-calculating means for calculating a target air-fuel ratio parameter, which serves as a target of an air-fuel ratio parameter indicative of an air-fuel ratio of a combustion air-fuel mixture, such that the target air-fuel ratio parameter becomes leaner than an air-fuel ratio parameter of the combustion air-fuel mixture at which the output value from the oxygen concentration-detecting means becomes the target output value, air-fuel ratio parameter correction value-calculating means for calculating an air-fuel ratio parameter correction value with a first control algorithm including a predetermined feedback control algorithm such that the exhaust system temperature is caused to converge to a predetermined target temperature, corrected target air-fuel ratio parameter-calculating means for calculating a corrected target air-fuel ratio parameter by correcting the target air-fuel ratio parameter by the air-fuel ratio parameter correction value, target fresh air amount-calculating means for calculating a target fresh air amount that serves as a target of the amount of the fresh air, according to the corrected target air-fuel ratio parameter and the amount of the first fuel, target fuel amount-calculating means for calculating a fuel amount required for generating the combustion air-fuel mixture which makes the output value from the oxygen concentration-detecting means become the target output value, as a target fuel amount, according to the target fresh air amount, fuel amount correction value-calculating means for calculating a fuel amount correction value with a second control algorithm including a predetermined feedback control algorithm such that the output value from the oxygen concentration-detecting means is caused to converge to the target output value, and second fuel amount-calculating means for calculating the amount of the second fuel using the target fuel amount, the amount of the first fuel and the fuel amount correction value.

With the configuration of the control system according to the first aspect of the present invention, the target air-fuel ratio parameter is calculated such that the target air-fuel ratio parameter becomes leaner than the air-fuel ratio parameter of the combustion air-fuel mixture at which the output value from the oxygen concentration-detecting means becomes the target output value, and the air-fuel ratio parameter correction value is calculated with the first control algorithm including the predetermined feedback control algorithm such that the exhaust system temperature is caused to converge to the predetermined target temperature. Further, the corrected target air-fuel ratio parameter is calculated by correcting the target air-fuel ratio parameter by the air-fuel ratio parameter correction value. Therefore, the corrected target air-fuel ratio parameter is calculated such that the exhaust system temperature is caused to converge to the predetermined target temperature. Further, the target fresh air amount that serves as the target of the fresh air amount is calculated according to the corrected target air-fuel ratio parameter and the amount of the first fuel. As described above, the target fresh air amount is calculated according to the corrected target air-fuel ratio parameter and the amount of the first fuel, and hence when the first fuel is supplied to the cylinder, the first fuel is burned in the cylinder such that the exhaust system temperature is caused to converge to the predetermined target temperature, and combustion gases generated by the combustion of the first fuel have a leaner air-fuel ratio than that of the combustion gases at which the output value from the oxygen concentration-detecting means becomes the target output value. As a consequence, combustion gases discharged from the cylinder into the exhaust system, that is, exhaust gases have a leaner air-fuel ratio than that of the exhaust gases at which the output value from the oxygen concentration-detecting means becomes the target output value, and by such exhaust gases, the exhaust system temperature can be caused to converge to the predetermined target temperature.

Further, when unburned fuel is supplied to the first exhaust gas purification device as second fuel, the unburned fuel is burned on the first exhaust gas purification device, whereby the exhaust system temperature is raised and combustion gases are generated. As a consequence, the combustion gases generated by the combustion of the first fuel and the combustion of the second fuel on the first exhaust gas purification device are mixed to form exhaust gases on the downstream side of the first exhaust gas purification device, so that the air-fuel ratio of the exhaust gases on the downstream side of the first exhaust gas purification device can be controlled to be richer than the air-fuel ratio of the combustion air-fuel mixture by the combustion gases generated by the combustion of the second fuel.

Furthermore, the amount of the second fuel is calculated using the target fuel amount, the amount of the first fuel and the fuel amount correction value. Here, the target fuel amount is calculated according to the target fresh air amount, and the target fresh air amount is calculated according to the corrected target air-fuel ratio parameter and the amount of the first fuel, and hence the target fuel amount is calculated as a fuel amount which causes the exhaust system temperature to converge to the predetermined target temperature. Further, the fuel amount correction value is calculated with the second control algorithm such that the output value from the oxygen concentration-detecting means is caused to converge to the target output value. Therefore, since the amount of the second fuel is calculated using the target fuel amount, the amount of the first fuel and the fuel amount correction value, calculated as above, it is possible to cause the exhaust system temperature to converge to the predetermined target temperature, by the amount of the second fuel, and at the same time cause the output value from the oxygen concentration-detecting means to converge to the target output value. For the above reasons, even when the control range of the air-fuel ratio of the combustion air-fuel mixture is limited, it is possible to properly control both the temperature of the exhaust system and the air-fuel ratio of exhaust gases, thereby making it possible to improve the reduction of exhaust emissions.

Preferably, the first exhaust gas purification device is configured such that when the output value from the oxygen concentration-detecting means is within a predetermined output range including the target output value, the first exhaust gas purification device having a higher exhaust gas-purifying capability than when the output value from the oxygen concentration-detecting means is not within the predetermined output range, the exhaust system of the engine further including a second exhaust gas purification device separate from the first exhaust gas purification device, for purifying exhaust gases, the predetermined target temperature being set to a value within a predetermined temperature range, and the second exhaust gas purification device being configured such that when the exhaust system temperature is within the predetermined temperature range, the second exhaust gas purification device has a higher exhaust gas-purifying capability than when the exhaust system temperature is not within the predetermined temperature range.

With the configuration of the preferred embodiment, as described hereinabove, since the output value from the oxygen concentration-detecting means is controlled such that it converges to the target output value, the first exhaust gas purification device is capable of ensuring a higher exhaust gas-purifying capability when the output value from the oxygen concentration-detecting means is within the predetermined output range than when the output value is not within the predetermined output range. Further, since the exhaust system temperature is controlled such that it converges to the target temperature within the predetermined temperature range, the second exhaust gas purification device is capable of ensuring a higher exhaust gas-purifying capability than when the exhaust system temperature is not within the predetermined temperature range. From the above, it is possible to improve the reduction of exhaust emissions More preferably, the engine includes a variable inert gas amount mechanism that is capable of changing an amount of inert gases supplied to the cylinder, the control system further comprising load parameter-detecting means for detecting a load parameter indicative of load on the engine, wherein the first fuel amount-calculating means calculates the amount of the first fuel according to the load parameter, the control system further comprising target gas amount-calculating means for calculating a target gas amount, which serves as a target of the amount of the inert gases, according to the amount of the first fuel, gas amount correction value-calculating means for calculating a gas amount correction value with a third control algorithm including a predetermined feedback control algorithm such that the output value from the oxygen concentration-detecting means is caused to converge to the target output value, corrected target gas amount-calculating means for calculating a corrected target gas amount by correcting the target gas amount by the gas amount correction value, and inert gas amount control means for controlling the amount of the inert gases by controlling the variable inert gas amount mechanism according to the corrected target gas amount.

With the configuration of the preferred embodiment, since the amount of the first fuel is calculated according to the load parameter, and the target gas amount is calculated according to the amount of the first fuel, the target gas amount is calculated as a value reflecting the load parameter. On the other hand, the gas amount correction value is calculated with the third control algorithm such that the output value from the oxygen concentration-detecting means is caused to converge to the target output value, and the corrected target gas amount is calculated by correcting the target gas amount by the gas amount correction value, so that the corrected target gas amount is calculated as a value which causes the output value from the oxygen concentration-detecting means to converge to the target output value, while reflecting the load parameter. Therefore, since the inert gas amount is controlled by controlling the variable inert gas amount mechanism according to the corrected target gas amount calculated as above, it is possible to control the inert gas amount such that the output value from the oxygen concentration-detecting means converges to the target output value, while reflecting the load on the engine. This makes it possible to ensure both a proper engine output corresponding to the load on the engine and excellent reduction of exhaust emissions.

Further preferably, in the third control algorithm, a predetermined filtering process is performed on the output value from the oxygen concentration-detecting means, whereby an output filtered value is calculated in a state where high-frequency components of the output value are cut off and at the same time the output filtered value has no phase delay with respect to the output value, and the gas amount correction value is calculated such that the output filtered value converges to the target output value.

With the configuration of the preferred embodiment, the output filtered value is calculated in the state where the high-frequency components of the output value from the oxygen concentration-detecting means are cut off and at the same time the output filtered value has no phase delay with respect to the output value, and the gas amount correction value is calculated with the third control algorithm such that the output filtered value converges to the target output value. As described above, the variable inert gas amount mechanism is controlled according to the corrected target gas amount obtained by correcting the target gas amount by the thus calculated gas amount correction value, and hence even when there exist play, wear and the like of component parts of the variable inert gas amount mechanism, by cutting off the high-frequency components of the output value, it is possible to suppress degradation of control accuracy caused by the above play, wear and the like of the component parts. In addition to this, even when the difference between the output value from the oxygen concentration-detecting means and the target output value increases, it is possible to reduce the difference without causing delayed responses. From the above, it is possible to quickly secure proper engine output corresponding to the load on the engine and at the same time ensure excellent reduction of exhaust emissions.

Even more preferably, in the first control algorithm, when the exhaust system temperature is within the predetermined temperature range, a convergence rate of the exhaust system temperature to the predetermined target temperature is configured to be lower than a convergence rate of the output filtered value to the target output value in the third control algorithm, whereas when the exhaust system temperature is not within the predetermined temperature range, the convergence rate of the exhaust system temperature to the predetermined target temperature is configured to be higher than the convergence rate of the output filtered value to the target output value in the third control algorithm.

With the configuration of the preferred embodiment, it is possible to avoid interaction between the two control processes executed using the two control algorithms, respectively. In addition to this, after the exhaust system temperature has entered the predetermined temperature range, the output filtered value, i.e. the output value is controlled such that it converges to the target output value, and therefore after securing a high exhaust gas-purifying capability of the second exhaust gas purification device, it is possible to secure a high exhaust gas-purifying capability of the first exhaust gas purification device. As describe above, it is possible to ensure excellent reduction of exhaust emissions while avoiding interaction between the two control processes.

Even more preferably, in the third control algorithm, a convergence rate of the output filtered value to the target output value is configured to be lower than a convergence rate of the output value from the oxygen concentration-detecting means to the target output value in the second control algorithm.

With the configuration of the preferred embodiment, it is possible to avoid interaction between the two control processes executed using the two control algorithms, respectively. In addition to this, in the third control algorithm, the convergence rate of the output filtered value to the target output value is set to become lower than the convergence rate of the output value from the oxygen concentration-detecting means to the target output value in the second control algorithm. Therefore, no high responsiveness is required of the variable inert gas amount mechanism, which makes it possible to prolong the service life of the variable inert gas amount mechanism.

More preferably, the engine includes a variable fresh air amount mechanism that is capable of changing the amount of the fresh air, the control system further comprising load parameter-detecting means for detecting a load parameter indicative of load on the engine, wherein the first fuel amount-calculating means calculating the amount of the first fuel according to the load parameter, the control system further comprising fresh air amount correction value-calculating means for calculating a fresh air amount correction value with a fourth control algorithm including a predetermined feedback control algorithm such that the output value from the oxygen concentration-detecting means is caused to converge to the target output value, corrected target fresh air amount-calculating means for calculating a corrected target fresh air amount by correcting the target fresh air amount by the fresh air amount correction value, and fresh air amount control means for controlling the amount of the fresh air by controlling the variable fresh air amount mechanism according to the corrected target fresh air amount.

With the configuration of the preferred embodiment, the amount of the first fuel is calculated according to the load parameter and the target fresh air amount is calculated according to the amount of the first fuel and the corrected target air-fuel ratio parameter, and therefore the target fresh air amount is calculated as a value reflecting the load parameter. On the other hand, the fresh air amount correction value is calculated with the fourth control algorithm such that the output value from the oxygen concentration-detecting means is caused to converge to the target output value, and the corrected target fresh air amount is calculated by correcting the target fresh air amount by the fresh air amount correction value, so that the corrected target fresh air amount is calculated as a value which causes the output value from the oxygen concentration-detecting means to converge to the target output value, while reflecting the load parameter. Therefore, since the fresh air amount is controlled by controlling the variable fresh air amount mechanism according to the corrected target fresh air amount calculated as above, it is possible to control the fresh air amount such that the output value from the oxygen concentration-detecting means converges to the target output value, while reflecting the load on the engine. This makes it possible to secure a proper engine output corresponding to the load on the engine and at the same time ensure excellent reduction of exhaust emissions.

Further preferably, the fresh air amount correction value-calculating means performs a predetermined filtering process on the output value from the oxygen concentration-detecting means, to thereby calculate an output filtered value in a state where high-frequency components of the output value are cut off and at the same time the output filtered value has no phase delay with respect to the output value, and calculates the fresh air amount correction value with the fourth control algorithm such that the output filtered value converges to the target output value.

With the configuration of the preferred embodiment, the output filtered value is calculated in the state where the high-frequency components of the output value from the oxygen concentration-detecting means are cut off and at the same time the output filtered value has no phase delay with respect to the output value, and the fresh air amount correction value is calculated with the fourth control algorithm such that the output filtered value converges to the target output value. As described above, the variable fresh air amount mechanism is controlled according to the corrected target fresh air amount obtained by correcting the target fresh air amount by the thus calculated fresh air amount correction value, and hence even when there exist play, wear and the like of component parts of the variable fresh air amount mechanism, by cutting off the high-frequency components of the output value, it is possible to suppress degradation of control accuracy caused by the above play, wear and the like of the component parts. In addition to this, even when the difference between the output value from the oxygen concentration-detecting means and the target output value increases, it is possible to reduce the difference without causing delayed responses. From the above, it is possible to quickly secure a proper engine output corresponding to the load on the engine and at the same time ensure excellent reduction of exhaust emissions.

Even more preferably, in the first control algorithm, when the exhaust system temperature is within the predetermined temperature range, a convergence rate of the exhaust system temperature to the predetermined target temperature is configured to be lower than a convergence rate of the output filtered value to the target output value in the fourth control algorithm, whereas when the exhaust system temperature is not within the predetermined temperature range, the convergence rate of the exhaust system temperature to the predetermined target temperature is configured to be higher than the convergence rate of the output filtered value to the target output value in the fourth control algorithm.

With the configuration of the preferred embodiment, it is possible to obtain the same advantageous effects as described hereinabove.

Even more preferably, in the fourth control algorithm, a convergence rate of the output filtered value to the target output value is configured to be lower than a convergence rate of the output value from the oxygen concentration-detecting means to the target output value in the second control algorithm.

With the configuration of the preferred embodiment, it is possible to avoid interaction between the two control processes executed using the two control algorithms, respectively. In addition to this, in the fourth control algorithm, the convergence rate of the output filtered value to the target output value is set to become lower than the convergence rate of the output value from the oxygen concentration-detecting means to the target output value in the second control algorithm. Therefore, no high responsiveness is required of the variable fresh air amount mechanism, which makes it possible to improve controllability of the air-fuel ratio in a transient state, improve the reduction of exhaust emissions, and prolong the service life of the variable fresh air amount mechanism. Further, since an actuator of the variable fresh air amount mechanism can be downsized, which makes it possible to reduce the weight of the engine, thereby making it possible to improve fuel economy.

More preferably, in the first control algorithm, when the exhaust system temperature is within the predetermined temperature range, a convergence rate of the exhaust system temperature to the predetermined target temperature is configured to be lower than when the exhaust system temperature is not within the predetermined temperature range.

With the configuration of the preferred embodiment, as mentioned hereinbefore, the second exhaust gas purification device is configured such that when the exhaust system temperature is within the predetermined temperature range, the second exhaust gas purification device has a higher exhaust gas-purifying capability than when the exhaust system temperature is not within the predetermined temperature range. Therefore, even when the convergence rate of the exhaust system temperature to the predetermined target temperature is configured as described above, it is possible to ensure excellent reduction of exhaust emissions. In addition to this, by lowering the convergence rate of the exhaust system temperature to the predetermined target temperature, the absolute value of the air-fuel ratio parameter correction value can be made smaller, which finally makes it possible to make smaller the absolute value of the target fresh air amount, i.e. the target fuel amount. This makes it possible to reduce the amount of the second fuel, thereby making it possible to improve fuel economy by the reduced amount of the second fuel.

More preferably, the second exhaust gas purification device has a characteristic of being activated when the exhaust system temperature is within a predetermined activation temperature range, and when the exhaust system temperature is within a temperature range lower than the predetermined activation temperature range, the target air-fuel ratio parameter-calculating means calculates the target air-fuel ratio parameter as a leaner value than when the exhaust system temperature is within the predetermined activation temperature range.

With the configuration of the preferred embodiment, when the exhaust system temperature is within the predetermined activation temperature range, the target air-fuel ratio parameter is calculated as a richer value than when the exhaust system temperature is within a temperature range lower than the predetermined activation temperature range. This makes it possible to quickly activate the second exhaust gas purification device, thereby making it possible to quickly ensure excellent reduction of exhaust emissions.

More preferably, the exhaust system temperature is a device temperature indicative of a temperature of the second exhaust gas purification device, the second exhaust gas purification device being disposed in the exhaust system at a location downstream of the first exhaust gas purification device, and having a characteristic of being activated when the device temperature is within a predetermined activation temperature range, and when one of a condition in which the device temperature is within a temperature range higher than the predetermined activation temperature range, and a condition in which the device temperature increases at a higher speed than a predetermined speed is satisfied, the target output value-setting means sets the target output value to an output value from the oxygen concentration-detecting means, which is to be output when the concentration of oxygen in exhaust gases is higher, than when the one of the conditions is not satisfied.

With the configuration of the preferred embodiment, when one of the condition in which the device temperature is within a temperature range higher than the predetermined activation temperature range, and the condition in which the device temperature rises at a higher speed than the predetermined speed is satisfied, the target output value is set to the output value from the oxygen concentration-detecting means, which is to be output when the concentration of oxygen in exhaust gases is higher than when the one of the conditions is not satisfied. Therefore, by reducing the concentration of unburned components flowing into the first and second exhaust gas purification devices, it is possible to lower the activation degree of combustion of the unburned components on the two exhaust gas purification devices. This makes it possible to avoid an overheated state of the second exhaust gas purification device and a sudden increase in the temperature thereof, thereby making it possible to suppress the degradation of the second exhaust gas purification device. As a consequence, it is possible to maintain excellent reduction of exhaust emissions for a longer time period.

Preferably, in the second control algorithm, the fuel amount correction value is calculated such that the fuel amount correction value includes a control input term for compensating for a steady-state deviation between the output value from the oxygen concentration-detecting means and the target output value, and the control input term is calculated while performing a predetermined forgetting process thereon.

With the configuration of the preferred embodiment, it is possible to compensate for the steady-state deviation between the output value from the oxygen concentration-detecting means and the target output value. Further, when the difference between the output value from the oxygen concentration-detecting means and the target output value temporarily increases, although the amount of the second fuel is temporarily largely changed, it is possible to quickly reduce the amount of the change in the amount of the second fuel as the computing operation proceeds. As a result, it is possible to prevent the second exhaust gas purification device from being overheated by an excessive increase in the amount of the second fuel, and prevent a state where the output value from the oxygen concentration-detecting means cannot be controlled to the target output value from being caused by the amount of the second fuel becoming equal to 0.

To attain the above object, in a second aspect of the present invention, there is provided a method of controlling an internal combustion engine that has an exhaust system provided with a first exhaust gas purification device for purifying exhaust gases, the engine having fresh air drawn into a cylinder, fuel for combustion in the cylinder being supplied to the cylinder as first fuel, and unburned fuel being supplied to the first exhaust gas purification device as second fuel, the method controlling an amount of the fresh air, an amount of the first fuel and an amount of the second fuel to thereby control an exhaust system temperature as a temperature of the exhaust system, and an air-fuel ratio of exhaust gases on a downstream side of the first exhaust gas purification device, the method comprising an exhaust system temperature-detecting step of detecting the temperature of the exhaust system, an oxygen concentration-detecting step of detecting a concentration of oxygen in exhaust gases provided at a location downstream of the first exhaust gas purification device, and outputting a signal indicative of the detected concentration of oxygen, a target output value-setting step of setting a target output value that serves as a target of an output value output in the oxygen concentration-detecting step, a first fuel amount-calculating step of calculating the amount of the first fuel, a target air-fuel ratio parameter-calculating step of calculating a target air-fuel ratio parameter, which serves as a target of an air-fuel ratio parameter indicative of an air-fuel ratio of a combustion air-fuel mixture, such that the target air-fuel ratio parameter becomes leaner than an air-fuel ratio parameter of the combustion air-fuel mixture at which the output value output in the oxygen concentration-detecting step becomes the target output value, an air-fuel ratio parameter correction value-calculating step of calculating an air-fuel ratio parameter correction value with a first control algorithm including a predetermined feedback control algorithm such that the exhaust system temperature is caused to converge to a predetermined target temperature, a corrected target air-fuel ratio parameter-calculating step of calculating a corrected target air-fuel ratio parameter by correcting the target air-fuel ratio parameter by the air-fuel ratio parameter correction value, a target fresh air amount-calculating step of calculating a target fresh air amount that serves as a target of the amount of the fresh air, according to the corrected target air-fuel ratio parameter and the amount of the first fuel, a target fuel amount-calculating step of calculating a fuel amount required for generating the combustion air-fuel mixture which makes the output value output in the oxygen concentration-detecting step become the target output value, as a target fuel amount, according to the target fresh air amount, a fuel amount correction value-calculating step of calculating a fuel amount correction value with a second control algorithm including a predetermined feedback control algorithm such that the output value output in the oxygen concentration-detecting step is caused to converge to the target output value, and a second fuel amount-calculating step of calculating the amount of the second fuel using the target fuel amount, the amount of the first fuel and the fuel amount correction value.

With the configuration of the method according to the second aspect of the present invention, it is possible to obtain the same advantageous effects as provided by the first aspect of the present invention.

Preferably, the first exhaust gas purification device is configured such that when the output value output in the oxygen concentration-detecting step is within a predetermined output range including the target output value, the first exhaust gas purification device has a higher exhaust gas-purifying capability than when the output value output in the oxygen concentration-detecting step is not within the predetermined output range, the exhaust system of the engine further including a second exhaust gas purification device separate from the first exhaust gas purification device, for purifying exhaust gases, the predetermined target temperature being set to a value within a predetermined temperature range, the second exhaust gas purification device being configured such that when the exhaust system temperature is within the predetermined temperature range, the second exhaust gas purification device has a higher exhaust gas-purifying capability than when the exhaust system temperature is not within the predetermined temperature range.

More preferably, the engine includes a variable inert gas amount mechanism that is capable of changing an amount of inert gases supplied to the cylinder, the method further comprising a load parameter-detecting step of detecting a load parameter indicative of load on the engine, the first fuel amount-calculating step including calculating the amount of the first fuel according to the load parameter, the method further comprising a target gas amount-calculating step of calculating a target gas amount, which serves as a target of the amount of the inert gases, according to the amount of the first fuel, a gas amount correction value-calculating step of calculating a gas amount correction value with a third control algorithm including a predetermined feedback control algorithm such that the output value output in the oxygen concentration-detecting step is caused to converge to the target output value, a corrected target gas amount-calculating step of calculating a corrected target gas amount by correcting the target gas amount by the gas amount correction value, and an inert gas amount control step of controlling the amount of the inert gases by controlling the variable inert gas amount mechanism according to the corrected target gas amount.

Further preferably, in the third control algorithm, a predetermined filtering process is performed on the output value output in the oxygen concentration-detecting step, whereby an output filtered value is calculated in a state where high-frequency components of the output value are cut off and at the same time the output filtered value has no phase delay with respect to the output value, and the gas amount correction value is calculated such that the output filtered value converges to the target output value.

Even more preferably, in the first control algorithm, when the exhaust system temperature is within the predetermined temperature range, a convergence rate of the exhaust system temperature to the predetermined target temperature is configured to be lower than a convergence rate of the output filtered value to the target output value in the third control algorithm, whereas when the exhaust system temperature is not within the predetermined temperature range, the convergence rate of the exhaust system temperature to the predetermined target temperature is configured to be higher than the convergence rate of the output filtered value to the target output value in the third control algorithm.

Even more preferably, in the third control algorithm, a convergence rate of the output filtered value to the target output value is configured to be lower than a convergence rate of the output value output in the oxygen concentration-detecting step to the target output value in the second control algorithm.

More preferably, the engine includes a variable fresh air amount mechanism that is capable of changing the amount of the fresh air, the method further comprising a load parameter-detecting step of detecting a load parameter indicative of load on the engine, the first fuel amount-calculating step including calculating the amount of the first fuel according to the load parameter, the method further comprising a fresh air amount correction value-calculating step of calculating a fresh air amount correction value with a fourth control algorithm including a predetermined feedback control algorithm such that the output value output in the oxygen concentration-detecting step is caused to converge to the target output value, a corrected target fresh air amount-calculating step of calculating a corrected target fresh air amount by correcting the target fresh air amount by the fresh air amount correction value More preferably, and a fresh air amount control step of controlling the amount of the fresh air by controlling the variable fresh air amount mechanism according to the corrected target fresh air amount.

Further preferably, the fresh air amount correction value-calculating step includes performing a predetermined filtering process on the output value output in the oxygen concentration-detecting step, to thereby calculate an output filtered value in a state where high-frequency components of the output value are cut off and at the same time the output filtered value has no phase delay with respect to the output value, and calculating the fresh air amount correction value with the fourth control algorithm such that the output filtered value converges to the target output value.

Even more preferably, in the first control algorithm, when the exhaust system temperature is within the predetermined temperature range, a convergence rate of the exhaust system temperature to the predetermined target temperature is configured to be lower than a convergence rate of the output filtered value to the target output value in the fourth control algorithm, whereas when the exhaust system temperature is not within the predetermined temperature range, the convergence rate of the exhaust system temperature to the predetermined target temperature is configured to be higher than the convergence rate of the output filtered value to the target output value in the fourth control algorithm.

Even more preferably, in the fourth control algorithm, a convergence rate of the output filtered value to the target output value is configured to be lower than a convergence rate of the output value output in the oxygen concentration-detecting step to the target output value in the second control algorithm.

More preferably, in the first control algorithm, when the exhaust system temperature is within the predetermined temperature range, a convergence rate of the exhaust system temperature to the predetermined target temperature is configured to be lower than when the exhaust system temperature is not within the predetermined temperature range.

More preferably, the second exhaust gas purification device has a characteristic of being activated when the exhaust system temperature is within a predetermined activation temperature range, and when the exhaust system temperature is within a temperature range lower than the predetermined activation temperature range, the target air-fuel ratio parameter-calculating step includes calculating the target air-fuel ratio parameter as a leaner value than when the exhaust system temperature is within the predetermined activation temperature range.

More preferably, the exhaust system temperature is a device temperature indicative of a temperature of the second exhaust gas purification device, the second exhaust gas purification device being disposed in the exhaust system at a location downstream of the first exhaust gas purification device, and having a characteristic of being activated when the device temperature is within a predetermined activation temperature range, and when one of a condition in which the device temperature is within a temperature range higher than the predetermined activation temperature range, and a condition in which the device temperature increases at a higher speed than a predetermined speed is satisfied, the target output value-setting step sets the target output value to an output value output in the oxygen concentration-detecting step, which is to be output when the concentration of oxygen in exhaust gases is higher, than when the one of the conditions is not satisfied.

Preferably, in the second control algorithm, the fuel amount correction value is calculated such that the fuel amount correction value includes a control input term for compensating for a steady-state deviation between the output value output in the oxygen concentration-detecting step and the target output value, and the control input term is calculated while performing a predetermined forgetting process thereon.

With the configurations of these preferred embodiments, it is possible to obtain the same advantageous effects as provided by the respective corresponding preferred embodiments of the first aspect of the present invention.

To attain the above object, in a third aspect of the present invention, there is provided an engine control unit including a control program for causing a computer to execute a method of controlling an internal combustion engine that has an exhaust system provided with a first exhaust gas purification device for purifying exhaust gases, the engine having fresh air drawn into a cylinder, fuel for combustion in the cylinder being supplied to the cylinder as first fuel, and unburned fuel being supplied to the first exhaust gas purification device as second fuel, the method controlling an amount of the fresh air, an amount of the first fuel and an amount of the second fuel to thereby control an exhaust system temperature as a temperature of the exhaust system, and an air-fuel ratio of exhaust gases on a downstream side of the first exhaust gas purification device, the method comprising an exhaust system temperature-detecting step of detecting the temperature of the exhaust system, an oxygen concentration-detecting step of detecting a concentration of oxygen in exhaust gases provided at a location downstream of the first exhaust gas purification device, and outputting a signal indicative of the detected concentration of oxygen, a target output value-setting step of setting a target output value that serves as a target of an output value output in the oxygen concentration-detecting step, a first fuel amount-calculating step of calculating the amount of the first fuel, a target air-fuel ratio parameter-calculating step of calculating a target air-fuel ratio parameter, which serves as a target of an air-fuel ratio parameter indicative of an air-fuel ratio of a combustion air-fuel mixture, such that the target air-fuel ratio parameter becomes leaner than an air-fuel ratio parameter of the combustion air-fuel mixture at which the output value output in the oxygen concentration-detecting step becomes the target output value, an air-fuel ratio parameter correction value-calculating step of calculating an air-fuel ratio parameter correction value with a first control algorithm including a predetermined feedback control algorithm such that the exhaust system temperature is caused to converge to a predetermined target temperature, a corrected target air-fuel ratio parameter-calculating step of calculating a corrected target air-fuel ratio parameter by correcting the target air-fuel ratio parameter by the air-fuel ratio parameter correction value, a target fresh air amount-calculating step of calculating a target fresh air amount that serves as a target of the amount of the fresh air, according to the corrected target air-fuel ratio parameter and the amount of the first fuel, a target fuel amount-calculating step of calculating a fuel amount required for generating the combustion air-fuel mixture which makes the output value output in the oxygen concentration-detecting step become the target output value, as a target fuel amount, according to the target fresh air amount, a fuel amount correction value-calculating step of calculating a fuel amount correction value with a second control algorithm including a predetermined feedback control algorithm such that the output value output in the oxygen concentration-detecting step is caused to converge to the target output value, and a second fuel amount-calculating step of calculating the amount of the second fuel using the target fuel amount, the amount of the first fuel and the fuel amount correction value.

With the configuration of the engine control unit according to the third aspect of the present invention, it is possible to obtain the same advantageous effects as provided by the first aspect of the present invention.

Preferably, the first exhaust gas purification device is configured such that when the output value output in the oxygen concentration-detecting step is within a predetermined output range including the target output value, the first exhaust gas purification device has a higher exhaust gas-purifying capability than when the output value output in the oxygen concentration-detecting step is not within the predetermined output range, the exhaust system of the engine further including a second exhaust gas purification device separate from the first exhaust gas purification device, for purifying exhaust gases, the predetermined target temperature being set to a value within a predetermined temperature range, and the second exhaust gas purification device being configured such that when the exhaust system temperature is within the predetermined temperature range, the second exhaust gas purification device has a higher exhaust gas-purifying capability than when the exhaust system temperature is not within the predetermined temperature range.

More preferably, the engine includes a variable inert gas amount mechanism that is capable of changing an amount of inert gases supplied to the cylinder, the method further comprising a load parameter-detecting step of detecting a load parameter indicative of load on the engine, the first fuel amount-calculating step including calculating the amount of the first fuel according to the load parameter, the method further comprising a target gas amount-calculating step of calculating a target gas amount, which serves as a target of the amount of the inert gases, according to the amount of the first fuel, a gas amount correction value-calculating step of calculating a gas amount correction value with a third control algorithm including a predetermined feedback control algorithm such that the output value output in the oxygen concentration-detecting step is caused to converge to the target output value, a corrected target gas amount-calculating step of calculating a corrected target gas amount by correcting the target gas amount by the gas amount correction value, and an inert gas amount control step of controlling the amount of the inert gases by controlling the variable inert gas amount mechanism according to the corrected target gas amount.

Further preferably, in the third control algorithm, a predetermined filtering process is performed on the output value output in the oxygen concentration-detecting step, whereby an output filtered value is calculated in a state where high-frequency components of the output value are cut off and at the same time the output filtered value has no phase delay with respect to the output value, and the gas amount correction value is calculated such that the output filtered value converges to the target output value.

Even more preferably, in the first control algorithm, when the exhaust system temperature is within the predetermined temperature range, a convergence rate of the exhaust system temperature to the predetermined target temperature is configured to be lower than a convergence rate of the output filtered value to the target output value in the third control algorithm, whereas when the exhaust system temperature is not within the predetermined temperature range, the convergence rate of the exhaust system temperature to the predetermined target temperature is configured to be higher than the convergence rate of the output filtered value to the target output value in the third control algorithm.

Even more preferably, in the third control algorithm, a convergence rate of the output filtered value to the target output value is configured to be lower than a convergence rate of the output value output in the oxygen concentration-detecting step to the target output value in the second control algorithm.

More preferably, the engine includes a variable fresh air amount mechanism that is capable of changing the amount of the fresh air, the method further comprising a load parameter-detecting step of detecting a load parameter indicative of load on the engine, the first fuel amount-calculating step includes calculating the amount of the first fuel according to the load parameter, the method further comprising a fresh air amount correction value-calculating step of calculating a fresh air amount correction value with a fourth control algorithm including a predetermined feedback control algorithm such that the output value output in the oxygen concentration-detecting step is caused to converge to the target output value, a corrected target fresh air amount-calculating step of calculating a corrected target fresh air amount by correcting the target fresh air amount by the fresh air amount correction value, and a fresh air amount control step of controlling the amount of the fresh air by controlling the variable fresh air amount mechanism according to the corrected target fresh air amount.

Further preferably, the fresh air amount correction value-calculating step includes performing a predetermined filtering process on the output value output in the oxygen concentration-detecting step, to thereby calculate an output filtered value in a state where high-frequency components of the output value are cut off and at the same time the output filtered value has no phase delay with respect to the output value, and calculating the fresh air amount correction value with the fourth control algorithm such that the output filtered value converges to the target output value.

Even more preferably, in the first control algorithm, when the exhaust system temperature is within the predetermined temperature range, a convergence rate of the exhaust system temperature to the predetermined target temperature is configured to be lower than a convergence rate of the output filtered value to the target output value in the fourth control algorithm, whereas when the exhaust system temperature is not within the predetermined temperature range, the convergence rate of the exhaust system temperature to the predetermined target temperature is configured to be higher than the convergence rate of the output filtered value to the target output value in the fourth control algorithm.

Even more preferably, in the fourth control algorithm, a convergence rate of the output filtered value to the target output value is configured to be lower than a convergence rate of the output value output in the oxygen concentration-detecting step to the target output value in the second control algorithm.

More preferably, in the first control algorithm, when the exhaust system temperature is within the predetermined temperature range, a convergence rate of the exhaust system temperature to the predetermined target temperature is configured to be lower than when the exhaust system temperature is not within the predetermined temperature range.

More preferably, the second exhaust gas purification device has a characteristic of being activated when the exhaust system temperature is within a predetermined activation temperature range, and when the exhaust system temperature is within a temperature range lower than the predetermined activation temperature range, the target air-fuel ratio parameter-calculating step includes calculating the target air-fuel ratio parameter as a leaner value than when the exhaust system temperature is within the predetermined activation temperature range.

More preferably, the exhaust system temperature is a device temperature indicative of a temperature of the second exhaust gas purification device, the second exhaust gas purification device being disposed in the exhaust system at a location downstream of the first exhaust gas purification device, and having a characteristic of being activated when the device temperature is within a predetermined activation temperature range, and when one of a condition in which the device temperature is within a temperature range higher than the predetermined activation temperature range, and a condition in which the device temperature increases at a higher speed than a predetermined speed is satisfied, the target output value-setting step sets the target output value to an output value output in the oxygen concentration-detecting step, which is to be output when the concentration of oxygen in exhaust gases is higher, than when the one of the conditions is not satisfied.

Preferably, in the second control algorithm, the fuel amount correction value is calculated such that the fuel amount correction value includes a control input term for compensating for a steady-state deviation between the output value output in the oxygen concentration-detecting step and the target output value, and the control input term is calculated while performing a predetermined forgetting process thereon.

With the configurations of these preferred embodiments, it is possible to obtain the same advantageous effects as provided by the respective corresponding preferred embodiments of the first aspect of the present invention.

The above and other objects, features, and advantages of the present invention will become more apparent from the following detailed description taken in conjunction with the accompanying drawings.

BRIEF DESCRIPTION OF THE DRAWINGS

FIG. 1 is a schematic diagram of a control system according to an embodiment of the present invention, and an internal combustion engine to which is applied the control system;

FIG. 13 is a view of an example of results of measurement of the relationship between an air-fuel ratio of exhaust gases on the downstream side of a three-way catalyst and the concentration of unburned components (NOx, CO and HC) of the exhaust gases;

DETAILED DESCRIPTION OF PREFERRED EMBODIMENTS

Figure 2:
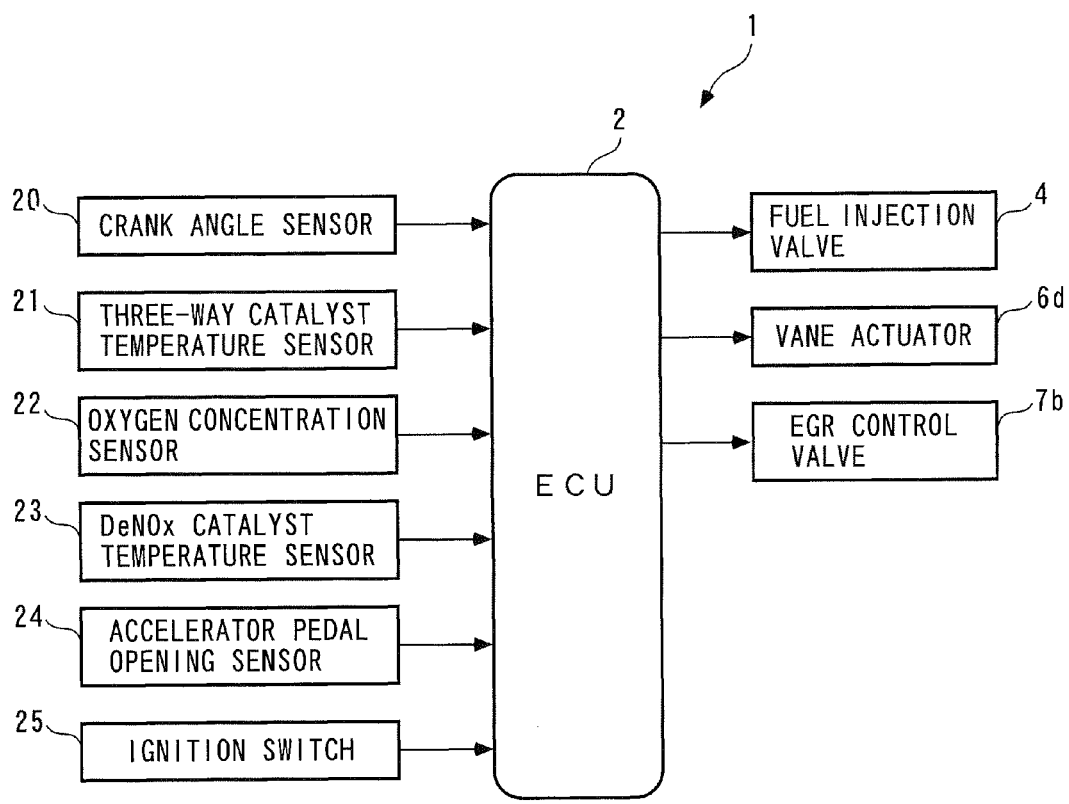
FIG. 2 is a schematic block diagram showing the electrical configuration of the control system.

Hereafter, a control system for an internal combustion engine, according to an embodiment of the present invention will be described with reference to the drawings. FIG. 1 shows the control system 1 according to the present embodiment, and the internal combustion engine (hereinafter referred to as "the engine") 3 to which is applied the control system. Referring to FIG. 2, the control system 1 includes an ECU 2. As described hereinafter, the ECU 2 carries out various control processes, such as an air-fuel ratio control process, depending on operating conditions of the engine 3.

The engine 3 is an in-line four-cylinder diesel engine installed on a vehicle, not shown, and includes four pairs of cylinders 3a and pistons 3b (only one pair of which is shown), a crankshaft 3c, and so forth. The engine 3 is provided with a crank angle sensor 20.

The crank angle sensor 20 is comprised of a magnet rotor and an MRE (magnetic resistance element) pickup, and delivers a CRK signal, which is a pulse signal, to the ECU 2 in accordance with rotation of the crankshaft 3c. Each pulse of the CRK signal is delivered whenever the crankshaft 3c rotates through a predetermined angle (e.g. 30°). The ECU 2 calculates the rotational speed NE of the engine 3 (hereinafter referred to as "the engine speed NE") based on the CRK signal. In the present embodiment, the crank angle sensor 20 corresponds to load parameter-detecting means, and the engine speed NE corresponds to a load parameter.

Further, the engine 3 includes fuel injection valves 4 (only one of which is shown) provided for the respective cylinders 3a. The fuel injection valves 4 are all electrically connected to the ECU 2. As described hereinafter, the valve-opening time period and the valve-opening timing of each fuel injection valve 4 are controlled by the ECU 2, whereby a fuel injection amount and fuel injection timing of fuel injected from the fuel injection valve 4 are controlled.

A turbocharger 6 (variable fresh air amount mechanism) is provided in an intake passage 5 of the engine 3. The turbocharger 6 is comprised of a compressor blade 6a disposed in an intermediate portion of the intake passage 5, a turbine blade 6b disposed in an intermediate portion of an exhaust passage 9 (exhaust system), for rotating in unison with the compressor blade 6a, a plurality of variable vanes 6c (only two of which are shown), and a vane actuator 6d for actuating the variable vanes 6c.

In the turbocharger 6, as the turbine blade 6b is driven for rotation by exhaust gases flowing through the exhaust passage 9, the compressor blade 6a integrally formed with the turbine blade 6b rotates simultaneously with the rotation of the turbine blade 6b, whereby fresh air within the intake passage 5 is pressurized. In short, supercharging is carried out.

Further, the variable vanes 6c change boost pressure generated by the turbocharger 6, and are pivotally mounted on a wall of a turbine blade-accommodating portion of a housing. The variable vanes 6c are mechanically connected to the vane actuator 6d connected to the ECU 2. The ECU 2 changes the degree of opening of the variable vanes 6c via the vane actuator 6d to change the amount of exhaust gases blown to the turbine blade 6b, whereby the rotational speed of the turbine blade 6b, that is, the rotational speed of the compressor blade 6a, is changed to thereby control the boost pressure.

Further, the engine 3 includes an exhaust gas recirculation mechanism 7 (variable inert gas amount mechanism). The exhaust gas recirculation mechanism 7 recirculates part of exhaust gases flowing through the exhaust passage 9 toward the intake passage 5, and is comprised of an EGR passage 7a connected between the intake passage 5 and the exhaust passage 9, and an EGR control valve 7b for opening and closing the EGR passage 7a. The EGR passage 7a has one end opening in a portion of the exhaust passage 9 upstream of the turbine blade 6b, and the other end opening in a portion of the intake passage 5 downstream of the compressor blade 6a.

The EGR control valve 7b is implemented by a linear solenoid valve the valve lift of which is linearly changed between a maximum value and a minimum value thereof, and is electrically connected to the ECU 2. The ECU 2 changes the degree of opening of the EGR passage 7a via the EGR control valve 7b to thereby control the amount of exhaust recirculation. In the following description, only inert gases in recirculated exhaust gases are referred to as "the Inert-EGR", and the amount of the Inert-EGR is referred to as "the Inert-EGR amount".

On the other hand, a three-way catalyst 10, a DPF (Diesel Particulate Filter) 11 and a DeNOx catalyst 12 are provided in the exhaust passage 9 at respective locations downstream of the turbine blade 6b thereof from upstream to downstream in the mentioned order. The three-way catalyst 10 (first exhaust gas purification device) is activated in a region where the temperature thereof is higher than a predetermined activation temperature Ttwc_act, and purifies harmful unburned components of exhaust gases.

Further, the DPF 11 traps and eliminates particles in exhaust gases. Further, when exhaust gases under an oxidizing atmosphere, i.e. exhaust gases in which the concentration of oxygen is higher than the concentration of oxygen in exhaust gases corresponding to the stoichiometric air-fuel ratio flow into the DeNOx catalyst 12 (second exhaust gas purification device), the DeNOx catalyst 12 traps NOx in the exhaust gases, and when exhaust gases under a reducing atmosphere flow into the DeNOx catalyst 12, the DeNOx catalyst 12 reduces the trapped NOx, to thereby purify the exhaust gases. The DeNOx catalyst 12 has a characteristic that it is activated in a region where the temperature thereof is higher than a predetermined activation temperature Tdnx_act.

Furthermore, a three-way catalyst temperature sensor 21, an oxygen concentration sensor 22 and a DeNOx catalyst temperature sensor 23 are arranged in the exhaust passage 9 from upstream to downstream in the mentioned order. The three-way catalyst temperature sensor 21 detects the temperature Ttwc of the three-way catalyst 10 (hereinafter referred to as "the three-way catalyst temperature Ttwc"), and delivers a signal indicative of the sensed three-way catalyst temperature Ttwc to the ECU 2.

Further, the oxygen concentration sensor 22 (oxygen concentration-detecting means) is disposed between the three-way catalyst 10 and the DeNOx catalyst 12 in the exhaust passage 9, and detects the concentration of oxygen in exhaust gases having passed through the three-way catalyst 10, to deliver a signal indicative of the sensed oxygen concentration to the ECU 2. The sensor output value VO2 of the oxygen concentration sensor 22 (hereinafter referred to as "the sensor output value VO2") takes a high-level voltage value when an air-fuel ratio of exhaust gases is richer than the stoichiometric air-fuel ratio, whereas when an air-fuel ratio of exhaust gases is leaner than the stoichiometric air-fuel ratio, the sensor output value VO2 takes a low-level voltage value. When an air-fuel ratio of exhaust gases is equal to the stoichiometric air-fuel ratio, the sensor output value VO2 takes a voltage value (stoichiometric control value VO2_ST, referred to hereinafter) between the high-level voltage value and the low-level voltage value.

Furthermore, the DeNOx catalyst temperature sensor 23 detects the temperature Tdnx of the DeNOx catalyst 12 (hereinafter referred to as "the DeNOx catalyst temperature Tdnx"), and delivers a signal indicative of the sensed DeNOx catalyst temperature Tdnx to the ECU 2. The ECU 2 calculates the DeNOx catalyst temperature Tdnx based on the signal from the DeNOx catalyst temperature sensor 23. In the present embodiment, the DeNOx catalyst temperature sensor 23 corresponds to exhaust system temperature-detecting means, and the DeNOx catalyst temperature Tdnx corresponds to the temperature of an exhaust system and the temperature of the control system 1.

On the other hand, as shown in FIG. 2, an accelerator pedal opening sensor 24 and an ignition switch 25 (hereinafter referred to as "the IG·SW 25") are connected to the ECU 2. The accelerator pedal opening sensor 24 detects a stepped-on amount AP of an accelerator pedal, not shown, of the vehicle (hereinafter referred to as "the accelerator pedal opening AP"), and delivers a signal indicative of the detected accelerator pedal opening AP to the ECU 2. In the present embodiment, the accelerator pedal opening sensor 24 corresponds to load parameter-detecting means, and the accelerator pedal opening AP corresponds to a load parameter. Further, the IG·SW 25 is turned on or off by operation of an ignition key, not shown, and delivers a signal indicative of the ON/OFF state thereof to the ECU 2.

The ECU 2 is implemented by a microcomputer comprised of a CPU, a RAM, a ROM and an I/O interface (none of which are specifically shown). The ECU 2 determines operating conditions of the engine 3 in response to the signals from the aforementioned sensors 20 to 24, and the output signal from the IG·SW 25, etc. and based on the determined operating conditions of the engine, performs control processes including an air-fuel ratio control process, as described hereinafter.

In the present embodiment, the ECU 2 corresponds to target output value-setting means, first fuel amount-calculating means, target air-fuel ratio parameter-calculating means, air-fuel ratio parameter correction value-calculating means, corrected target air-fuel ratio parameter-calculating means, target fresh air amount-calculating means, target fuel amount-calculating means, fuel amount correction value-calculating means, second fuel amount-calculating means, load parameter-detecting means, target gas amount-calculating means, gas amount correction value-calculating means, corrected target gas amount-calculating means, inert gas amount control means, fresh air amount correction value-calculating means, corrected target fresh air amount-calculating means and fresh air amount control means.

Figure 3:
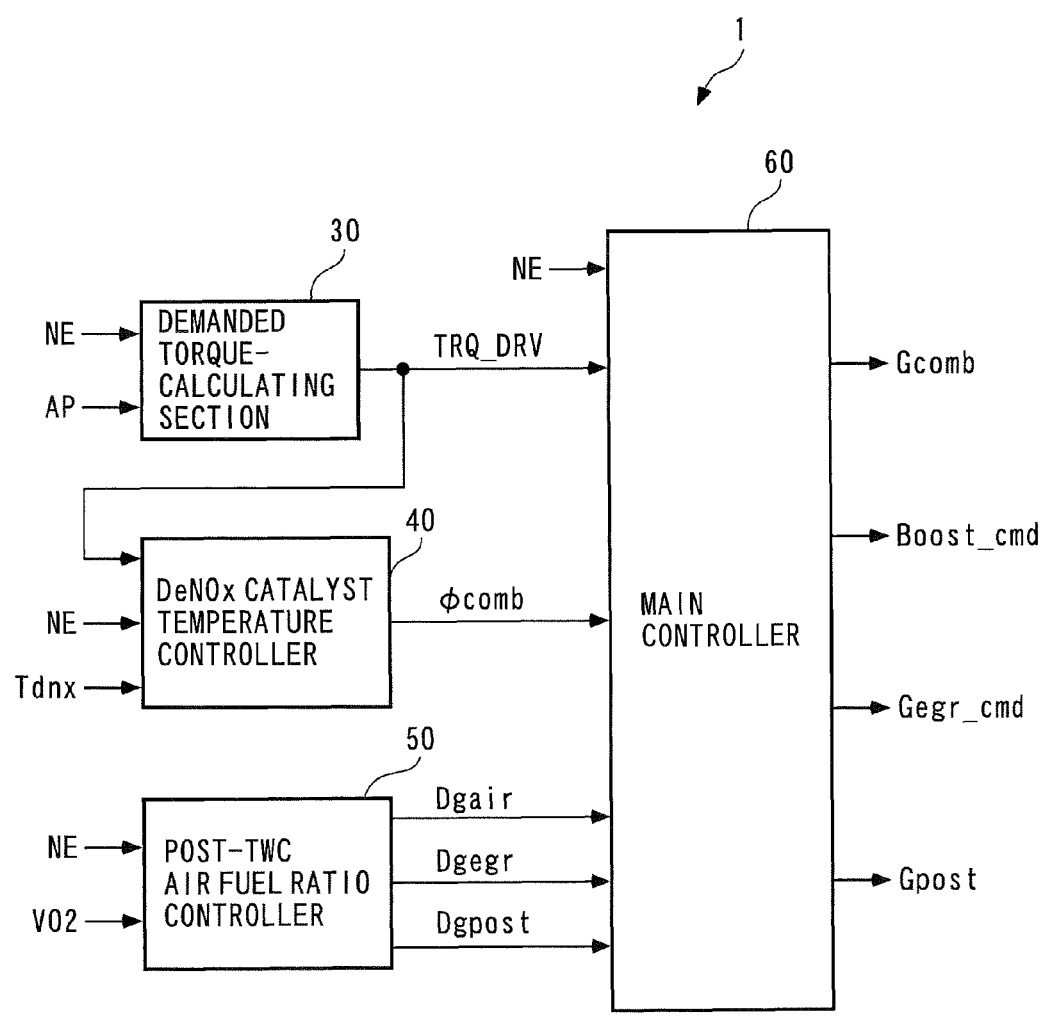
FIG. 3 is a schematic block diagram of the control system.

Next, the configuration of the control system 1 according to the present embodiment will be described with reference to FIG. 3. The control system 1 controls the sensor output value VO2 such that the sensor output value VO2 is caused to converge to a target value VO2_TRGT, referred to hereinafter, and at the same time controls the DeNOx catalyst temperature Tdnx such that the DeNOx catalyst temperature Tdnx is caused to converge to a target temperature Tdnx_TRGT, referred to hereinafter. In the following description, this control, is referred to as "the stoichiometric VO2 control". As shown in FIG. 3, the control system 1 is provided with a demanded torque-calculating section 30, a DeNOx catalyst temperature controller 40, a post-TWO air-fuel ratio controller 50 and a main controller 60, which are specifically implemented by the ECU 2.

The demanded torque-calculating section 30 calculates a demanded torque TRQ_DRV by a method, described hereinafter, according to the engine speed NE and the accelerator pedal opening AP. Further, the DeNOx catalyst temperature controller 40 calculates a target value φcomb of an equivalent ratio of a combustion air-fuel mixture (hereinafter referred to as "the target equivalent ratio φcomb") by a method, described hereinafter, according to the engine speed NE and the DeNOx catalyst temperature Tdnx.

In the present embodiment, the DeNOx catalyst temperature controller 40 corresponds to the target air-fuel ratio parameter-calculating means, the air-fuel ratio parameter correction value-calculating means, and the corrected target air-fuel ratio parameter-calculating means, and the target equivalent ratio φcomb corresponds to a corrected target air-fuel ratio parameter.

Further, the post-TWO air-fuel ratio controller 50 calculates a feedback correction value Dgair of the amount of fresh air (hereinafter referred to as "the FB fresh air amount Dgair"), a feedback correction value Dgegr of the Inert-EGR amount (hereinafter referred to as "the FB·Inert-EGR amount Dgegr"), and a feedback correction value Dgpost of a post fuel injection amount (hereinafter referred to as "the FB post injection amount Dgpost") by a method, described hereinafter, according to the sensor output value VO2 and the target value VO2_TRGT.

In the present embodiment, the post-TWO air-fuel ratio controller 50 corresponds to the target output value-setting means, the fuel amount correction value-calculating means, the gas amount correction value-calculating means and the fresh air amount correction value-calculating means. The FB fresh air amount Dgair corresponds to a fresh air amount correction value, the FB·Inert-EGR amount Dgegr to a gas amount correction value, and the FB post injection amount Dgpost to a fuel amount correction value.

The main controller 60 calculates a torque fuel injection amount Gcomb, a target boost pressure Boost_cmd, a target Inert-EGR amount Gegr_cmd and a post fuel injection amount Gpost by a method, described hereinafter, according to the demanded torque TRQ_DRV, the engine speed NE, the target equivalent ratio φcomb, the FB fresh air amount Dgair, the FB·Inert-EGR amount Dgegr and the FB post injection amount Dgpost.

In the present embodiment, the main controller 60 corresponds to the first fuel amount-calculating means, the target fresh air amount-calculating means, the target fuel amount-calculating means, the second fuel amount-calculating means, the target gas amount-calculating means, the corrected target gas amount-calculating means and the corrected target fresh air amount-calculating means. Further, the target fuel injection amount Gcomb corresponds to a first fuel amount, the post fuel injection amount Gpost to a second fuel amount, and the target Inert-EGR amount Gegr_cmd to a corrected target gas amount.

Figure 4:
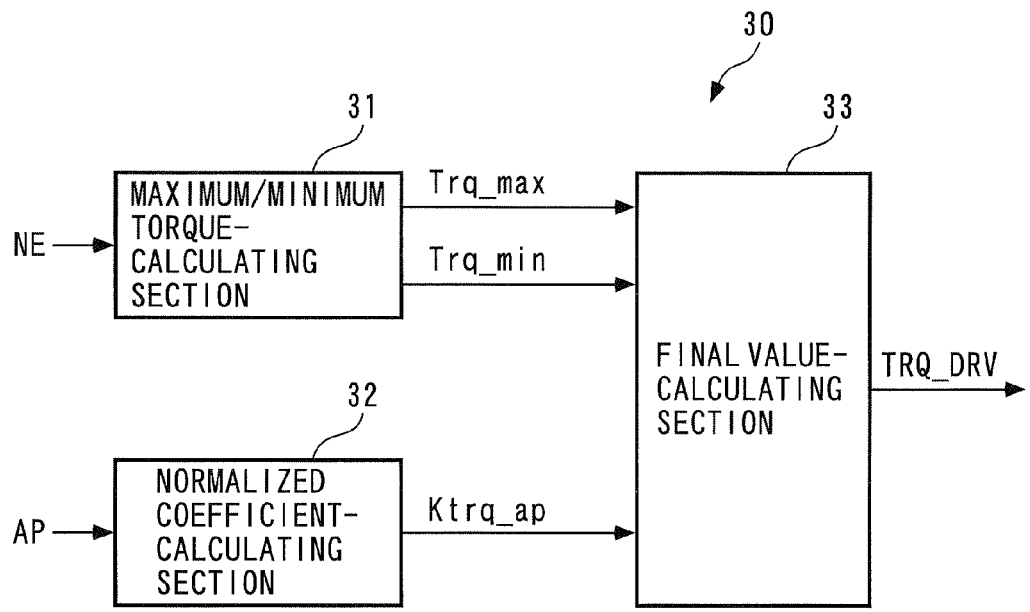
FIG. 4 is a schematic block diagram of a demanded torque-calculating section.

Next, the above-mentioned demanded torque-calculating section 30 will be described with reference to FIG. 4. The demanded torque-calculating section 30 calculates the demanded torque TRQ_DRV by a method, described hereinafter, and is provided with a maximum/minimum torque-calculating section 31, a normalized coefficient-calculating section 32 and a final value-calculating section 33.

Figure 5:
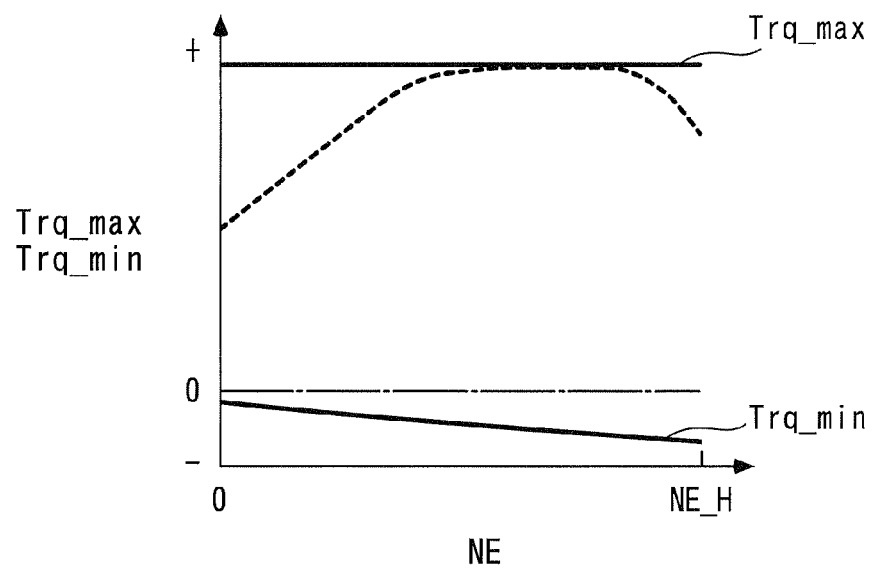
FIG. 5 is a view of an example of a map for use in calculating a maximum torque Trq_max and a minimum torque Trq_min.

The maximum/minimum torque-calculating section 31 calculates a maximum torque Trq_max and a minimum torque Trq_min by searching a map shown in FIG. 5 according to the engine speed NE. These values Trq_max and Trq_min represent the maximum value and the minimum value of an engine torque at the engine speed NE, respectively. In FIG. 5, NE_H represents a predetermined maximum allowable engine speed (e.g. 5000 rpm). This also applies to various figures, referred to hereinafter.

In this case, although the maximum value of the engine torque that can be actually achieved by the engine 3 is indicated by a broken line in FIG. 5, in this map, the maximum torque Trq_max is set, as indicated by a solid line, such that Trq_max is hardly changed with respect to the engine speed NE. This is for the following reason: The engine provided with the turbocharger has a characteristic that the maximum torque that can be actually achieved by the engine 3 is suddenly changed as the engine speed NE increases, and hence when the maximum torque Trq_max is set to a value having such a characteristic, even if the accelerator pedal opening AP is held constant, the maximum torque Trq_max is suddenly changed with respect to a change in the engine speed NE, which results in the degraded drivability. Therefore, to avoid such degradation of the drivability, in the present embodiment, the maximum torque Trq_max is set to have a tendency as indicated by the solid line in FIG. 5. Further, in this map, the minimum torque Trq_min is set to a negative value. This is because the minimum torque Trq_min corresponds to engine torque obtained in a state in which the accelerator pedal is not stepped on, i.e. in an engine brake state during a deceleration fuel cut-off operation.

Figure 6:
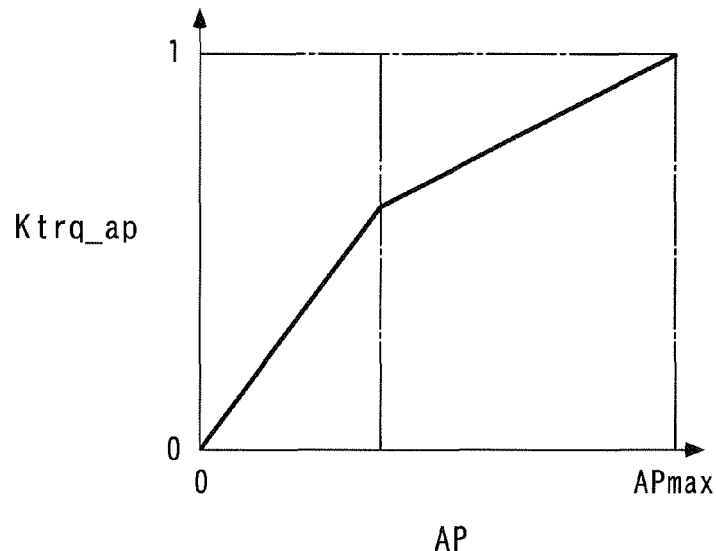
FIG. 6 is a view of an example of a map for use in calculating a normalized coefficient Ktrq_ap.

Further, the normalized coefficient-calculating section 32 calculates a normalized coefficient Ktrq_ap by searching a map shown in FIG. 6 according to the accelerator pedal opening AP. In FIG. 6, APmax represents the maximum value (100%) of the accelerator pedal opening AP. Further, the normalized coefficient Ktrq_ap represents a value obtained by normalizing a torque Trq_ap determined based on the accelerator pedal opening AP, with reference to a torque Trq_apmax obtained when AP=APmax holds, that is, a value which satisfies the equation, Ktrq_ap=Trq_ap÷Trq_apmax.

Furthermore, the final value-calculating section 33 calculates the demanded torque TRQ_DRV by the following equation (1):

$$TRQ\_DRV(k)=Ktrq\_ap(k)\cdot(Trq\_max(k)-Trq\_min(k))+Trq\_min(k) \quad (1)$$

As shown in the above equation (1), the demanded torque TRQ_DRV is calculated by adding the minimum torque Trq_min to a value obtained by correcting the difference between the maximum torque Trq_max and the minimum torque Trq_min using the normalized coefficient Ktrq_ap. The demanded torque TRQ_DRV is thus calculated so as to prevent the drivability from being degraded by a sudden increase in the engine torque, as described above.

In the above equation (1), data with a symbol (k) indicates that it is discrete data sampled or calculated at a predetermined control period ΔTk (e.g. 10 msec in the present embodiment). The symbol k indicates a position in the sequence of sampling or calculating cycles of respective discrete data. For example, the symbol k indicates that discrete data therewith is a value sampled or calculated in the current control timing, and a symbol k−1 indicates that discrete data therewith is a value sampled or calculated in the immediately preceding control timing. This also applies to equations, referred to hereinafter. Further, in the following description, the symbol (k) provided for the discrete data is omitted as deemed appropriate.

Figure 7:
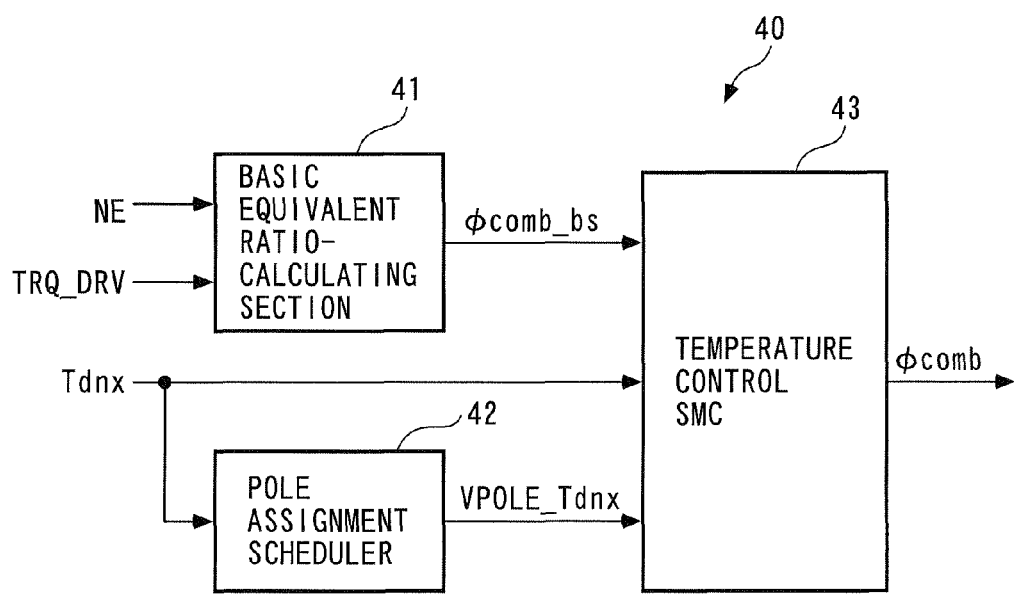
FIG. 7 is a schematic block diagram of a DeNOx catalyst temperature controller.

Next, the above-mentioned DeNOx catalyst temperature controller 40 will be described with reference to FIG. 7. The DeNOx catalyst temperature controller 40 calculates the target equivalent ratio φcomb by a method, described hereinafter, and is comprised of a basic equivalent ratio-calculating section 41, a pole assignment scheduler 42 and a temperature control sliding mode controller (hereinafter referred to as "the temperature control SMC") 43.

Figure 8:
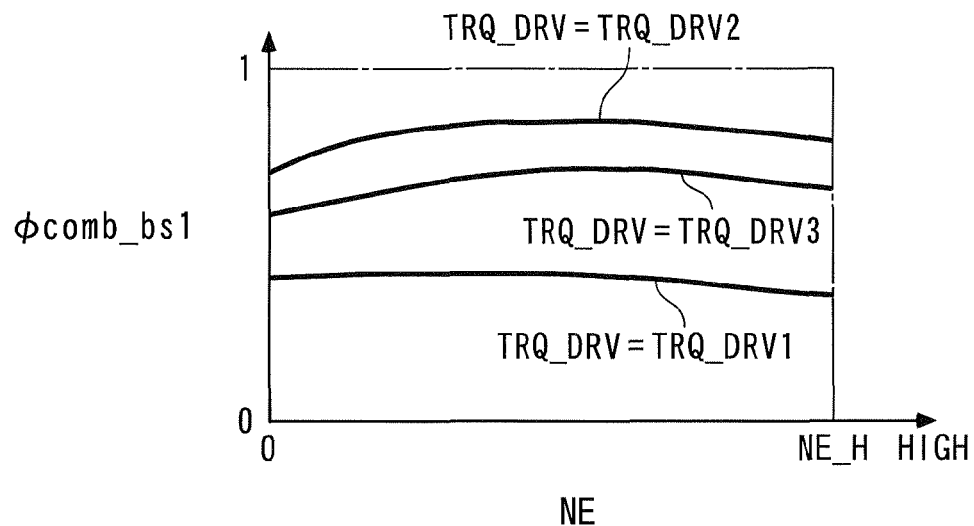
FIG. 8 is a view of an example of a map for use in calculating a catalyst warmup control value φcomb_bs1.
Figure 9:
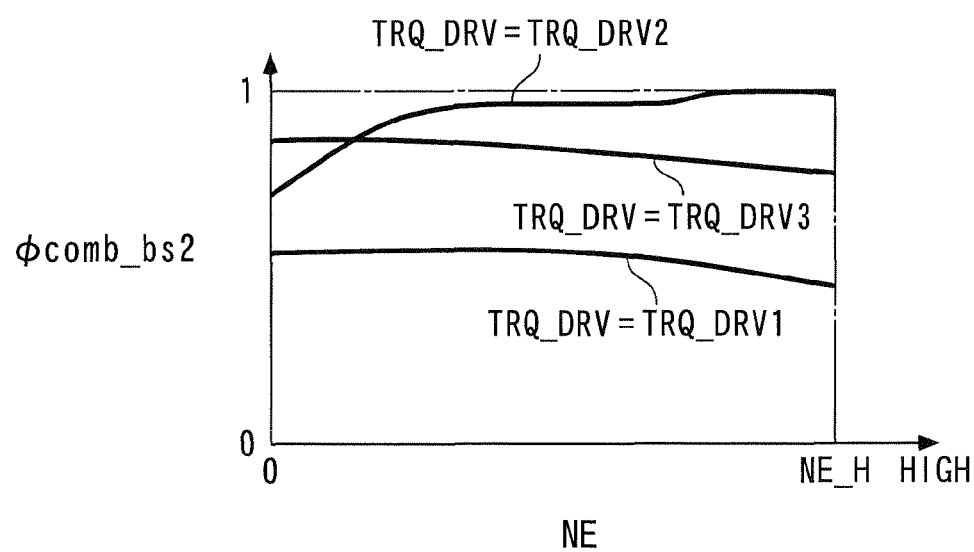
FIG. 9 is a view of an example of a map for use in calculating a VO2FB value φcomb_bs2.

The basic equivalent ratio-calculating section 41 calculates a basic equivalent ratio φcomb_bs by switching maps shown in FIGS. 8 and 9, based on the operating conditions of the engine 3, the three-way catalyst temperature Ttwc and the DeNOx catalyst temperature Tdnx. More specifically, when the DeNOx catalyst temperature Tdnx is not higher than the predetermined activation temperature Tdnx_act, the basic equivalent ratio-calculating section 41 calculates a catalyst warmup control value φcomb_bs1 by searching a map shown in FIG. 8 according to the engine speed NE, and sets the catalyst warmup control value φcomb_bs1 as the basic equivalent ratio φcomb_bs. In FIG. 8, TRQ_DRV1 to TRQ_DRV3 represent respective predetermined values of the demanded torque TRQ_DRV, and are set to values which satisfy the relationship of TRQ_DRV1< TRQ_DRV2<TRQ_DRV3.

As shown in FIG. 8, in a low-load region (e.g. in a region of TRQ_DRV=TRQ_DRV1), the catalyst warmup control value φcomb_bs1 is set to a considerably smaller value (i.e. a leaner value) than an equivalent ratio corresponding to the stoichiometric air-fuel ratio (i.e. 1). This is because when the combustion air-fuel mixture is enriched during a low-load operation of the engine 3, the ignitability of the mixture can be lowered due to shortage of the compression end temperature or soot can be increased. To avoid this problem, the catalyst warmup control value φcomb_bs1 is set as described above. Further, in a medium-load region (e.g. in a region of TRQ_DRV=TRQ_DRV2), the catalyst warmup control value φcomb_bs1 is set to a value closer to 1 than in the low-load region since the above-described problem is difficult to be caused. Furthermore, in a high-load region (e.g. in a region of TRQ_DRV=TRQ_DRV3), the catalyst warmup control value φcomb_bs1 is set to a leaner value than in the medium-load region so as to avoid an increase in the amount of soot generated by an increase in the fuel injection amount.

Further, as described hereinafter, when conditions for executing VO2 feedback control are satisfied (when an FB permission flag F_VO2FB, referred to hereinafter, =1 holds), if the DeNOx catalyst 12 is in an overheated state or if the temperature of the DeNOx catalyst 12 increases at a very high rate, the basic equivalent ratio-calculating section 41 calculates a VO2FB value φcomb_bs2 by searching a map shown in FIG. 9 according to the engine speed NE, and set the VO2FB value φcomb_bs2 as the basic equivalent ratio φcomb_b2. As is clear from comparison between the VO2FB value φcomb_bs2 appearing in FIG. 9 and the above-mentioned catalyst warmup control value φcomb_bs1 appearing in FIG. 8, the catalyst warmup control value φcomb_bs1 is set, as a whole, to a value leaner than the VO2FB value φcomb_bs2. This is to quickly cause the inactive state of the DeNOx catalyst 12 to be terminated by calculating the post fuel injection amount Gpost as a larger value, thereby increasing the amount of heat generated by combustion of fuel injected by post-fuel injection on the three-way catalyst 10.

In the FIG. 9 map, the VO2FB value φcomb_bs2 is set to a relatively leaner value in the low-load region (e.g. in the region of TRQ_DRV=TRQ_DRV1). The reason for this is the same as given in the description of the FIG. 8 map. Further, in the medium-load region (e.g. in the region of TRQ_DRV=TRQ_DRV2) and at the same time in a low engine speed region, the VO2FB value φcomb_bs2 is set to a relatively leaner value for the same reason as in the low-load region. In the medium-load region and at the same time in a medium engine speed region, the VO2FB value φcomb_bs2 is set to a value closer to 1 (i.e. a value corresponding to the stoichiometric air-fuel ratio) than in the low engine speed region such that the post fuel injection amount Gpost takes a value that will make it possible to ensure the stabilizabilty of the sensor output value VO2 at the target value VO2_TRGT.

Further, in the medium-load region and at the same time in a high engine speed region, the VO2FB value φcomb_bs2 is set to 1 so as to prevent the three-way catalyst 10 from being heated to a high temperature by combustion of fuel injected by post-fuel injection on the three-way catalyst 10. Furthermore, in the high-load region (e.g. in the region of TRQ_DRV=TRQ_DRV3), the VO2FB value φcomb_bs2 is set to a leaner value than in the medium-load region so as to avoid an increase in the amount of soot generated by an increase in the fuel injection amount.

In the present embodiment, the basic equivalent ratio φcomb_bs corresponds to the target air-fuel ratio parameter, and the catalyst warmup control value φcomb_bs1 corresponds to a target air-fuel ratio parameter on the leaner side.

Next, a description will be given of the aforementioned pole assignment scheduler 42. The pole assignment scheduler 42 calculates a response-specifying parameter VPOLE_Tdnx by searching a map shown in FIG. 10 according to the DeNOx catalyst temperature Tdnx. As described hereinafter, the response-specifying parameter VPOLE_Tdnx is used by the temperature control SMC 43 with a control algorithm to which is applied a response-specifying control algorithm, for determining the response behavior (i.e. the convergence rate and convergence behavior) of the DeNOx catalyst temperature Tdnx to the target temperature Tdnx_TRGT. More specifically, as the response-specifying parameter VPOLE_Tdnx is closer to 0, the convergence rate of the DeNOx catalyst temperature Tdnx to the target temperature Tdnx_TRGT is increased, whereas as the response-specifying parameter VPOLE_Tdnx is closer to −1, the convergence rate is reduced. Further, the target temperature Tdnx_TRGT is a predetermined fixed value, and as described hereinafter, is set based on the relationship between the NOx purification ratio of the DeNOx catalyst 12 and the DeNOx catalyst temperature Tdnx.

Figure 10:
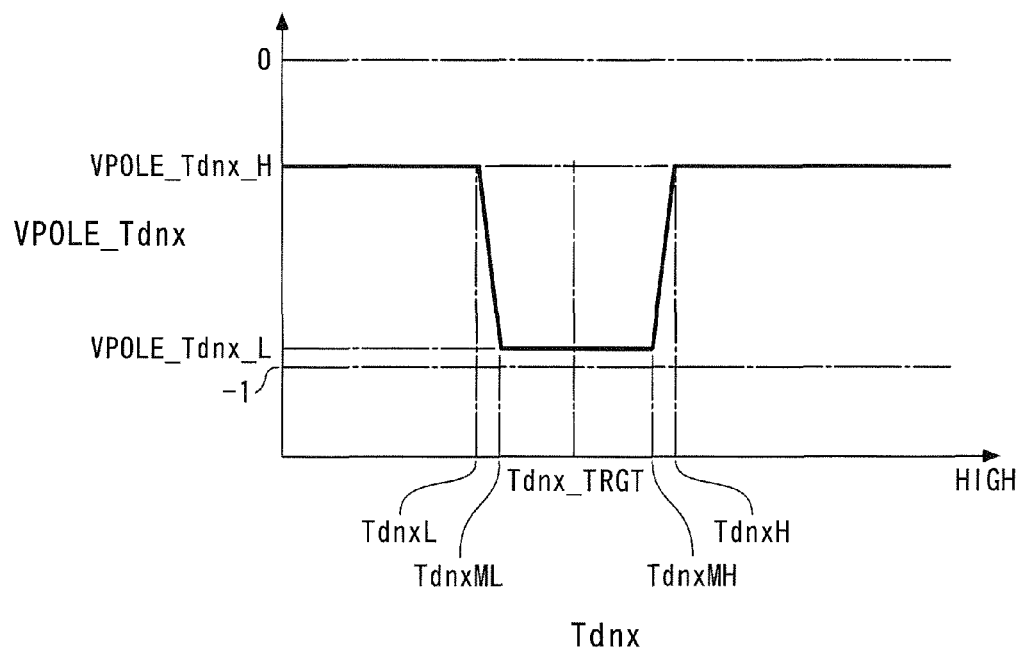
FIG. 10 is a view of an example of a map for use in calculating a response-specifying parameter VPOLE_Tdnx.

In FIG. 10, TdnxL, TdnxML, TdnxMH and TdnxH represent respective predetermined values of the DeNOx catalyst temperature Tdnx, which are set to satisfy the relationship of TdnxL<TdnxML<Tdnx_TRGT<TdnxMH<TdnxH. Particularly, the values TdnxL and TdnxH are set to satisfy the relationship of Tdnx_TRGT=(TdnxL+TdnxH)/2. Further, in FIG. 10, VPOLE_Tdnx_L and VPOLE_Tdnx_H represent respective predetermined values of the response-specifying parameter VPOLE_Tdnx, which are set to satisfy the relationship of −1<VPOLE_Tdnx_L<VPOLE_Tdnx_H<0. Particularly, the value VPOLE_Tdnx_L is set to a value close to −1.

Figure 11:
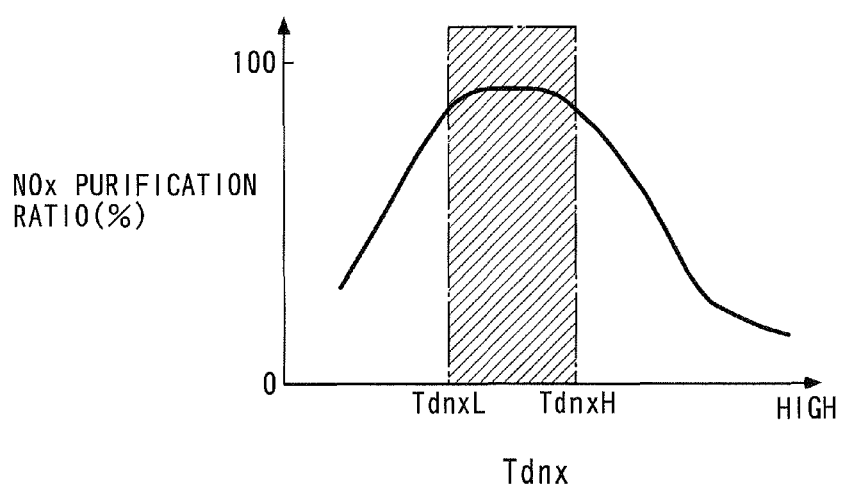
FIG. 11 is a diagram showing the relationship between a DeNOx catalyst temperature Tdnx and a NOx purification ratio.

In this map, the response-specifying parameter VPOLE_Tdnx is set to the predetermined value VPOLE_Tdnx_H in a region of Tdnx≦TdnxL and TdnxH≦Tdnx, and is set to the predetermined value VPOLE_Tdnx_L in a region of TdnxML≦Tdnx≦TdnxMH. Furthermore, in a region of TdnxL<Tdnx<TdnxML, the response-specifying parameter VPOLE_Tdnx is set to a smaller value as the DeNOx catalyst temperature Tdnx is higher, and in a region of TdnxMH<Tdnx<TdnxH, the response-specifying parameter VPOLE_Tdnx is set to a larger value as the DeNOx catalyst temperature Tdnx is higher. This is for the following reason:

As shown in FIG. 11, in the present embodiment, the DeNOx catalyst 12 has a characteristic that the NOx purification ratio thereof is much higher in a temperature range of TdnxL<Tdnx<TdnxH (hereinafter referred to as "the high purification rate temperature range") than in the other temperature ranges. Therefore, the target temperature Tdnx_TRGT serving as a target of the DeNOx catalyst temperature Tdnx is set to a value in the center between the two values of TdnxL and TdnxH (TdnxL+TdnxH)/2 such that a high NOx purification ratio can be ensured. In other words, assuming that TRANGE is a predetermined positive value, the target temperature Tdnx_TRGT is set such that TdnxL=Tdnx_TRGT−TRANGE and TdnxH=Tdnx_TRGT+TRANGE hold.

In the case of the FIG. 10 map, in the regions of Tdnx≦TdnxL and TdnxH≦Tdnx, the response-specifying parameter VPOLE_Tdnx is set to the predetermined value VPOLE_Tdnx_H, which is closer to 0 than the predetermined value VPOLE_Tdnx_L, so as to increase the convergence rate of the DeNOx catalyst temperature Tdnx to the target temperature Tdnx_TRGT to quickly increase the NOx purification ratio of the DeNOx catalyst 12. On the other hand, in the region of TdnxML≦Tdnx≦TdnxMH, the DeNOx catalyst 12 can ensure a high NOx purification ratio, whereby there is no need to increase the convergence rate of the DeNOx catalyst temperature Tdnx to the target temperature Tdnx_TRGT. Therefore, the response-specifying parameter VPOLE_Tdnx is set to the predetermined value VPOLE_Tdnx_L close to −1.

Next, a description will be given of the aforementioned temperature control SMC 43. First, the temperature control SMC 43 calculates an equivalent ratio correction value Usmc_tdnx using the DeNOx catalyst temperature Tdnx and the response-specifying parameter VPOLE_Tdnx with a control algorithm to which is applied a response-specifying control algorithm expressed by the following equations (2) to (12). That is, the equivalent ratio correction value Usmc_tdnx (air-fuel ratio parameter correction value) is calculated as a value for causing the DeNOx catalyst temperature Tdnx to converge to the target temperature Tdnx_TRGT.

$$Etdnx(k)=Tdnx(k)-Tdnx\_TRGT \quad (2)$$

$$\sigma\_tdnx(k)=Etdnx(k)+VPOLE\_Tdnx \cdot Etdnx(k-1) \quad (3)$$

$$Urch\_tdnx(k)=Krch\_tdnx \cdot \sigma\_tdnx(k) \quad (4)$$

$$Uadp\_tdnx\_cal(k)=Uadp\_tdnx(k-1)+Kadp\_tdnx \cdot \sigma\_tdnx(k) \quad (5)$$

When dφcomb_H<Uadp_tdnx_cal(k), $$Uadp\_tdnx(k)=d\phi comb\_H \quad (6)$$

When dφcomb_L≦Uadp_tdnx_cal(k)≦dφcomb_H, $$Uadp\_tdnx(k)=Uadp\_tdnx\_cal(k) \quad (7)$$

When Uadp_tdnx_cal(k)<dφcomb_L, $$Uadp\_tdnx(k)=d\phi comb\_L \quad (8)$$

$$Usmc\_tdnx\_cal(k)=Urch\_tdnx(k)Uadp\_tdnx(k) \quad (9)$$

When dφcomb_H<Usmc_tdnx_cal(k), $$Usmc\_tdnx(k)=d\phi comb\_H \quad (10)$$

When dφcomb_L≦Usmc_tdnx_cal(k)≦dφcomb_H, $$Usmc\_tdnx(k)=Usmc\_tdnx\_cal(k) \quad (11)$$

When Usmc_tdnx_cal(k)<dφcomb_L, $$Usmc\_tdnx(k)=d\phi comb\_L \quad (12)$$

In the above equation (2), Etdnx represents a follow-up error, and in the equation (3), σ_tdnx represents a switching function. Further, in the equation (4), Urch_tdnx represents a reaching law input, and Krch_tdnx represents a predetermined reaching law gain. Further, in the equation (5), Uadp_tdnx_cal represents a calculated value of an adaptive law input, Uadp_tdnx represents the adaptive law input, and Kadp_tdnx represents a predetermined adaptive law gain. Furthermore, in the equations (6) to (8), dφcomb_H represents a predetermined upper limit value, and dφcomb_L represents a predetermined lower limit value. As is apparent from the equations (5) to (8), the adaptive law input Uadp_tdnx is calculated by performing a limiting process on the calculated value Uadp_tdnx_cal using dφcomb_H as an upper limit value and dφcomb_L as a lower limit value. This is because when the DeNOx catalyst temperature Tdnx has become very low or very high, the absolute value of the follow-up error Etdnx is held at a large value, so that the absolute value of the adaptive law input Uadp_tdnx as an integral term is increased, which results in the degraded controllability when the absolute value of the follow-up error Etdnx has become small. To avoid this inconvenience, the adaptive law input Uadp_tdnx is calculated as described above.

Further, in the above-described equation (9), Usmc_tdnx_cal represents a calculated value of the equivalent ratio correction value, and as shown in the equations (9) to (12), the equivalent ratio correction value Usmc tdnx is calculated by performing a limiting process on the calculated value Usmc_tdnx_cal using dφcomb_H as an upper limit value and dφcomb_L as a lower limit value. The reason for this is the same as given in the description of the adaptive law input Uadp_tdnx.

Then, as shown in the following equation (13), the equivalent ratio correction value Usmc_tdnx is added to the basic equivalent ratio φcomb_bs, whereby the target equivalent ratio φcomb is finally calculated.

$$\phi comb(k)=\phi comb\_bs(k)+Usmc\_tdnx(k) \quad (13)$$

As described above, the temperature control SMC 43 calculates the target equivalent ratio φcomb by correcting the basic equivalent ratio φcomb_bs using the equivalent ratio correction value Usmc_tdnx.

Figure 12:
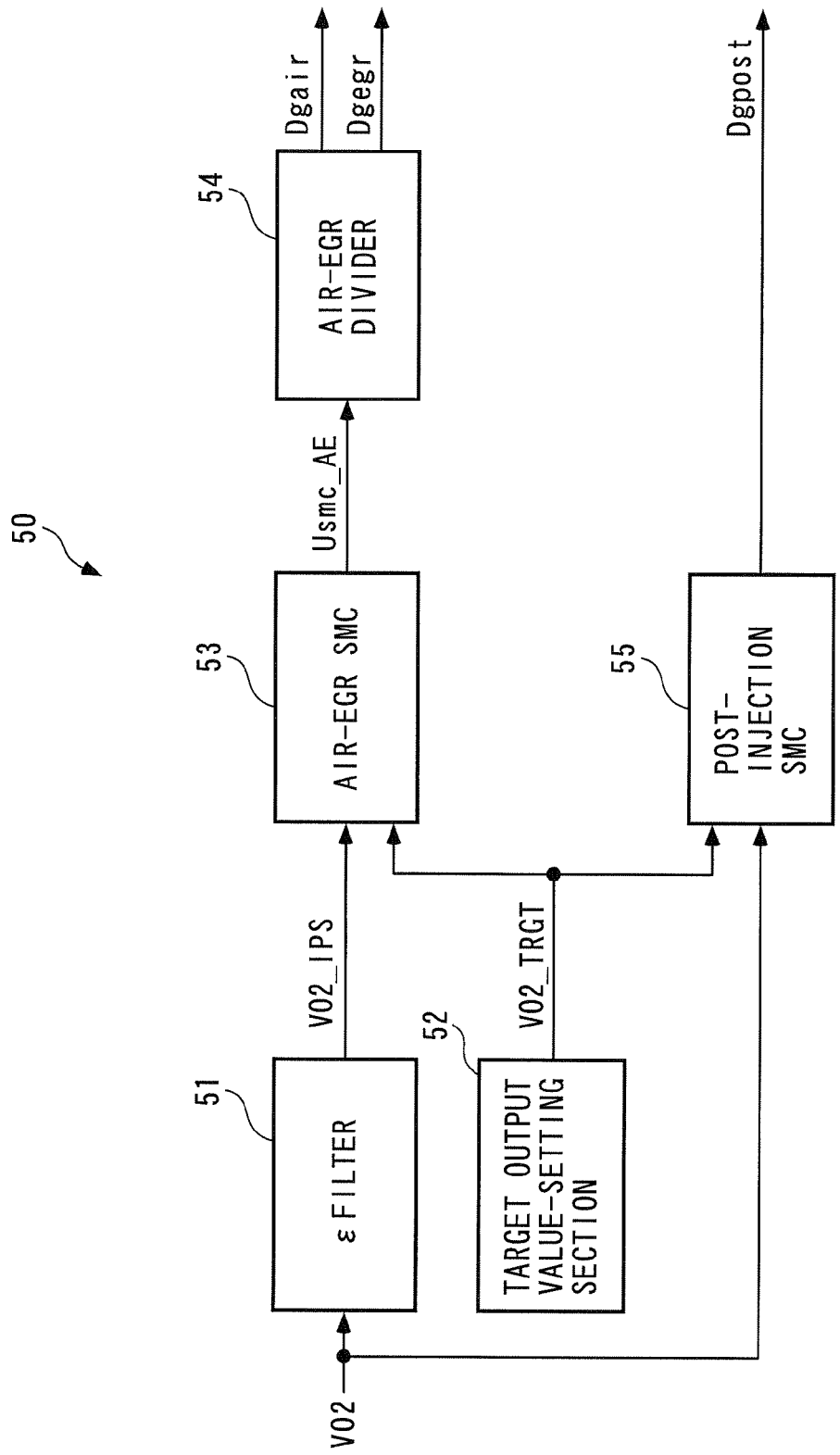
FIG. 12 is a schematic block diagram of a post-TWC air-fuel ratio controller.

Next, the post-TWO air-fuel ratio controller 50 will be described with reference to FIG. 12. The post-TWC air-fuel ratio controller 50 calculates the FB fresh air amount Dgair, the FB·Inert-EGR amount Dgegr and the FB post injection amount Dgpost by a method, described hereinafter, and as shown in FIG. 12, includes an ε filter 51, a target output value-setting section 52, an AIR-EGR sliding mode controller (hereinafter referred to as "the AIR-EGR SMC") 53, an AIR-EGR divider 54 and a post-injection sliding mode controller (hereinafter referred to as "the post-injection SMC") 55.

First, the ε filter 51 calculates an output filtered value VO2_IPS by performing an ε filtering process on the sensor output value VO2. More specifically, the output filtered value VO2_IPS is calculated with an ε filtering algorithm expressed by the following equations (14) to (16).

$$VO2\_IPS(k) = \frac{1}{j+1} \sum_{i=0}^{j} VO2\_mod(k-i) \quad (14)$$

When $VO2(k-i) < VO2(k) - \varepsilon$ or $VO2(k) + \varepsilon < VO2(k-i)$,
$$VO2\_mod(k-i) = VO2(k) \quad (15)$$

When $VO2(k) - \varepsilon \leq VO2(k-i) \leq VO2(k) + \varepsilon$,
$$VO2\_mod(k-i) = VO2(k-i) \quad (16)$$

In the above equation (14), j represents a natural number, and ε represents a predetermined positive value. In this case, the output filtered value VO2_IPS is calculated by the characteristics of the ε filtering process, such that the high-frequency components of the sensor output value VO2 are cut off, and at the same time such that the output filtered value has no phase delay with respect to the sensor output value VO2. In other words, the output filtered value VO2_IPS is calculated such that it follows up the sensor output value VO2 even when the sensor output value VO2 is suddenly changed.

Further, as will be described hereinafter, the target output value-setting section 52 sets the target output value VO2_TRGT to a predetermined stoichiometric control value VO2_ST when the three-way catalyst 10 is activated and at the same time the DeNOx catalyst 12 is not activated or when the combination of the demanded torque TRQ_DRV and the engine speed NE is in a region for executing the stoichiometric VO2 control. Furthermore, when the DeNOx catalyst 12 is in the overheated state or the temperature of the DeNOx catalyst 12 increases at a very high rate, the target output value VO2_TRGT is set to a predetermined leaning control value VO2_LE.

Here, the stoichiometric control value VO2_ST is set to a sensor output value VO2 obtained when the air-fuel ratio of exhaust gases is equal to the stoichiometric air-fuel ratio, so as to obtain the highest exhaust gas-purifying capability of the three-way catalyst 10. In this state, a very small amount of remaining unburned components (HC and CO) of exhaust gases exist downstream of the three-way catalyst 10. On the other hand, the leaning control value VO2_LE is set to a sensor output value VO2 obtained when the air-fuel ratio of exhaust gases is considerably leaner than the stoichiometric air-fuel ratio, so as to suppress a rise in the DeNOx catalyst temperature Tdnx or lower the DeNOx catalyst temperature Tdnx. In this state, it is possible to reduce the amount of remaining unburned components of exhaust gases on the downstream side of the three-way catalyst 10, thereby making it possible to suppress combustion of the unburned components on the DeNOx catalyst 12.

On the other hand, the AIR-EGR SMC 53 calculates an AIR-EGR correction value Usmc_AE using the output filtered value VO2_IPS and the target value VO2_TROT with a control algorithm to which is applied a response-specifying control algorithm expressed by the following equations (17) to (27).

$$EVO2\_AE(k) = VO2\_IPS(k) - VO2\_TRGT \tag{17}$$

$$\sigma\_ae(k) = EVO2\_AE(k) + POLE\_ae \cdot EVO2\_AE(k-1) \tag{18}$$

$$Urch\_ae(k) = Krch\_ae \cdot \sigma\_ae(k) \tag{19}$$

$$Uadp\_ae\_cal(k) = Uadp\_ae(k-1) + Kadp\_ae \cdot \sigma\_ae(k) \tag{20}$$

When Usmc_ae_H < Uadp_ae_cal(k), $$Uadp\_ae(k) = Usmc\_ae\_H \tag{21}$$

When Usmc_ae_L ≦ Uadp_ae_cal(k) ≦ Usmc_ae_H, $$Uadp\_ae(k) = Uadp\_ae\_cal(k) \tag{22}$$

When Uadp_ae_cal(k) < Usmc_ae_L, $$Uadp\_ae(k) = Usmc\_ae\_L \tag{23}$$

$$Usmc\_AE\_cal(k) = Urch\_ae(k) + Uadp\_ae(k) \tag{24}$$

When Usmc_ae_H < Usmc_AE_cal(k), $$Usmc\_AE(k) = Usmc\_ae\_H \tag{25}$$

When Usmc_ae_L ≦ Usmc_AE_cal(k) ≦ Usmc_ae_H, $$Usmc\_AE(k) = Usmc\_AE\_cal(k) \tag{26}$$

When Usmc_AE_cal(k) < Usmc_ae_L, $$Usmc\_AE(k) = Usmc\_ae\_L \tag{27}$$

In the above equation (17), EVO2_AE represents a follow-up error, and in the equation (18), σ_ae represents a switching function, and POLE_ae represents a response-specifying parameter. The response-specifying parameter POLE_ae is set to a value which satisfies the relationship of −1<POLE_ae<0, and the convergence rate of the follow-up error EVO2_AE to 0 is specified by the value set as the response-specifying parameter POLE_ae. More specifically, as the response-specifying parameter POLE_ae is closer to 0, the convergence rate of the follow-up error EVO2_AE to 0 is increased, whereas as the response-specifying parameter POLE_ae is closer to −1, the convergence rate is lowered.

Further, in the above equation (19), Urch_ae represents a reaching law input, and Krch_ae represents a predetermined reaching law gain.

Furthermore, in the equation (20), Uadp_ae_cal represents a calculated value of an adaptive law input, Uadp_ae represents the adaptive law input, and Kadp_ae represents a predetermined adaptive law gain. Furthermore, in the equations (21) to (23), Usmc_ae_H represents a predetermined upper limit value, and Usmc_ae_L represents a predetermined lower limit value. As is apparent from the equations (20) to (23), the adaptive law input Uadp_ae is calculated by performing a limiting process on the calculated value Uadp_ae_cal using Usmc_ae_H as an upper limit value and Usmc_ae_L as a lower limit value. This is for the following reason: The sensor output value VO2 are liable to be held at a maximum value or a minimum value thereof for a long time period, due to the characteristics of the oxygen concentration sensor 22. In this case, the absolute value of the follow-up error EVO2_AE is held at a large value, so that the absolute value of the adaptive law input Uadp_ae as an integral term is increased, which results in the degraded controllability when the absolute value of the follow-up error EVO2_AE has become small. To avoid such degradation of the controllability, the adaptive law input Uadp_ae is calculated by performing the limiting process on the calculated value Uadp_ae_cal.

Further, in the above equation (24), Usmc_AE_cal represents a calculated value of the AIR-EGR correction value Usmc_AE. As shown in the equations (25) to (27), the AIR-EGR correction value Usmc_AE is calculated by performing a limiting process on the calculated value Usmc_AE_cal using Usmc_ae_H as an upper limit value and Usmc_ae_L as a lower limit value. The reason for this is the same as given in the description of the adaptive law input Uadp_ae.

As described hereinabove, the AIR-EGR SMC 53 calculates the AIR-EGR correction value Usmc_AE as a value for causing the output filtered value VO2_IPS to converge to the target value VO2_TRGT, i.e. for causing the sensor output value VO2 to converge to the target value VO2_TRGT.

This is for the following reason: FIG. 13 is a view of an example of results of measurement of the relationship between the air-fuel ratio of exhaust gases on the downstream side of the three-way catalyst 10 and the concentration of unburned fuel (NOx, CO and HC) in a case where the three-way catalyst 10 is activated. As is apparent from FIG. 13, it is understood that when the air-fuel ratio of exhaust gases is in a predetermined region including the stoichiometric air-fuel ratio and the vicinity thereof (an area indicated by hatching in FIG. 13), the exhaust gas purification rate of the three-way catalyst 10 becomes most excellent. Based on this event, in the present embodiment, when the three-way catalyst 10 is activated but the DeNOx catalyst 12 is not activated or when the combination of the demanded torque TRQ_DRV and the engine speed NE is in the region for executing the stoichiometric VO2 control, the target output value VO2_TRGT is set to the above-mentioned predetermined stoichiometric control value VO2_ST, and the sensor output value VO2 is caused to converge to the target value VO2_TRGT, whereby the AIR-EGR correction value Usmc_AE is calculated such that it is possible to ensure an excellent exhaust gas purification characteristics of the three-way catalyst 10.

Next, a description will be given of the AIR-EGR divider 54. The AIR-EGR divider 54 calculates the FB fresh air amount Dgair and the FB·Inert-EGR amount Dgegr by the following equations (28) to (31) using the AIR-EGR correction value Usmc_AE.

When Usmc_AE(k)≧0, $$Dgair(k) = Usmc\_AE(k) \quad (28)$$

$$Dgegr(k) = 0 \quad (29)$$

When Usmc_AE(k)<0, $$Dgair(k) = (1 - DIVIDE\_RATE) \cdot Usmc\_AE(k) \quad (30)$$

$$Dgegr(k) = DIVIDE\_RATE \cdot Usmc\_AE(k) \quad (31)$$

In the above equations (30) and (31), DIVIDE_RATE represents a dividing rate, and is set such that 0≦DIVIDE_RATE≦1 holds. As is apparent from the equations (28) to (31), when Usmc_AE≧0 holds, the FB fresh air amount Dgair is set to the AIR-EGR correction value Usmc_AE, and the FB·Inert-EGR amount Dgegr is set to 0. On the other hand, when Usmc_AE<0 holds, the FB fresh air amount Dgair and the FB·Inert-EGR amount Dgegr are calculated by dividing the AIR-EGR correction value Usmc_AE.

This is because when Usmc_AE>0 holds, EVO2_AE<0, that is, VO2_IPS<VO2_TRGT holds, so that it is necessary to cause the fresh air amount to be reduced so as to enrich exhaust gases on the downstream side of the three-way catalyst 10. Further, when Usmc_AE<0 holds, VO2_IPS>VO2_TRGT holds, so that to lean the combustion air-fuel mixture, it is necessary to cause the fresh air amount to be increased while causing the Inert-EGR amount to be reduced.

Although in the above-described AIR-EGR divider 54, the dividing rate DIVIDE_RATE is set to a fixed value, the dividing rate DIVIDE_RATE may be calculated using a map in which the relationship between the dividing rate DIVIDE_RATE, and the operating conditions of the engine 3 and the temperature of the exhaust system (the two catalyst temperatures Tdnx and Ttwc and the temperature of exhaust gases in the exhaust passage) is subjected to scheduling in advance.

Further, although in the above-described AIR-EGR divider 54, when Usmc_AE≧0 holds, the FB·Inert-EGR amount Dgegr is set to 0, instead of this, when Usmc_AE≧0 holds, to enrich exhaust gases on the downstream side of the three-way catalyst 10, the Inert-EGR amount may be caused to be increased by setting the FB·Inert-EGR amount Dgegr to Usmc_AE or calculating the FB·Inert-EGR amount Dgegr as a value larger than 0 using the above-mentioned dividing rate DIVIDE_RATE. In such cases, there is a possibility that the amount of smoke generated is increased or the combustion of fuel is made unstable, so that in the present embodiment, when Usmc_AE≧0 holds, the FB·Inert-EGR amount Dgegr is set to 0, as described hereinabove.

Next, a description will be given of the post-injection SMC 55. The post-injection SMC 55 calculates the FB post injection amount Dgpost using the sensor output value VO2 and the target value VO2_TRGT with a control algorithm to which is applied a response-specifying control algorithm expressed by the following equations (32) to (42).

$$EVO2\_GP(k) = VO2(k) - VO2\_TRGT \quad (32)$$

$$\sigma\_gp(k) = EVO2\_GP(k) + POLE\_gp \cdot EVO2\_GP(k-1) \quad (33)$$

$$Urch\_gp(k) = Krch\_gp \cdot \sigma\_gp(k) \quad (34)$$

$$Uadp\_gp\_cal(k) = \lambda gp \cdot Uadp\_gp(k-1) + Kadp\_gp \cdot \sigma\_gp(k) \quad (35)$$

When Dgpost_H<Uadp_gp_cal(k)

$$Uadp\_gp(k) = Dgpost\_H \quad (36)$$

When Dgpost_L≦Uadp_gp_cal(k)≦Dgpost_H, $$Uadp\_gp(k) = Uadp\_gp\_cal(k) \quad (37)$$

When Uadp_gp_cal(k)<Dgpost_L, $$Uadp\_gp(k) = Dgpost\_L \quad (38)$$

$$Dgpost\_cal(k) = Urch\_gp(k) + Uadp\_gp(k) \quad (39)$$

When Dgpost_H<Dgpost_cal(k), $$Dgpost(k) = Dgpost\_H \quad (40)$$

When Dgpost_L≦Dgpost_cal(k)≦Dgpost_H, $$Dgpost(k) = Dgpost\_cal(k) \quad (41)$$

When Dgpost_cal(k)<Dgpost_L, $$Dgpost(k) = Dgpost\_L \quad (42)$$

In the above equation (32), EVO2_GP represents a follow-up error, and in the equation (33), σ_gp represents a switching function, and POLE_gp represents a response-specifying parameter. The response-specifying parameter POLE_gp is set to a value which satisfies the relationship of −1<POLE_gp<0, and the convergence rate of the follow-up error EVO2_GP to 0 is specified by the value set as the response-specifying parameter POLE_gp. More specifically, as the response-specifying parameter POLE_gp is closer to 0, the convergence rate of the follow-up error EVO2_GP to 0 is increased, whereas as the response-specifying parameter POLE_gp is closer to −1, the convergence rate is lowered. Further, in the above equation (34), Urch_gp represents a reaching law input, and Krch_gp represents a predetermined reaching law gain.

Furthermore, in the equation (35), Uadp_gp_cal represents a calculated value of an adaptive law input, λgp a forgetting coefficient set such that 0<λgp<1 holds, Uadp_gp the adaptive law input (control input term), and Kadp_gp a predetermined adaptive law gain. Further, in the equations (36) to (38), Dgpost_H represents a predetermined upper limit value, and Dgpost_L represents a predetermined lower limit value. As is apparent from the equations (35) to (38), the calculated value Uadp_gp_cal is calculated using the forgetting coefficient λgp, and the adaptive law input Uadp_gp is calculated by performing a limiting process on the calculated value Uadp_gp_cal using Dgpost_H as an upper limit value and Dgpost_L as a lower limit value.

In this case, although the adaptive law input Uadp_gp is originally a control input term for compensating for the steady-state deviation of the sensor output value VO2 from the target value VO2_TRGT, when the forgetting coefficient λgp is used for calculating the adaptive law input Uadp_gp as described above, the calculated value Uadp_gp_cal converges to 0 and the adaptive law input Uadp_gp converges to 0, as the computing operation proceeds. As a consequence, the post fuel injection amount Gpost can be reduced, thereby making it possible to enhance fuel economy. Further, when the follow-up error EVO2_GP is temporarily increased, the post fuel injection amount Gpost is temporarily largely changed, but it is possible to quickly reduce the amount of the change in the post fuel injection amount Gpost as the computing operation proceeds. This makes it possible to prevent the DeNOx catalyst 12 from being overheated by an excessive increase in the post fuel injection amount Gpost, and prevent a state where the sensor output value VO2 cannot be controlled to the target value VO2_TRGT from being caused by the calculated value of the post fuel injection amount Gpost becoming equal to 0. Furthermore, the steady-state deviation of the sensor output value VO2 from the target value VO_TRGT is finally absorbed by the AIR-EGR SMC 53, so that it is possible to suppress an extra rise in the DeNOx catalyst temperature Tdnx. For the above reason, the adaptive law input Uadp_gp is calculated using the forgetting coefficient λgp.

Further, the adaptive law input Uadp_gp is calculated by performing the limiting process on the calculated value Uadp_gp_cal for the same reason as given in the description of the adaptive law input Uadp_ae. That is, when the absolute value of the follow-up error EVO2_GP is held at a large value due to the characteristics of the oxygen concentration sensor 22, the absolute value of the adaptive law input Uadp_gp as an integral term is increased, which results in the degraded controllability when the absolute value of the follow-up error EVO2_GP has become small. To avoid this inconvenience, the adaptive law input Uadp_gp is calculated by performing the limiting process on the calculated value Uadp_gp_cal.

Further, in the above equation (39), Dgpost_cal represents a calculated value of the FB post injection amount. As shown in the equations (40) to (42), the FB post injection amount Dgpost is calculated by performing a limiting process on the calculated value Dgpost_cal using Dgpost_H as an upper limit value and Dgpost_L as a lower limit value. The reason for this is the same as given in the description of the adaptive law input Uadp_gp.

Although all of the temperature control SMC 43, the AIR-EGR SMC 53 and the post-injection SMC 55 use the control algorithms to which are applied the response-specifying control algorithms as described above, in the present embodiment, the values VPOLE_Tdnx_L, VPOLE_Tdnx_H, POLE_ae and POLE_gp of the four response-specifying parameters used by the above controllers 43, 52 and 54 are set to values which satisfies the relationship expressed by the following equation (43).

$$-1 < \text{VPOLE\_Tdnx\_}L < \text{POLE\_ae} < \text{VPOLE\_Tdnx\_}H < \text{POLE\_gp} < 0 \quad (43)$$

Since the four response-specifying parameters are set to the values which satisfies the relationship expressed by the above equation (43), out of the three follow-up errors Etdnx, EVO2_AE and EVO2_GP, the follow-up error EVO2_GP converges to 0 at the highest speed, the follow-up error Etdnx occurring when Tdnx≦TdnxL or TdnxH≦Tdnx holds converges to 0 at the second highest speed, the follow-up error EVO2_AE converges to 0 at the third highest speed, and the follow-up error Etdnx occurring when TdnxML≦Tdnx≦TdnxMH holds converges to 0 at the lowest speed. In other words, the convergence rate of the sensor output value VO2 to the target output value VO2_TRGT is highest, the convergence rate of the DeNOx catalyst temperature Tdnx to the target temperature Tdnx_TRGT obtained when Tdnx≦TdnxL or TdnxH≦Tdnx holds is second highest, the convergence rate of the output filtered value VO2_IPS to the target output value VO2_TRGT is third highest, and the convergence rate of the DeNOx catalyst temperature Tdnx to the target temperature Tdnx_TRGT obtained when TdnxML≦Tdnx≦TdnxMH holds is lowest.

This is for avoiding interaction between the control processes executed by the three controllers 43, 52 and 54, and for the following reason: The oxygen concentration sensor 22 has characteristics that it has a resolution higher than that of the DeNOx catalyst temperature sensor 23, and the detection signal therefrom contains a larger amount of high-frequency components than that from the DeNOx catalyst temperature sensor 23, so that it is necessary to make the response speed of the post-injection SMC 55 using the results of detection by the oxygen concentration sensor 22 higher than the response speed of the temperature control SMC 43 using the results of detection by the DeNOx catalyst temperature sensor 23.

Therefore, to meet the above necessity, the response-specifying parameter POLE_gp used by the post-injection SMC 55 is set to a larger value (i.e. value closer to 0) than the value VPOLE_Tdnx_H, i.e. the larger one of the response-specifying parameters used by the temperature control SMC 43.

Further, in the case of the AIR-EGR SMC 53, the AIR-EGR correction value Usmc_AE calculated by the AIR-EGR SMC 53 is used for control (i.e. intake air amount control) of the exhaust gas recirculation mechanism 7 and the turbocharger 6, the responses of which are lower than the response of the fuel injection valve 4, so that no inconveniences are caused even when the response speed of the AIR-EGR SMC 53 is set to be lower than those of the temperature control SMC 43 and the post-injection SMC 55. Therefore, the response-specifying parameter POLE_ae used by the AIR-EGR SMC 53 is set to a value which satisfies the relationship of POLE_ae<VPOLE_Tdnx_H. Furthermore, as described above, when the DeNOx catalyst temperature Tdnx is in the region of TdnxML≦Tdnx≦TdnxMH, it is possible to ensure a high NOx purification ratio of the DeNOx catalyst 12, so that there is no need to increase the convergence rate of the DeNOx catalyst temperature Tdnx to the target temperature Tdnx_TRGT, and hence the value VPOLE_Tdnx_L, i.e. the smaller one of the response-specifying parameters used by the temperature control SMC 43, is set to a value which satisfies the relationship of VPOLE_Tdnx_L<POLE_ae.

Figure 14:
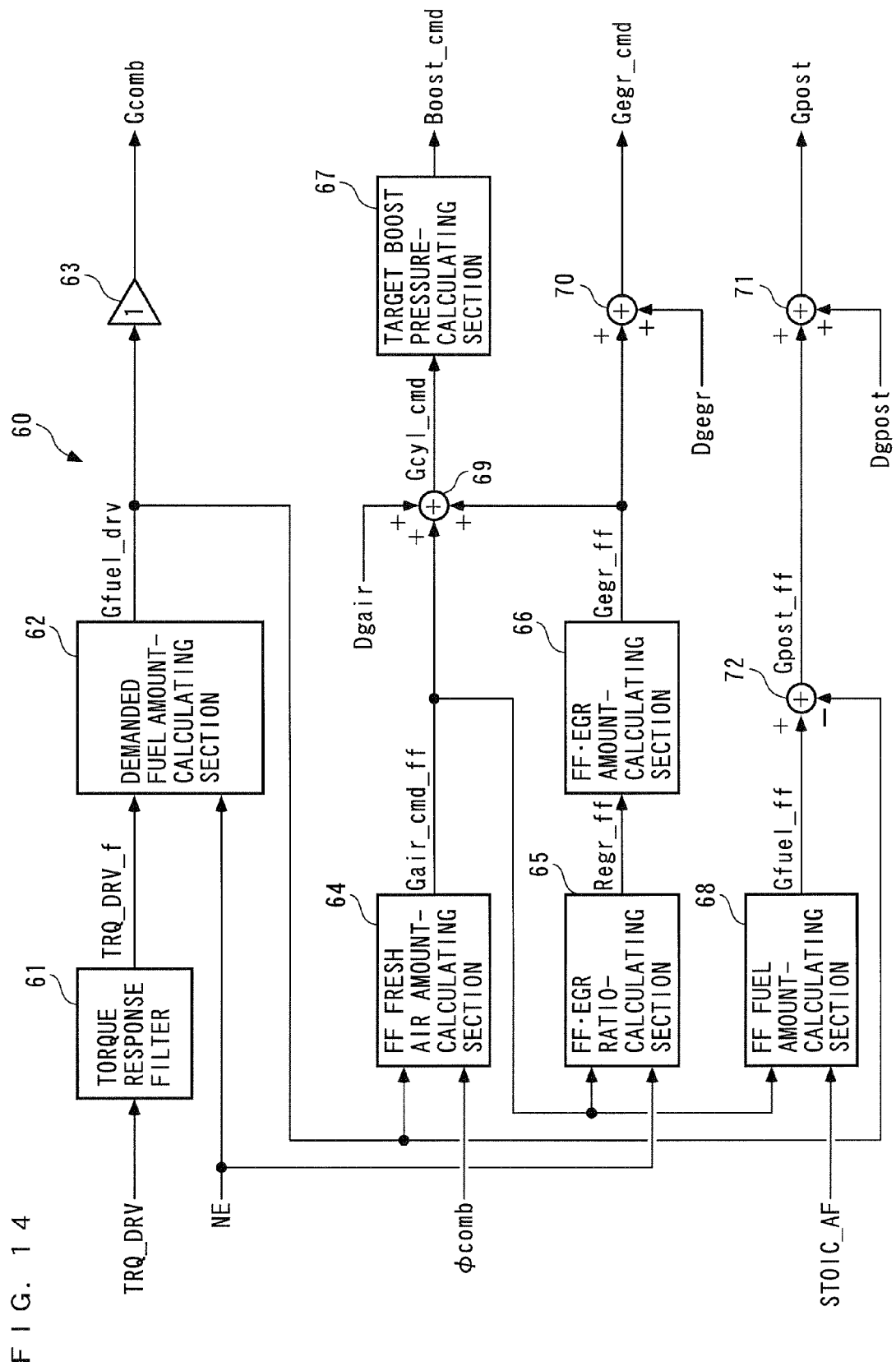
FIG. 14 is a schematic block diagram of a main controller.

Next, the above-mentioned main controller 60 will be described with reference to FIG. 14. The main controller 60 calculates the torque fuel injection amount Gcomb, the target boost pressure Boost_cmd, the target Inert-EGR amount Gegr_cmd and the post fuel injection amount Gpost by the following method:

As shown in FIG. 14, the main controller 60 is comprised of a torque response filter 61, a demanded fuel amount-calculating section 62, an amplifier 63, an FF fresh air amount-calculating section 64, an FF·EGR ratio-calculating section 65, an FF·EGR amount-calculating section 66, a target boost pressure-calculating section 67, an FF fuel amount-calculating section 68, three adders 69 to 71 and a subtractor 72.

First, the torque response filter 61 calculates a filtered value TRQ_DRV_f of the demanded torque by performing a low-pass filtering process expressed by the following equation (44) on the demanded torque TRQ_DRV.

$$\begin{aligned}\text{TRQ\_DRV\_f}(k) = \quad & (44)\\ \alpha_1 \cdot \text{TRQ\_DRV\_f}(k-1) + \alpha_2 \cdot \text{TRQ\_DRV\_f}(k-2) + \\ \ldots + \alpha_m \cdot \text{TRQ\_DRV\_f}(k-m) + \beta_1 \cdot \text{TRQ\_DRV}(k-1) + \\ \beta_2 \cdot \text{TRQ\_DRV}(k-2) + \ldots + \beta_n \cdot \text{TRQ\_DRV}(k-n)\end{aligned}$$

In the above equation (44), $\alpha_1$ to $\alpha_m$ and $\beta_1$ to $\beta_n$ represent respective predetermined filter coefficients, and n and m represent filter orders (natural numbers). In the low-pass filtering process, the resonance frequency of the vehicle having the engine 3 installed thereon is set to a cutoff frequency. This is for preventing unpleasant vibrations of the vehicle during rapid acceleration thereof and making up for response delays of the devices, such as the turbocharger 6 and an EGR control valve 7b.

The torque response filter 61 may use any suitable filtering algorithm insofar as the filtering algorithm can cut off the resonance frequency of the vehicle having the engine 3 installed thereon and at the same time make up for response delays of the devices. For example, a combination of a band stop filter that cuts off the resonance frequency of the vehicle and a non-linear filter, such as a rate limiter, for making up for response delays of the devices may be used as a filtering algorithm for the torque response filter 61.

Figure 15:
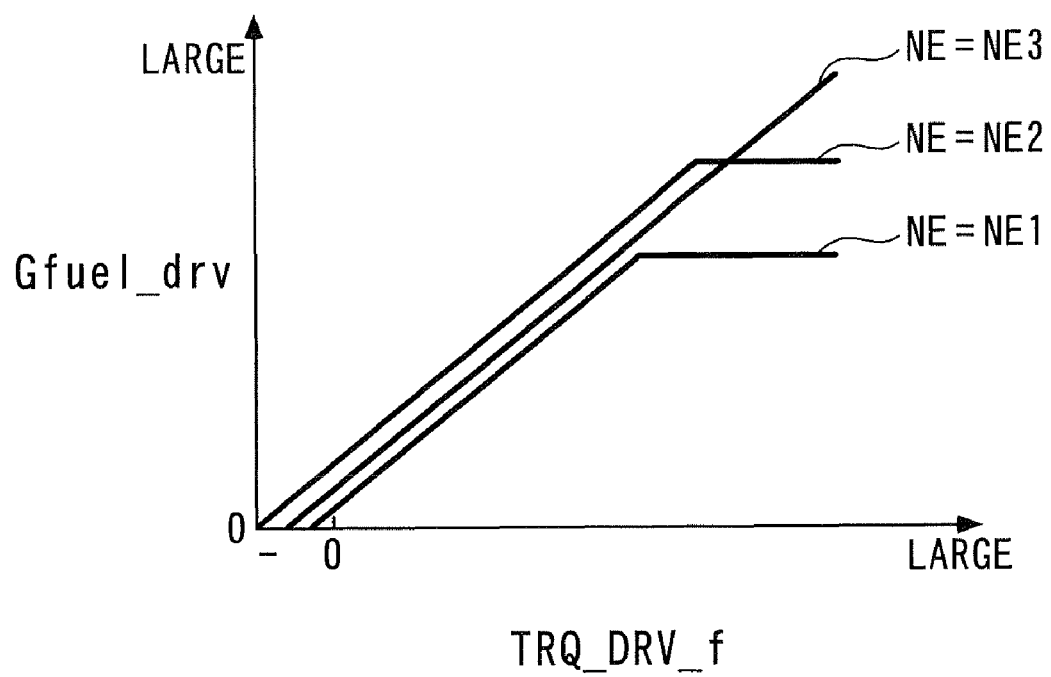
FIG. 15 is a view of an example of a map for use in calculating a demanded fuel amount Gfuel_drv.

Next, the demanded fuel amount-calculating section 62 calculates a demanded fuel amount Gfuel_drv by searching a map shown in FIG. 15 according to the filtered value TRQ_DRV_f of the demanded torque and the engine speed NE. In FIG. 15, NE1 to NE3 represent respective predetermined values of the engine speed NE, which satisfy the relationship of NE1<NE2<NE3. This also applies to the following description. In FIG. 15, the demanded fuel amount Gfuel_drv is set such that it has different values depending on the engine speed NE when TRQ_DRV=0 holds. This is because friction varies with the engine speed NE. Further, in the low-to-medium engine speed region (e.g. in a region where NE=NE1 or NE2 holds) and at the same time in a region where the filtered value TRQ_DRV_f of the demanded torque is large (i.e. in the high-load region), the demanded fuel amount Gfuel_drv is limited to a predetermined upper limited value so as to suppress generation of undesired smoke.

Next, the amplifier 63 calculates the torque fuel injection amount Gcomb by multiplying the demanded fuel amount Gfuel_drv calculated by the demanded fuel amount-calculating section 62, by 1. That is, Gcomb=Gfuel_drv holds. The torque fuel injection amount Gcomb determines an output from the engine. The amount of fuel corresponding to the torque fuel injection amount Gcomb is injected from the fuel injection valves 4 in predetermined timing between the intake stroke and the expansion stroke, whereby combustion air-fuel mixture is generated in the combustion chamber.

Next, a description will be given of the FF fresh air amount-calculating section 64 mentioned above. The FF fresh air amount-calculating section 64 calculates a feedforward fresh air amount (hereinafter referred to as "the FF fresh air amount") Gair_cmd_ff using the following equations (45) and (46). In the present embodiment, the FF fresh air amount Gair_cmd_ff corresponds to a target fresh air amount.

$$AF\_comb\_cmd(k) = \frac{STOIC\_AF}{\phi comb(k)} \quad (45)$$

$$Gair\_cmd\_ff(k) = Gfuel\_drv(k) \cdot AF\_comb\_cmd(k) \quad (46)$$

In the above equation (45), AF_comb_cmd represents a target air-fuel ratio, and STOIC_AF represents the stoichiometric air-fuel ratio (14.2 in the diesel engine according to the present embodiment). As is apparent from the equations (45) and (46), the FF fresh air amount Gair_cmd_ff represents a fresh air amount required with respect to the demanded fuel amount Gfuel_drv, for generating an air-fuel mixture having the target equivalent ratio $\phi$comb.

On the other hand, the above-mentioned FF·EGR ratio-calculating section 65 calculates a feedforward Inert-EGR ratio (hereinafter referred to as "the FF·EGR ratio") Regr_ff by searching a map shown in FIG. 16 according to the FF fresh air amount Gair_cmd_ff and the engine speed NE. The FF~EGR ratio Regr_ff represents a ratio of inert gases to be recirculated into the combustion chamber to the FF fresh air amount Gair_cmd_ff.

Figure 16:
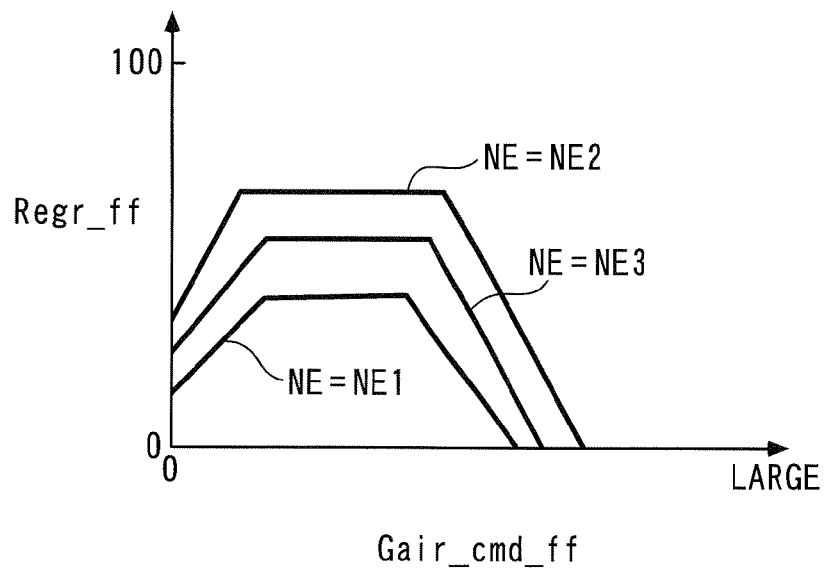
FIG. 16 is a view of an example of a map for use in calculating an FF·EGR ratio Regr_ff.

As shown in FIG. 16, in a low engine speed and low fresh air amount region, to enhance the response in increasing the boost pressure by the turbocharger 6, the FF·EGR ratio Regr_ff is set to a small value, while in the medium-to-high engine speed and low fresh air amount region, to avoid an increase in PM (Particulate Matter) due to a decrease in the concentration of oxygen, the FF·EGR ratio Regr_ff is set to a small value. Further, in the high engine speed region (e.g. a region where NE=NE3 holds), PM and HC are liable to be increased due to a short combustion time period, so that to avoid the inconvenience, the FE·EGR ratio Regr_ff is set to a value smaller than in the medium engine speed region (e.g. the region where NE=NE2 holds). Furthermore, in a high fresh air amount region, i.e. in the high-load region, to enhance fuel economy and increase torque, the FF·EGR ratio Regr_ff is set to a small value or 0.

Next, the FF·EGR amount-calculating section 66 calculates a feedforward Inert-EGR amount (hereinafter referred to as "the FF·FOR amount") Gegr_ff by the following equation (47). In the present embodiment, the FF·EGR amount Gegr_ff corresponds to the target gas amount.

$$Gegr\_ff(k) = Gair\_cmd\_ff(k) \cdot \frac{Regr\_ff(k)}{100} \quad (47)$$

Further, the adder 69 calculates a target in-cylinder gas amount Gcyl_cmd by the following equation (48):

$$Gcyl\_cmd(k) = Gair\_cmd\_ff(k) + Gegr\_ff(k) + Dgair(k) \quad (48)$$

As shown in the equation (48), the target in-cylinder gas amount Gcyl_cmd is calculated by correcting the sum of the FF fresh air amount and the FF·EGR amount (Gair_cmd_ff+Gegr_ff) by the FB fresh air amount Dgair.

Figure 17:
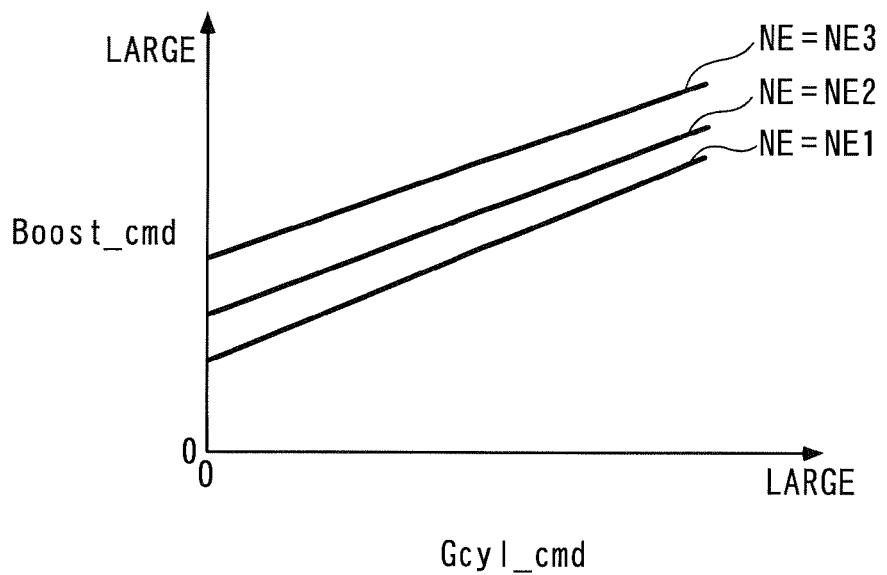
FIG. 17 is a view of an example of a map for use in calculating a target boost pressure Boost_cmd.

Furthermore, the above-mentioned target boost pressure-calculating section 67 calculates the target boost pressure Boost_cmd by searching a map shown in FIG. 17 according to the target in-cylinder gas amount Gcyl_cmd and the engine sped NE. In this map, as the target in-cylinder gas amount Gcyl_cmd or the engine sped NE is higher, the target boost pressure Boost_cmd is set to a larger value. This is because as the engine speed NE is higher, charging efficiency becomes lower and hence the boost pressure is increased so as to make up for the lowering of the charging efficiency.

Further, the adder 70 calculates the target Inert-EGR amount Gegr cmd by the following equation (49). That is, the target Inert-EGR amount Gegr_cmd is calculated by correcting the FF·EGR amount Gegr.ff by the FB·Inert-EGR amount Dgegr.

$$Gegr\_cmd(k) = Gegr\_ff(k) + Dgegr(k) \quad (49)$$

On the other hand, the FF fuel amount-calculating section 68 calculates a feedforward fuel amount (hereinafter referred to as "the FF fuel amount") Gfuel_ff by the following equation (50). In the present embodiment, the FF fuel amount Gfuel_ff corresponds to the target fuel amount.

$$Gfuel\_ff(k) = \frac{Gair\_cmd\_ff(k)}{STOIC\_AF} \quad (50)$$

Further, the subtractor 72 calculates a feedforward post fuel injection amount (hereinafter referred to as "the FF post injection amount") Gpost_ff by subtracting the demanded fuel amount Gfuel_drv from the FF fuel amount Gfuel_ff as shown in the following equation (51):

$$Gpost\_ff(k) = Gfuel\_ff(k) - Gfuel\_drv(k) \quad (51)$$

Furthermore, the adder 71 calculates a post fuel injection amount Gpost by the following equation (52). That is, the post fuel injection amount Gpost is calculated by correcting the FF post injection amount Gpost_ff by the FB post injection amount Dgpost.

$$Gpost(k) = Gpost\_ff(k) + Dgpost(k) \quad (52)$$

The post fuel injection amount Gpost is an amount of fuel supplied to the three-way catalyst 10 as unburned fuel. An amount of fuel corresponding to the post fuel injection amount Gpost is injected from each fuel injection valve 4 into the associated cylinder 3a in predetermined timing between the expansion stroke and the intake stroke. This causes the unburned fuel to flow into the three-way catalyst 10 to be burned therein, whereby the temperature of exhaust gases flowing into the DeNOx catalyst 12 is made higher, and at the same time the air-fuel ratio of exhaust gases between the three-way catalyst 10 and the DeNOx catalyst 12 is made richer than the air-fuel ratio of the combustion air-fuel mixture.

As described above, the main controller 60 calculates the torque fuel injection amount Gcomb, the target boost pressure Boost_cmd, the target Inert-EGR amount Gegr_cmd and the post fuel injection amount Gpost. Here, when the aforementioned equations (45) and (46) are substituted into the aforementioned equation (50), there is obtained the following equation (53):

$$Gfuel\_ff(k) = \frac{1}{STOIC\_AF} \cdot Gfuel\_drv(k) \cdot \frac{STOIC\_AF}{\phi comb(k)} \quad (53)$$
$$= \frac{GFuel\_drv(k)}{\phi comb(k)}$$

Further, when the above equation (53) is substituted into the aforementioned equation (51), there is obtained the following equation (54):

$$Gpost\_ff(k) = \frac{Gfuel\_drv(k)}{\phi comb(k)} - Gfuel\_drv(k) \quad (54)$$
$$= Gfuel\_drv(k) \cdot \left( \frac{1}{\phi comb(k)} - 1 \right)$$

As is apparent from the equation (54), the FF post injection amount Gpost_ff is calculated by multiplying the demanded fuel amount Gfuel_drv by a value $[(1/\phi comb)-1]$. Therefore, the FF post injection amount Gpost_ff is calculated as a larger value as the target equivalent ratio $\phi comb$ is smaller (i.e. the target equivalent ratio $\phi comb$ is a leaner value). As a consequence, as the target equivalent ratio $\phi comb$ is smaller, the post fuel injection amount Gpost is calculated as a larger value. For the same reason, as the target equivalent ratio $\phi comb$ is smaller, a ratio of the FF post injection amount Gpost_ff to the demanded fuel amount Gfuel_drv, i.e. a ratio of the FF post injection amount Gpost_ff to the torque fuel injection amount Gcomb becomes larger.

Next, the air-fuel ratio control process executed by the ECU 2 will be described with reference to FIG. 18. The present process controls the air-fuel ratio of exhaust gases between the three-way catalyst 10 and the DeNOx catalyst 12 while controlling the DeNOx catalyst temperature Tdnx. More specifically, the present process calculates the torque fuel injection amount Gcomb, the target boost pressure Boost_cmd, the target Inert-EGR amount Gegr_cmd and the post fuel injection amount Gpost, described above. The present process is carried out at a predetermined control period $\Delta Tk$.

In this process, first, in a step 1 (shown as S1 in abbreviated form in FIG. 18; the following steps are also shown in abbreviated form), it is determined whether or not an intake air device failure flag F_DEVNG is equal to 1. The intake air device failure flag F_DEVNG is set to 1 in a determination process, not shown, when any of intake air devices, such as the EGR control valve 7b and the vane actuator 6d, is faulty, and otherwise set to 0.

If the answer to the question of the step 1 is negative (NO), i.e. if the intake air devices are all normal, the process proceeds to a step 2, wherein it is determined whether or not an engine start flag F_ENGSTART is equal to 1. The engine start flag F_ENGSTART is set by determining in a determination process, not shown, whether or not engine start control is being executed, i.e. the engine 3 is being cranked, based on the ON/OFF state of the IG·SW 25 and the engine speed NE. More specifically, when the engine start control is being executed, the engine start flag F_ENGSTART is set to 1, and otherwise set to 0.

If the answer to the question of the step 2 is affirmative (YES), i.e. if the engine start control is being executed, the process proceeds to a step 3, wherein a start·pre-warmup control process is executed. In this start·pre-warmup control process, the torque fuel injection amount Gcomb, the target boost pressure Boost_cmd, the target Inert-EGR amount Gegr_cmd and the post fuel injection amount Gpost are set to respective predetermined start·pre-warmup control values. The predetermined start·pre-warmup control values are set to optimum values to be applied when the engine start control is being executed or when the three-way catalyst 10 is in an unactivated state. After executing the start·pre-warmup control process in the step 3 as described above, the present process is terminated.

On the other hand, if the answer to the question of the step 2 is negative (NO), i.e. if the engine start control is not being executed, the process proceeds to a step 4, wherein it is determined whether or not the three-way catalyst temperature Ttwc is higher than the aforementioned activation temperature Ttwc_act. If the answer to this question is negative (NO), i.e. if the three-way catalyst 10 is in the unactivated state, the step 3 is executed, followed by terminating the present process, as described above.

On the other hand, if the answer to the question of the step 4 is affirmative (YES), i.e. if the three-way catalyst 10 is in an activated state, the process proceeds to a step 5, wherein it is determined whether or not the DeNOx catalyst temperature Tdnx is higher than the above-mentioned activation temperature Tdnx_act. If the answer to this question is negative (NO), i.e. if the DeNOx catalyst 12 is in an unactivated state, the process proceeds to a step 6, wherein a DeNOx catalyst warmup control process is carried out.

Figure 19:
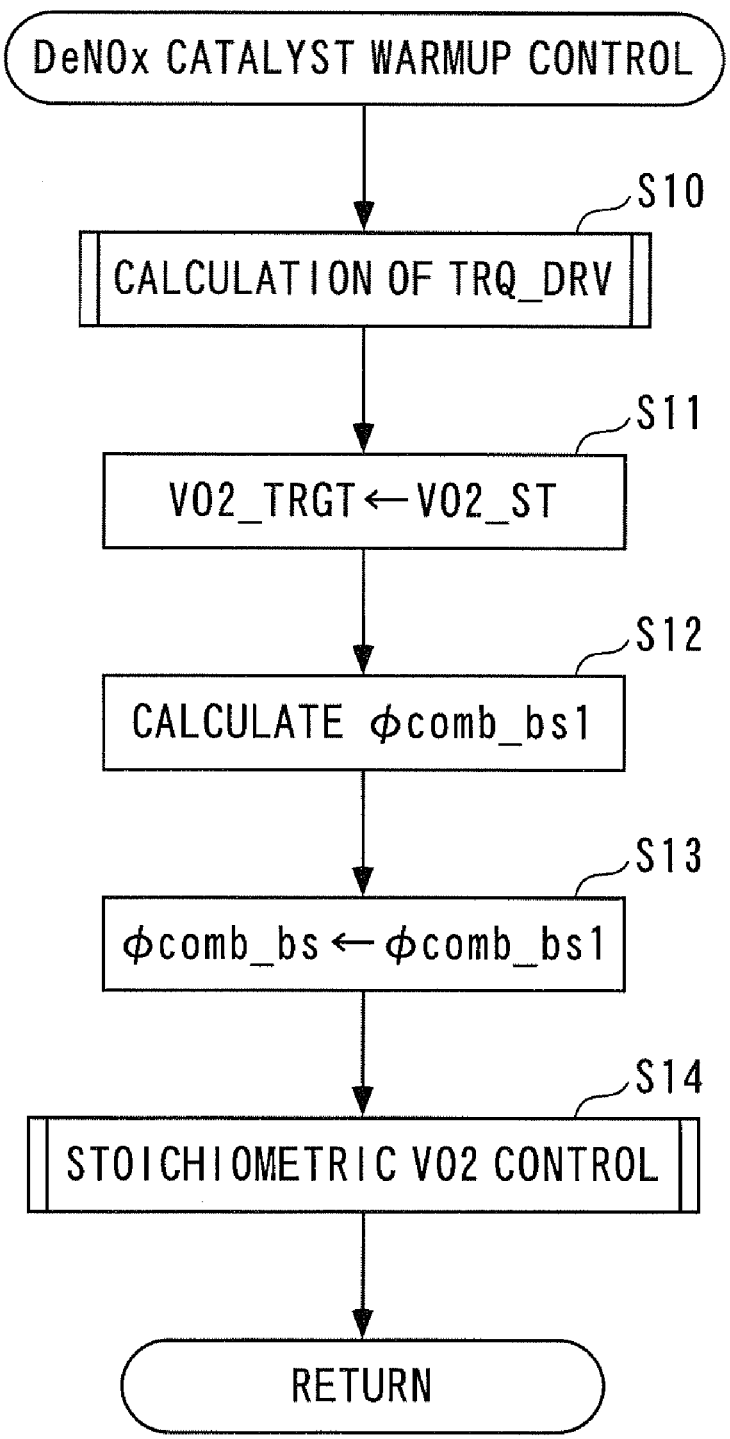
FIG. 19 is a flowchart of a DeNOx catalyst warmup control process.

The DeNOx catalyst warmup control process is specifically carried out as shown in FIG. 19. In this process, first, in a step 10, the demanded torque TRQ_DRV is calculated by the same method as employed by the aforementioned demanded torque-calculating section 30.

Next, the process proceeds to a step 11, wherein the target value VO2_TRGT is set to the aforementioned predetermined stoichiometric control value VO2_ST.

Then, in a step 12, the catalyst warmup control value $\phi comb\_bs1$ is calculated by searching the above-described map shown in FIG. 8 according to the demanded torque TRQ_DRV and the engine speed NE.

In a step 13 following the step 12, the basic equivalent ratio φcomb_bs is set to the catalyst warmup control value φcomb_bs1.

Next, the process proceeds to a step 14, wherein a stoichiometric VO2 control process is executed. In this stoichiometric VO2 control process, the torque fuel injection amount Gcomb, the target boost pressure Boost_cmd, the target Inert-EGR amount Gegr_cmd and the post fuel injection amount Gpost are calculated by the same methods employed by the DeNOx catalyst temperature controller 40, the post-TWO air-fuel ratio controller 50 and the main controller 60. After executing the stoichiometric VO2 control process in the step 14, as described above, the present process is terminated.

Referring again to FIG. 18, in the step 6, the DeNOx catalyst warmup control process is carried out as described above, followed by terminating the present process.

Figure 20:
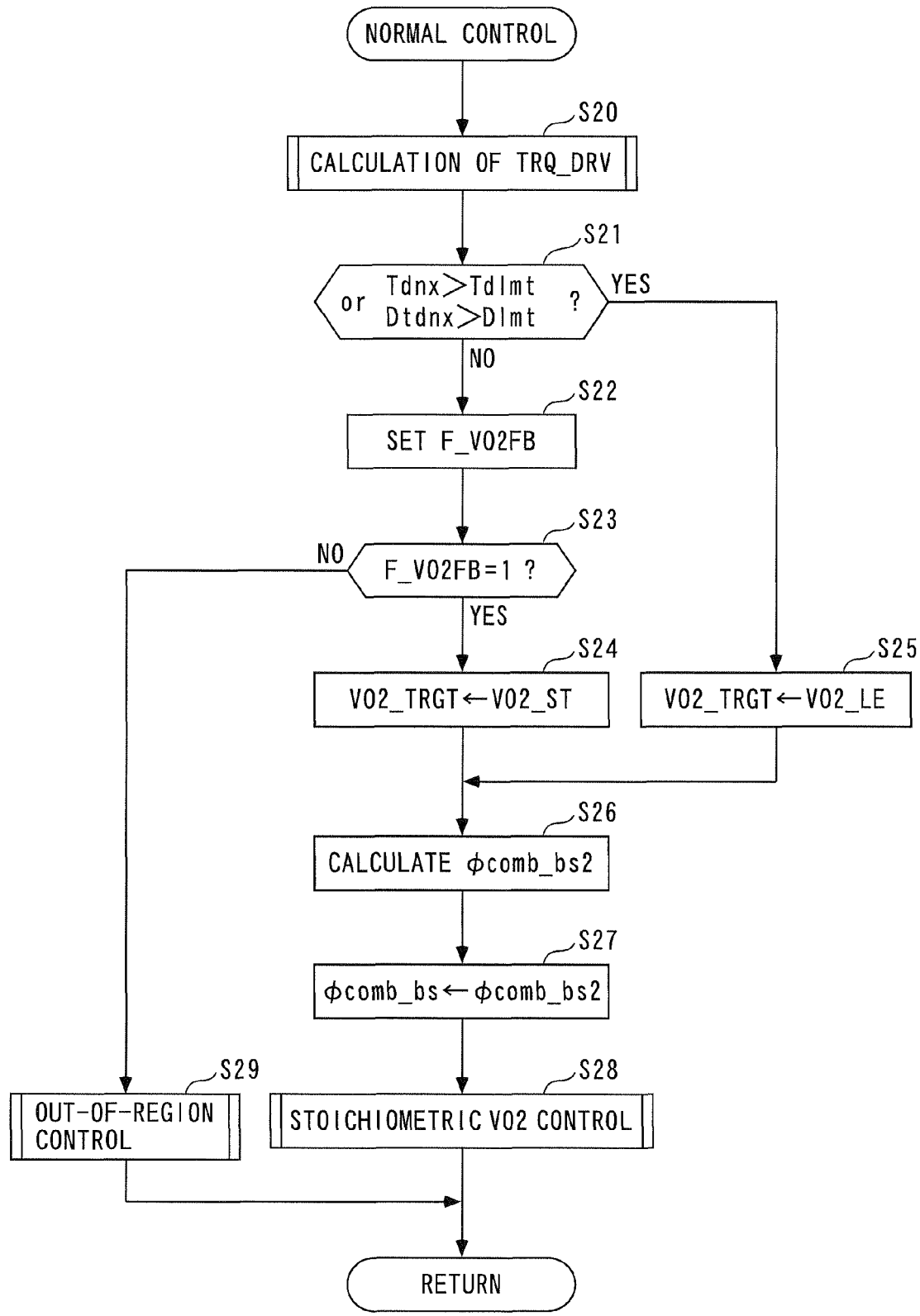
FIG. 20 is a flowchart of a normal control process.

On the other hand, if the question of the step 5 is affirmative (YES), i.e. if the DeNOx catalyst 12 is in the activated state, the process proceeds to a step 7, wherein a normal control process is carried out. This normal control process is specifically performed, as shown in FIG. 20.

In this process, first, in a step 20, the demanded torque TRQ_DRV is calculated by the same method as employed by the demanded torque-calculating section 30.

Then, the process proceeds to a step 21, wherein it is determined whether or not Tdnx>Tdlmt or Dtdnx>Dlmt holds. Here, Tdlmt represents a threshold value of the DeNOx catalyst temperature Tdnx, and it is set to such a value that when Tdnx>Tdlmt holds, the DeNOx catalyst 12 is estimated to be in the overheated state. Further, Dtdnx represents the amount of change in the DeNOx catalyst temperature, and is calculated as the difference [Tdnx(k)−Tdnx(k−1)] between the current value of the DeNOx catalyst temperature and the immediately preceding value thereof. Furthermore, Dlmt represents a threshold value of the amount of change in the DeNOx catalyst temperature, which is set to such a value that when Dtdnx>Dlmt holds, the temperature of the DeNOx catalyst 12 is estimated to increase at a very high rate.

Figure 21:
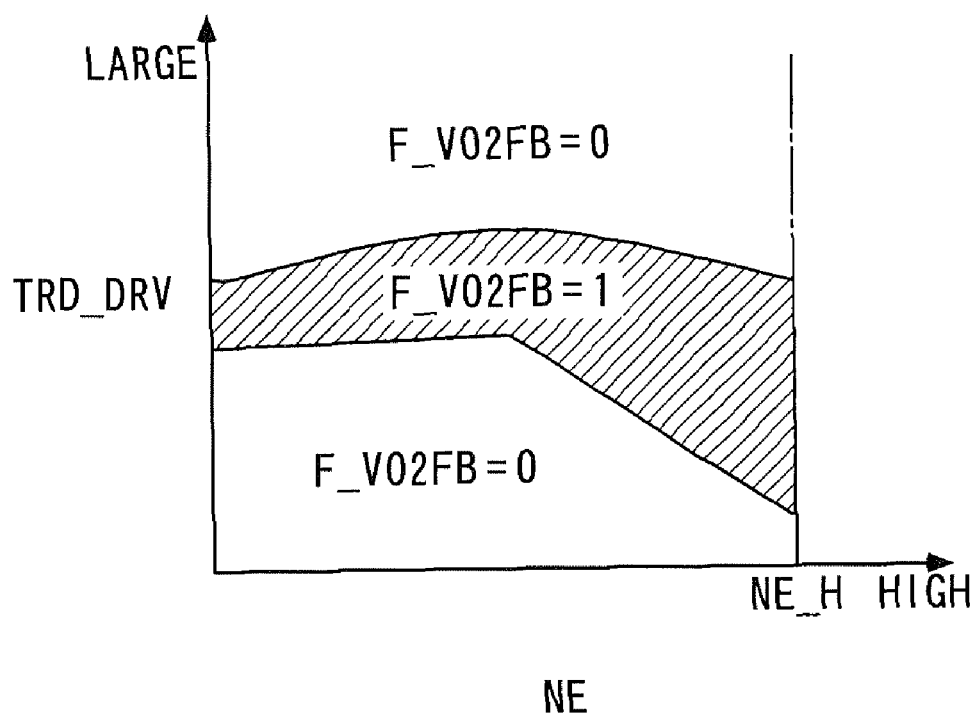
FIG. 21 is a view of an example of a map for use in setting an FB permission flag F_VO2FB.

If the answer to the question of the step 21 is negative (NO), the process proceeds to a step 22, wherein the value of the FB permission flag F_VO2FB is set by searching a map shown in FIG. 21 according to the demanded torque TRQ_DRV and the engine speed NE. The FB permission flag F_VO2FB indicates whether or not the above-described conditions for executing the VO2 feedback control process are satisfied. As shown in FIG. 21, when the combination of the demanded torque TRQ_DRV and the engine speed NE is in the region for executing the stoichiometric VO2 control, indicated by hatching in FIG. 21, the FB permission flag F_VO2FB is set to 1, whereas when the combination of the demanded torque TRQ_DRV and the engine speed NE is not in the region for executing the stoichiometric VO2 control, the FB permission flag F_VO2FB is set to 0.

Next, the process proceeds to a step 23, wherein it is determined whether or not the FB permission flag F_VO2FB is equal to 1. If the answer to this question is affirmative (YES), i.e. if the conditions for executing the VO2 feedback control process are satisfied, the process proceeds to a step 24, wherein the target value VO2_TRGT is set to the aforementioned stoichiometric control value VO2_ST.

On the other hand, if the answer to the question of the step 21 is affirmative (YES), it is judged that the DeNOx catalyst temperature Tdnx should be prevented from rising or be lowered, and the process proceeds to a step 25, wherein the target value VO2_TRGT is set to the aforementioned predetermined leaning control value VO2_LE.

In a step 26 following the above step 24 or 25, a VO2FB value φcomb_bs2 is calculated by searching the aforementioned FIG. 9 map according to the demanded torque TRQ_DRV and the engine speed NE.

Then, the process proceeds to a step 27, wherein the basic equivalent ratio φcomb_bs is set to the VO2FB value φcomb_bs2.

Next, in a step 28, the stoichiometric VO2 control process is executed, similarly to the above-mentioned step 14. That is, the torque fuel injection amount Gcomb, the target boost pressure Boost_cmd, the target Inert-FOR amount Gegr_cmd and the post fuel injection amount Gpost are calculated by the same methods employed by the DeNOx catalyst temperature controller 40, the post-TWC air-fuel ratio controller 50 and the main controller 60. After the stoichiometric VO2 control process is carried out in the step 28, as described above, the present process is terminated.

On the other hand, if the answer to the question of the step 23 is negative (NO), i.e. if the conditions for executing the VO2 feedback control process are not satisfied, the process proceeds to a step 29, wherein an out-of-region control process is carried out. In the out-of-region control process, the torque fuel injection amount Gcomb, the target boost pressure Boost_cmd, the target Inert-FOR amount Gegr_cmd and the post fuel injection amount Gpost are set to respective predetermined out-of-region control values, These predetermined out-of-region control values are set to optimum values to be applied when the combination of the demanded torque TRQ_DRV and the engine speed NE is not in the region for executing the stoichiometric VO2 control. After executing the out-of-region control process in the step 29, as described above, the present process is terminated.

Referring again to FIG. 18, in the step 7, the normal control process is carried out as described above, followed by terminating the present process.

On the other hand, if the answer to the question of the step 1 is affirmative (YES), i.e. if any of the intake air devices is faulty, the process proceeds to a step 8, wherein a failsafe control process is carried out. In the failsafe control process, the torque fuel injection amount Gcomb, the target boost pressure Boost_cmd, the target Inert-EGR amount Gegr_cmd and the post fuel injection amount Gpost are set to respective predetermined failsafe control values. These failsafe control values are set to values which make it possible to perform idling or very low-speed travelling of the engine 3. After executing the failsafe control process in the step 8, as described above, the present process is terminated.

Figure 18:
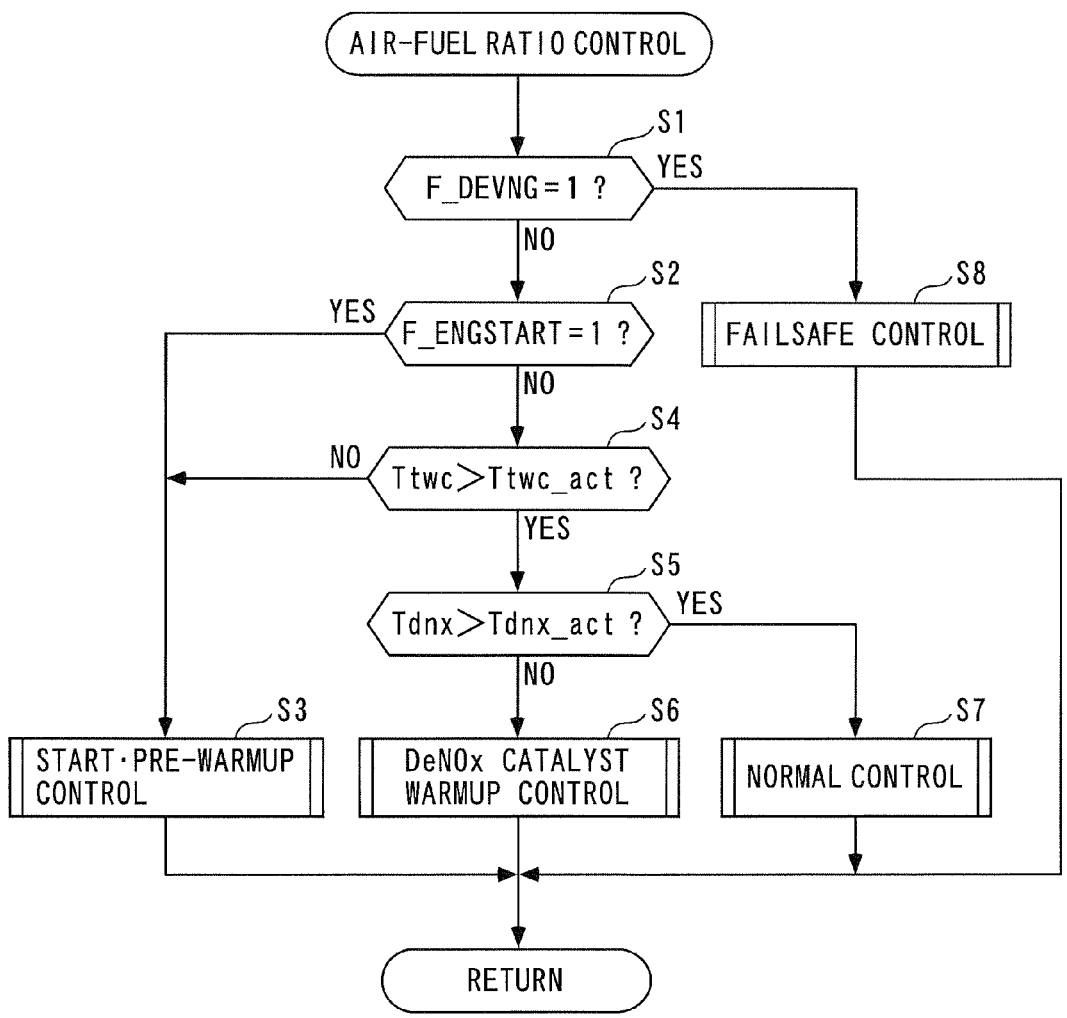
FIG. 18 is a flowchart of an air-fuel ratio control process.

After the four values Gcomb, Boost_cmd, Gegr_cmd and Gpost are calculated in the FIG. 18 air-fuel ratio control process, as described above, a control process, not shown, is executed to calculate control inputs to the fuel injection valves 4, the EGR control valve 7b and the vane actuator 6d, based on these values. Then, by supplying the control inputs from the ECU 2, the fuel injection valves 4, the EGR control valve 7b and the vane actuator 6d are controlled.

Figure 22:
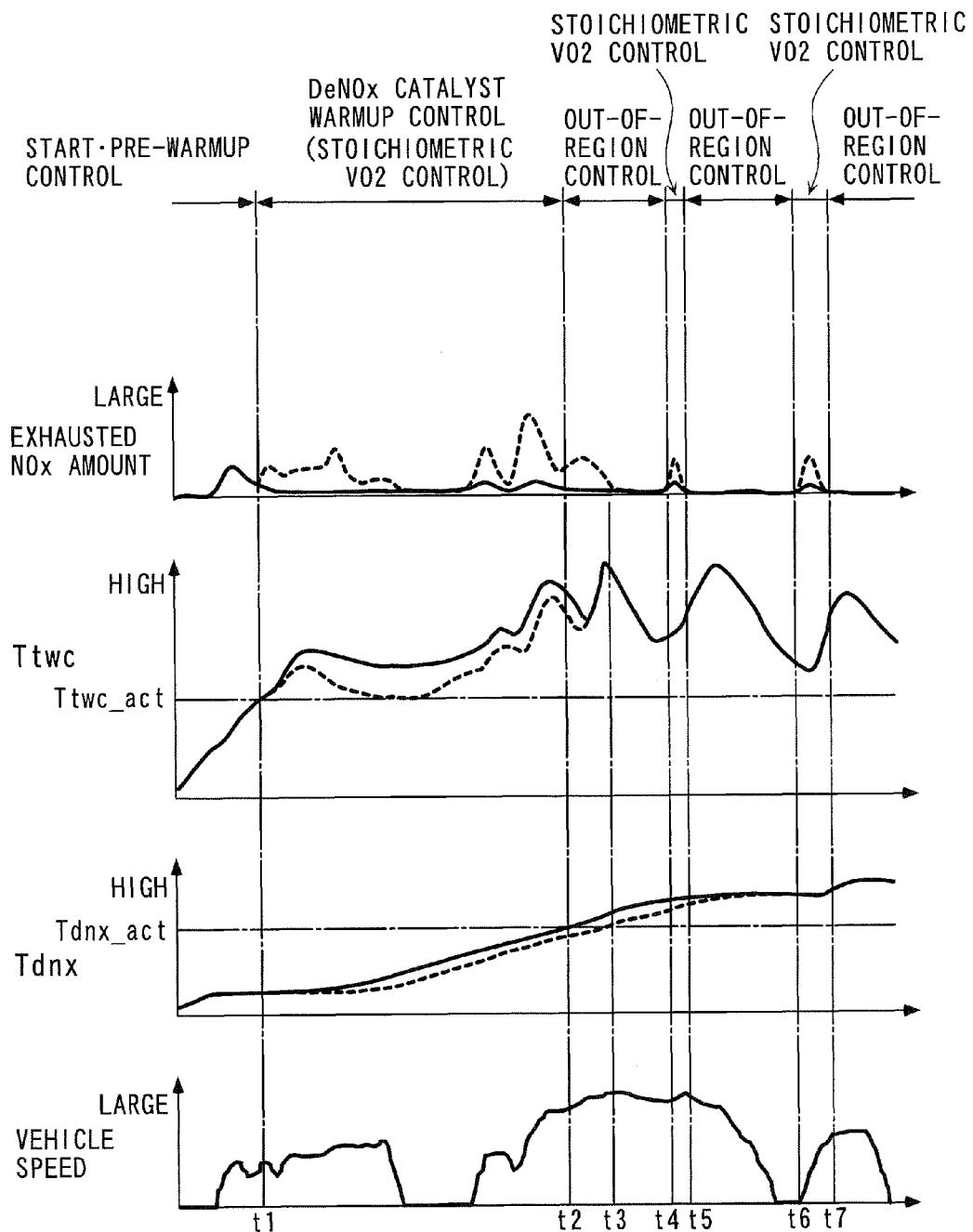
FIG. 22 is a timing diagram showing an example of the results of air-fuel ratio control that is performed by the control system according to the present embodiment.

Next, the results of control by the control system 1 according to the present embodiment configured as above will be described with reference to FIG. 22. In FIG. 22, curves in solid lines indicative of an exhausted NOx amount, the three-way catalyst temperature Ttwc and the DeNOx catalyst temperature Tdnx represent an example of control results obtained when the vehicle having the engine 3 installed thereon is operated in a predetermined running mode (hereinafter referred to as "Present Invention Example 1"), and for comparison, curves in broken lines indicative of the same represent an example of control results obtained when the equivalent ratio correction value Usmc_tdnx, the AIR-EGR correction value Usmc_AE and the FB post injection amount Dgpost are all held at 0 (hereinafter referred to as "Comparative Example 1").

More specifically, Comparative Example 1 represents the example of the control results obtained when φcomb=φcomb_bs, Gcyl_cmd=Gair_cmd_ff+Gegr_ff, Gegr_ff=Gegr_cmd, and Gpost=Gpost_ff hold. Further, In FIG. 22, the exhausted NOx amount represents the amount of NOx having passed through the DeNOx catalyst 12.

As is apparent from FIG. 22, from a time point (time point t1) when Ttwc>Ttwc_act holds, terminating the start·pre-warmup control process, in the case of Present Invention Example 1, the DeNOx catalyst warmup control, that is, the stoichiometric VO2 control is carried out, whereby it is understood that compared with Comparative Example 1, it is possible to suppress the exhausted NOx amount to ensure excellent reduction of exhaust emissions. Further to this, timing when Tdnx>Tdnx_act holds, that is, timing when the DeNOx catalyst 12 is activated is made earlier in Present Invention Example 1 (time point t2) than in Comparative Example 1 (time point t3). Therefore, it is understood that the DeNOx catalyst 12 can be activated more quickly in Present Invention Example 1.

Furthermore, it is understood that during accelerating operation of the engine 3 (between time points t4 and t5, and t6 and t7), although in Comparative Example 1, the exhausted NOx amount is temporarily increased, in Present Invention Example 1, by carrying out the stoichiometric VO2 control, it is possible to properly suppress the exhausted NOx amount to ensure excellent exhaust gas-purifying capability. From the above, it is understood that when the three-way catalyst 10 is in the activated state but at the same time the DeNOx catalyst 12 is in the unactivated state, the stoichiometric VO2 control method according to the present embodiment makes it possible to quickly warm up the DeNOx catalyst 12 while ensuring excellent reduction of exhaust emissions. In addition to this, it is understood that even during accelerating operation of the engine 3, it is possible to ensure excellent reduction of exhaust emissions.

Figure 23:
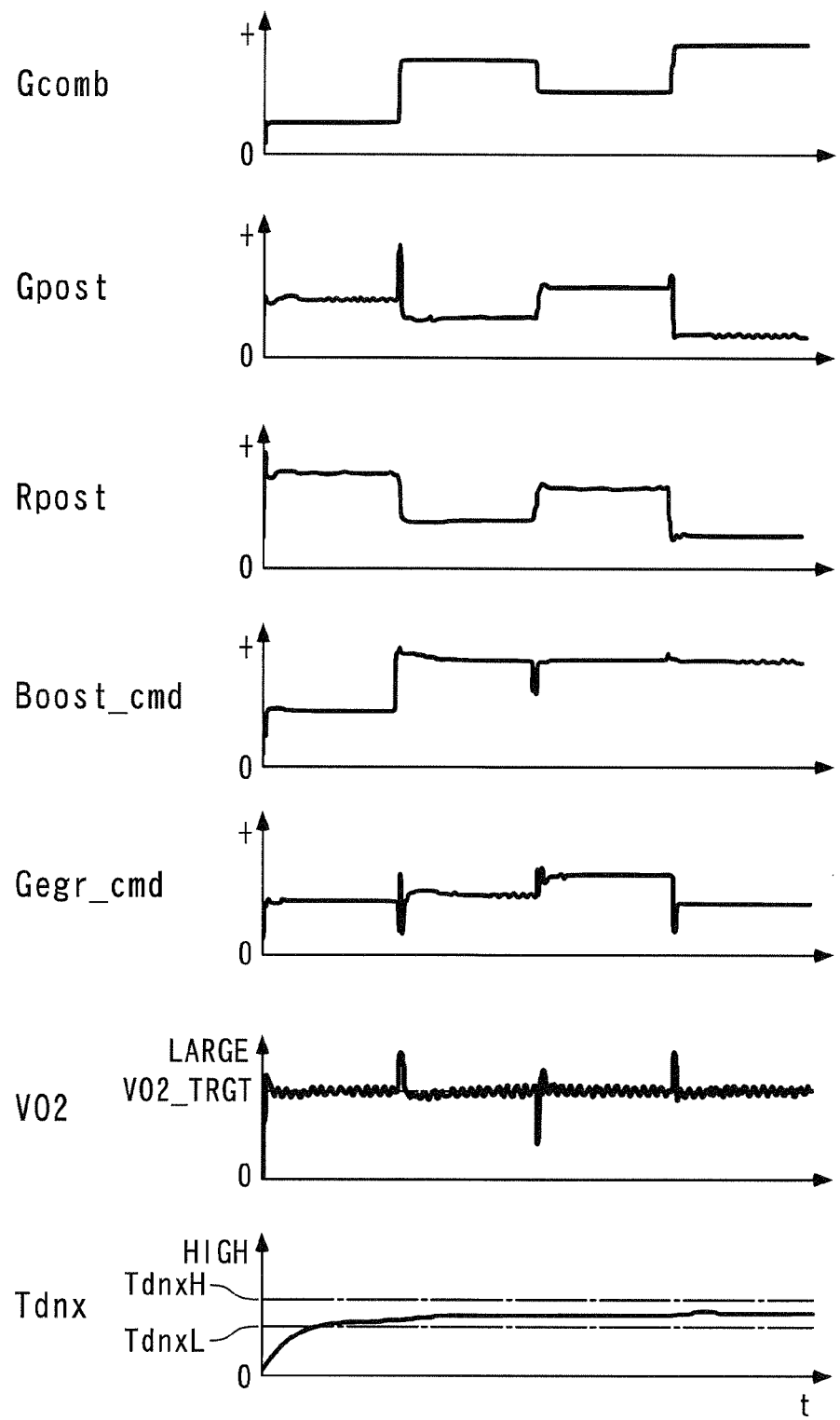
FIG. 23 is a timing diagram showing an example of the results of a simulation of the air-fuel ratio control that is performed by the control system according to the present embodiment.

Next, the results of a simulation of the air-fuel ratio control carried out by the control system 1 according to the present embodiment will be described with reference to FIGS. 23 and 24. First, FIG. 23 shows an example (Present Invention Example 2) of the results of a simulation of the air-fuel ratio control, obtained when the stoichiometric VO2 control is carried out by setting the target value VO2_TRGT to the stoichiometric control value VO2_ST in the control system 1 according to the present invention. In FIG. 23, Rpost represents a ratio of the post fuel injection amount Gpost to a total fuel injection amount Gfuel [i.e. Rpost=Gpost/(Gcomb+Gpost)].

Figure 24:
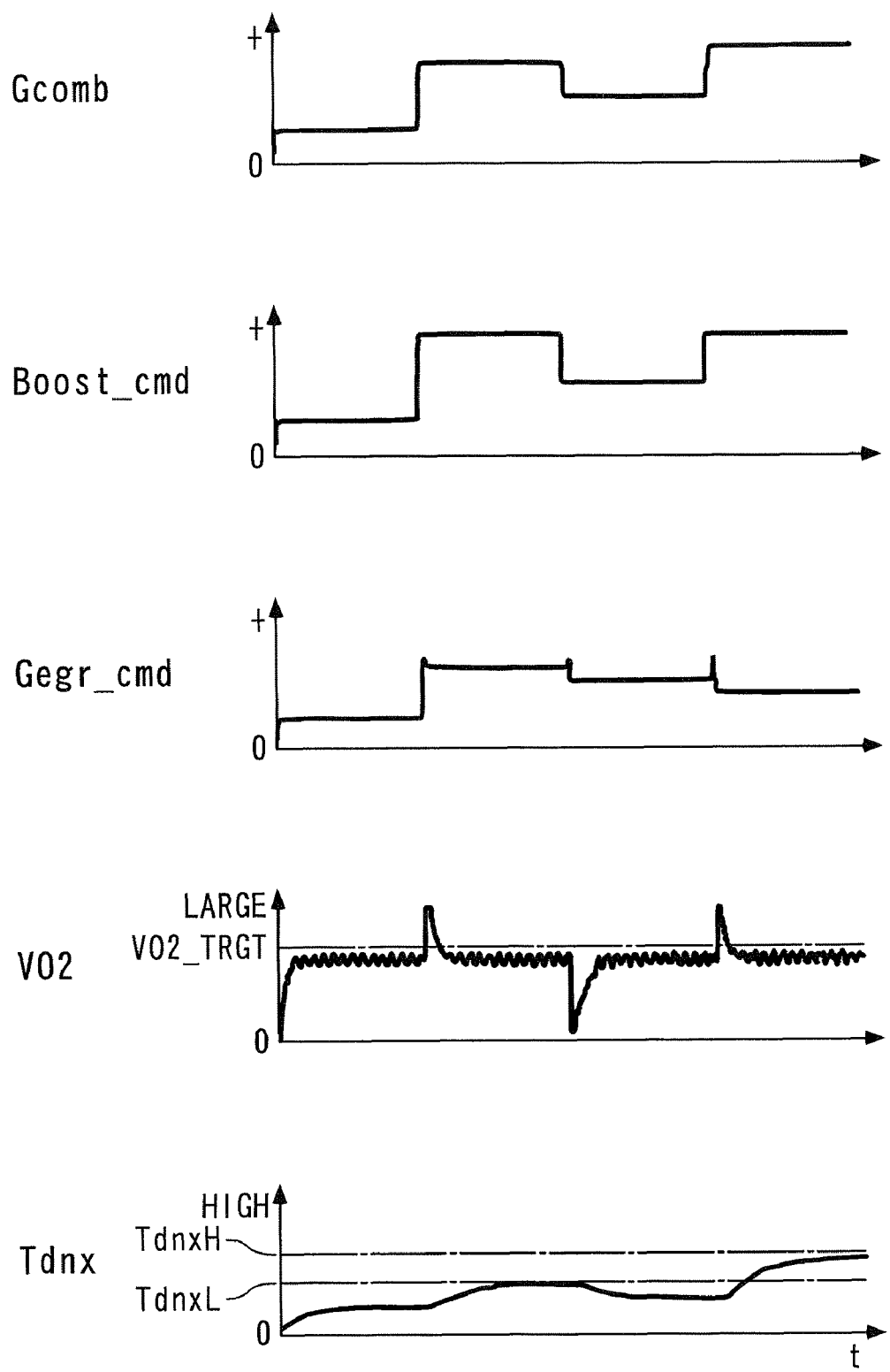
FIG. 24 is a timing diagram showing a comparative example of the results of a simulation of the air-fuel ratio control.

Further, FIG. 24 shows, for comparison, an example (Comparative Example 2) of the results of control obtained when the target value VO2_TRGT is set to the stoichiometric control value VO2_ST, and the three values Usmc·tdnx, Usmc_AE and Dgpost are all held at 0 so as to perform the stoichiometric VO2 control.

As is apparent from FIGS. 23 and 24, in the case of Comparative Example 2, the sensor output value VO2 does not converge to the target value VO2_TRGT, causing a steady-state deviation of the sensor output value VO2, whereas in the case of Present Invention Example 2, the sensor output value VO2 quickly converges to the target value VO2·TRGT, which makes it possible to ensure high control accuracy. Further, it is understood that in Comparative Example 2, the convergence of the DeNOx catalyst temperature Tdnx to the aforementioned high purification rate temperature range (TdnxL<Tdnx<TdnxH) is degraded. In contrast, in the case of Present Invention Example 2, it is understood that the DeNOx catalyst temperature Tdnx quickly converges to the high purification rate temperature range, which makes it possible to ensure a high NOx purification ratio.

As described hereinabove, according to the present embodiment, the basic equivalent ratio φcomb_bs is calculated as a leaner value than the stoichiometric air-fuel ratio, according to the engine speed NE and the demanded torque TRQ_DRV, and the equivalent ratio correction value Usmc_tdnx is calculated with the control algorithm expressed by the equations (2) to (12) such that the DeNOx catalyst temperature Tdnx is caused to converge to the target temperature Tdnx_TRGT. Then, the target equivalent ratio φcomb is calculated by correcting the basic equivalent ratio φcomb_bs by the equivalent ratio correction value Usmc_tdnx, and hence the target equivalent ratio φcomb is calculated as a value which is leaner than the stoichiometric air-fuel ratio and at the same time is capable of causing the DeNOx catalyst temperature Tdnx to converge to the target temperature Tdnx_TRGT.

Further, the demanded fuel amount Gfuel_drv, i.e. the torque fuel injection amount Gcomb is calculated according to the engine speed NE and the filtered value TRQ·DRV_f of the demanded torque TRQ_DRV, and the FF fresh air amount Gair_cmd_ff is calculated according to the demanded fuel amount Gfuel_drv and the target equivalent ratio φcomb. Then, based on the FF fresh air amount Gair_cmd_ff, the FF fuel amount Gfuel·ff is calculated as a fuel amount which will make it possible to make the air-fuel ratio of exhaust gases flowing into the three-way catalyst 10 equal to the stoichiometric air-fuel ratio, and the FF post injection amount Gpost_ff is calculated by subtracting the demanded fuel amount Gfuel_drv from the FF fuel amount Gfuel_ff. Therefore, the FF post injection amount Gpost_ff is calculated as an amount of fuel which is capable of causing the DeNOx catalyst temperature Tdnx to converge to the target temperature Tdnx_TRGT when the fuel supplied by post injection flows into the three-way catalyst 10 together with combustion gases generated according to the torque fuel injection amount Gcomb, and making the air-fuel ratio of exhaust gases flowing into the three-way catalyst 10 equal to the stoichiometric air-fuel ratio.

On the other hand, the FB post injection amount Dgpost is calculated with the control algorithm expressed by the equation (32) to (42) such that the sensor output value VO2 is caused to converge to the target output value VO2_TROT, and the post fuel injection amount Gpost is calculated by correcting the FF post injection amount Gpost_ff by the FB post injection amount Dgpost, so that the post fuel injection amount Gpost is calculated as a value which is capable of causing the DeNOx catalyst temperature Tdnx to converge to the target temperature Tdnx_TRGT, and at the same time causing the sensor output value VO2 to converge to the target output value VO2_TRGT.

Further, the output filtered value VO2_IPS is calculated by performing the ε filtering process on the sensor output value VO2 of the oxygen concentration sensor 22, and the AIR-EGR correction value Usmc_AE is calculated with the control algorithm expressed by the equations (17) to (27) such that the output filtered value VO2_IPS is caused to converge to the target output value VO2_TRGT. Then, by dividing the AIR-EGR correction value Usmc_AE based on the dividing rate DIVIDE_RATE, the FB fresh air amount Dgair and the FB·Inert-EGR amount Dgegr are calculated. Then, the FF·EGR amount Gegr_ff is calculated according to the FF fresh air amount Gair_cmd_ff, and the target Inert-EGR amount Gegr_cmd is calculated by correcting the FF·EGR amount Gegr_ff by the FB·Inert-EGR amount Dgegr, so that the target Inert-EGR amount Gegr_cmd as well is calculated as a value which is capable of causing the DeNOx catalyst temperature Tdnx to converge to the target temperature Tdnx_TRGT, and at the same time causing the sensor output value VO2 to converge to the target output value VO2_TRGT.

Furthermore, the target in-cylinder gas amount Gcyl_cmd is calculated by correcting the sum of the FF fresh air amount Gair_cmd_ff and the FF·EGR amount Gegr_ff by the FB fresh air amount Dgair, and the target boost pressure Boost_cmd is calculated based on the target in-cylinder gas amount Gcyl·cmd. Therefore, the target boost pressure Boost_cmd as well is calculated as a value which is capable of causing the DeNOx catalyst temperature Tdnx to converge to the target temperature Tdnx_TRGT, and at the same time causing the sensor output value VO2 to converge to the target output value VO2_TRGT. The torque fuel injection amount Gcomb, the target boost pressure Boost_cmd, the target Inert-EGR amount Gegr_cmd and the post fuel injection amount Gpost are calculated as described above, so that by using the values calculated as above, it is possible to cause the DeNOx catalyst temperature Tdnx to converge to the target temperature Tdnx_TRGT and at the same time cause the sensor output value VO2 to converge to the target output value VO2_TRGT.

Further, when the DeNOx catalyst temperature Tdnx converges to the target temperature Tdnx_TRGT, the DeNOx catalyst 12 can ensure excellent reduction of exhaust emissions since the DeNOx catalyst 12 is configured such that as shown in FIG. 11, referred to hereinabove, when the DeNOx catalyst temperature Tdnx is in the high purification rate temperature range (TdnxL<Tdnx<TdnxH) having the target temperature Tdnx_TRGT set to a median, the DeNOx catalyst 12 has a higher exhaust gas-purifying capability than when the DeNOx catalyst temperature Tdnx is not in the high purification rate temperature range. Further, when the sensor output value VO2 converges to the target output value VO2_TRGT, the three-way catalyst 10 can ensure excellent reduction of exhaust emissions since as shown in FIG. 13, referred to hereinabove, when the air-fuel ratio of exhaust gases on the downstream side of the three-way catalyst 10 is in the predetermined region including the stoichiometric air-fuel ratio (the area indicated by hatching in FIG. 13), the exhaust gas purification rate of the three-way catalyst 10 becomes most excellent. As a consequence, it is possible to improve the reduction of exhaust emissions.

Further, when Tdnx≦Tdnx_act holds and the DeNOx catalyst temperature Tdnx is not within a predetermined activation temperature range, the basic equivalent ratio φcomb_bs is set to the catalyst warmup control value φcomb_bs1 leaner than the VO2FB value φcomb_bs2, so that the post fuel injection amount Gpost is calculated as a larger value than when the basic equivalent ratio φcomb_bs is set to the VO2FB value φcomb_bs2. This makes it possible to increase the amount of heat generated by combustion of fuel injected according to the post fuel injection amount Gpost on the three-way catalyst 10, thereby making it possible to quickly cause the inactive state of the DeNOx catalyst 12 to be terminated.

Furthermore, the algorithm for calculating the FB fresh air amount Dgair and the FB·Inert-EGR amount Dgegr is configured to use the output filtered value VO2_IPS obtained by performing the ε filtering process on the sensor output value VO2 of the oxygen concentration sensor 22, and hence even when there exist play, wear and the like of component parts of the turbocharger 6 and the exhaust gas recirculation mechanism 7, by cutting off the high-frequency components of the sensor output value VO2, it is possible to suppress degradation of control accuracy caused by the above play, wear and the like of the component parts. In addition to this, even when the difference between the sensor output value VO2 and the target output value VO2_TRGT increases, it is possible to reduce the difference without causing delayed responses by the devices. From the above, it is possible to quickly secure appropriate engine output corresponding to the load on the engine 3 and at the same time ensure excellent reduction of exhaust emissions.

On the other hand, when TdnxML≦Tdnx≦TdnxMH holds, the response-specifying parameter VPOLE_Tdnx is set to VPOLE_Tdnx_L (<POLE_ae), whereby the DeNOx catalyst temperature controller 40 causes the DeNOx catalyst temperature Tdnx to the predetermined target temperature Tdnx_TRGT at a convergence rate lower than a convergence rate at which the post-TWO air-fuel ratio controller 50 causes the output filtered value VO2_IPS to converge to the target output value VO2_TRGT. Further, when Tdnx≦TdnxL or TdnxH≦Tdnx holds, the response-specifying parameter VPOLE_Tdnx is set to VPOLE_Tdnx_H (>POLE_ae), whereby the convergence rate of the DeNOx catalyst temperature Tdnx to the predetermined target temperature Tdnx_TRGT becomes higher than the convergence rate of the output filtered value VO2_IPS to the target output value VO2_TRGT. As a consequence, it is possible to avoid interaction between the two control processes executed by the two controllers 40 and 50. In addition to this, after TdnxML≦Tdnx≦TdnxMH holds, the output filtered value VO2_IPS, i.e. the sensor output value VO2 is controlled such that it converges to the target output value VO2_TRGT, and therefore after securing a high exhaust gas-purifying capability of the DeNOx catalyst 12, it is possible to secure a high exhaust gas-purifying capability of the three-way catalyst 10. As describe above, it is possible to ensure excellent reduction of exhaust emissions while avoiding interaction between the two control processes.

Furthermore, since the two response-specifying parameters POLE_ae and POLE_gp used by the post-TWO air-fuel ratio controller 50 are set to values which satisfy the relationship of POLE_ae<POLE_gp, it is possible to avoid interaction between the two control processes executed by the AIR-EGR SMC 53 and the post-injection SMC 55. In addition to this, since the convergence rate of the output filtered value VO2_IPS to the target output value VO2_TRGT in the AIR-EGR SMC 53 is made lower than the convergence rate of the sensor output value VO2 to the target output value VO2_TRGT in the post-injection SMC 55, no high responsiveness is required of the turbocharger 6 and the exhaust gas recirculation mechanism 7, which makes it possible to prolong the service lives of the turbocharger 6 and the exhaust gas recirculation mechanism 7.

In addition to this, when Tdnx>Tdlmt or Dtdnx>Dlmt holds, which means that the DeNOx catalyst 12 is in the overheated state or the temperature of the DeNOx catalyst 12 rises at a very high rate, the target output value VO2_TRGT is set to the predetermined leaning control value VO2_LE leaner than the stoichiometric control value VO2_ST, and hence it is possible to quickly avoid the overheated state of the DeNOx catalyst 12 or the sudden increase in the temperature of the DeNOx catalyst 12, thereby making it possible to suppress degradation of the DeNOx catalyst 12. As a consequence, it is possible to maintain excellent reduction of exhaust emissions for a longer time period.

Further, the post-injection SMC 55 uses the forgetting coefficient λgp when calculating the adaptive law input Uadp_gp used in the algorithm for calculating the FB post injection amount Dgpost, so that as the computing operation proceeds, the calculated value Uadp_gp_cal converges to 0, and the adaptive law input Uadp_gp converges to 0. This makes it possible to reduce the post fuel injection amount Gpost, thereby making it possible to improve fuel economy. In addition to this, the steady-state deviation of the sensor output value VO2 from the target value VO2_TRGT is finally absorbed by the AIR-EGR SMC 53, so that it is possible to suppress an extra rise in the DeNOx catalyst temperature Tdnx.

Although in the above-described embodiment, the three-way catalyst 10 is used as the first exhaust gas purification device, by way of example, the first exhaust gas purification device according to the present invention is not limited to this, but any suitable first exhaust gas purification device may be used insofar as it is configured to purify exhaust gases and have a higher exhaust gas-purifying capability when the air-fuel ratio of exhaust gases on the downstream side of the device is in a predetermined air-fuel ratio region including a predetermined value than when the air-fuel ratio is not in the predetermined air-fuel ratio region. For example, as the first exhaust gas purification device, there may be used a DPF in which platinum or the like is supported and has exhaust gas-purifying characteristics equivalent to those of the three-way catalyst.

Further, although in the above-described embodiment, the DeNOx catalyst 12 is used as the second exhaust gas purification device, by way of example, the second exhaust gas purification device according to the present invention is not limited to this, but any suitable second exhaust gas purification device may be used insofar as it is disposed on the downstream side of the first exhaust gas purification device to purify exhaust gases and have a higher exhaust gas-purifying capability when the temperature thereof is in a predetermined temperature range than when the temperature thereof is not in the predetermined temperature range. For example, as the second exhaust gas purification device, there may be used a urea selective reduction catalyst which selectively reduces NOx in exhaust gases under an atmosphere where urea exists as a reducing agent, a DPF in which platinum is supported, and a combination of a DeNOx catalyst and the DPF.

Furthermore, although in the above-described embodiment, the amount of fuel corresponding to the post fuel injection amount Gpost is injected from each fuel injection valve 4 into the associated cylinder 3a in the predetermined timing between the expansion stroke and the intake stroke, by way of example, the method for supplying unburned fuel to the first exhaust gas purification device, according to the present invention, is not limited to this, but any suitable method may be employed insofar as it can supply unburned fuel to the first exhaust gas purification device. For example, unburned fuel may be supplied to the first exhaust gas purification device by a method in which the unburned fuel is directly injected into the exhaust passage by a fuel injection valve disposed in the exhaust passage at a location upstream of the first exhaust gas purification device.

Further, although in the above-described embodiment, the DeNOx catalyst temperature Tdnx is used as the temperature of the exhaust system, by way of example, the temperature of the exhaust system according to the present invention is not limited to this, but any suitable temperature may be employed insofar as it represents the temperature of the exhaust system. For example, the temperature of the first exhaust gas purification device may be used as the temperature of the exhaust system.

Further, although in the above-described embodiment, the equations (2) to (12) are used as the first control algorithm, by way of example, the first control algorithm according to the present invention is not limited to this, but any suitable control algorithm may be employed insofar as it includes a predetermined feedback control algorithm and calculates an air-fuel ratio parameter correction value such that the temperature of the exhaust system is caused to converge to a predetermined target temperature. For example, as the first control algorithm, there may be used a control algorithm including a PID control algorithm or a control algorithm including a response-specifying control algorithm, such as a back stepping control algorithm.

Furthermore, although in the above-described embodiment, the equations (32) to (42) are used as the second control algorithm, by way of example, the second control algorithm according to the present invention is not limited to this, but any suitable control algorithm may be employed insofar as it includes a predetermined feedback control algorithm and calculates a fuel amount correction value such that the output value from the oxygen concentration-detecting means is caused to converge to a target output value. For example, as the second control algorithm, there may be used a control algorithm including a PID control algorithm or a control algorithm including a response-specifying control algorithm, such as a back stepping control algorithm.

Further, although in the above-described embodiment, the equations (14) to (27), (29) and (31) are used as the third control algorithm, by way of example, the third control algorithm according to the present invention is not limited to this, but any suitable control algorithm may be employed insofar as it includes a predetermined feedback control algorithm and calculates a gas amount correction value such that the output value from the oxygen concentration-detecting means is caused to converge to a target output value. For example, as the third control algorithm, there may be used a control algorithm including a PID control algorithm or a control algorithm including a response-specifying control algorithm, such as a back stepping control algorithm.

Further, although in the above-described embodiment, the equations (14) to (28) and (30) are used as the fourth control algorithm, by way of example, the fourth control algorithm according to the present invention is not limited to this, but any suitable control algorithm may be employed insofar as it includes a predetermined feedback control algorithm and calculates a fresh air amount correction value such that the output value from the oxygen concentration-detecting means is caused to converge to a target output value. For example, as the fourth control algorithm, there may be used a control algorithm including a PID control algorithm or a control algorithm including a response-specifying control algorithm, such as a back stepping control algorithm.

Furthermore, although in the above-described embodiment, the target value $\phi$comb of the equivalent ratio of the combustion air-fuel mixture (target equivalent ratio $\phi$comb) is used as the target air-fuel ratio parameter, by way of example, the target air-fuel ratio parameter according to the present invention is not limited to this, but any suitable target air-fuel ratio parameter may be employed insofar as it serves as a target of the air-fuel ratio parameter indicative of the air-fuel ratio of the combustion air-fuel mixture. For example, as the air-fuel ratio parameter, there may be used the air-fuel ratio itself of the combustion air-fuel mixture, and as the target air-fuel ratio parameter, there may be used the target value of the air-fuel ratio itself of the combustion air-fuel mixture.

Although in the above-described embodiment, the turbocharger 6 is used as the variable fresh air amount mechanism, by way of example, the variable fresh air amount mechanism according to the present invention is not limited to this, but any suitable variable fresh air amount mechanism may be used insofar as it can change the fresh air amount. For example, a valve mechanism, such as a throttle valve mechanism or an intake shutter valve mechanism, which is capable of changing the area of the opening of the intake passage, may be used as the variable fresh air amount mechanism. In this case, the sum of the FF fresh air amount Gair_cmd_ff and the FB fresh air amount Dgair may be set as the corrected target fresh air amount according to which the valve mechanism is controlled.

Further, although in the above-described embodiment, the exhaust gas recirculation mechanism 7 is used as the variable inert gas amount mechanism, by way of example, the variable inert gas amount mechanism according to the present invention is not limited to this, but any suitable variable inert gas amount mechanism may be used insofar as it is capable of changing the amount of inert gases supplied to the cylinders. For example, a variable lift mechanism for changing the lift of each intake valve and that of each exhaust valve and/or a variable cam phase mechanism for changing the phase of the camshaft with respect to the crankshaft may be used as the variable inert gas amount mechanism, to thereby change an internal EGR amount as an inert gas amount.

Furthermore, although in the above-described embodiment, the ε filtering process is employed as a predetermined filtering process, by way of example, the filtering process according to the present invention is not limited to this, but any suitable filtering process may be used insofar as it is capable of calculating the output filtered value in the state where the high-frequency components of the output value from the oxygen concentration-detecting means are cut off and at the same time the output filtered value has no phase delay with respect to the output value. For example, the ε filtering process may be replaced by a combination of a moving average filtering process or a median filtering process and the ε filtering process. Further, the ε filtering process may be replaced by a filtering process using an algorithm expressed by the following equations (55) to (57).

$$VO2\_IPS(k) = -Kfsc \cdot VO2\_IPS(k-1) + (1+Kfsc)VO2(k) \quad (55)$$

$$\text{When } |VO2(k)-VO2(k-1)| > DVO2\_REF, Kfsc=Kfsc1 \quad (56)$$

$$\text{When } |VO2(k)-VO2(k-1)| \leq DVO2\_REF, Kfsc=Kfsc2 \quad (57)$$

In the above equation (55), Ksfc represents a filter coefficient. As shown in the equations (56) and (57), Ksfc is set to one of two values Ksfc1 and Ksfc2 based on the result of a comparison between the absolute value |VO2(k)−VO2(k−1)| of the difference between the current value of the sensor output value VO2 and the immediately preceding value thereof, and a predetermined positive value DVO2_REF. These values Ksfc1 and Ksfc2 are predetermined negative values set such that −1<Ksfc2<Ksfc1<0 holds. Particularly, the predetermined value Ksfc2 is set to a value close to −1, and the predetermined value Ksfc1 is set to a value close to 0.

Even when a filtering process using the above algorithm is employed, similarly to the case where the ε filtering process is employed, it is possible to calculate the output filtered value VO2_IPS in the state where the high-frequency components of the sensor output value VO2 are cut off and at the same time in a manner such that the output filtered value has no phase delay with respect to the sensor output value VO2.

Further, although in the above-described embodiment, the stoichiometric VO2 control process is carried out by setting the target output value VO2_TRGT to the predetermined leaning control value VO2_LE if the answer to the question of the step 21 in FIG. 20 is affirmative (YES), that is, when the DeNOx catalyst 12 is in the overheated state or the temperature of the DeNOx catalyst 12 rises at a very high rate, this method may be replaced by the following control method: For example, if the answer to the question of the step 21 is affirmative (YES), in the stoichiometric VO2 control process, a method of holding the basic equivalent ratio φcomb_bs at 1 or a method of holding the FB post injection amount Dgpost at 0 may be employed irrespective of a combination of the demanded torque TRQ_DRV and the engine speed NE. Even with such control, it is possible to cause the overheated state of the DeNOx catalyst 12 to be terminated or reduce the speed at which the temperature of the DeNOx catalyst 12 rises.

It is further understood by those skilled in the art that the foregoing are preferred embodiments of the invention, and that various changes and modifications may be made without departing from the spirit and scope thereof.

What is claimed is:

1. A control system for an internal combustion engine that has an exhaust system provided with a first exhaust gas purification device for purifying exhaust gases, the engine having fresh air drawn into a cylinder, fuel for combustion in the cylinder being supplied to the cylinder as first fuel, and unburned fuel being supplied to the first exhaust gas purification device as second fuel, the control system controlling an amount of the fresh air, an amount of the first fuel and an amount of the second fuel to thereby control an exhaust system temperature as a temperature of the exhaust system, and an air-fuel ratio of exhaust gases on a downstream side of the first exhaust gas purification device, the control system comprising:
exhaust system temperature-detecting means for detecting the temperature of the exhaust system;
oxygen concentration-detecting means provided at a location downstream of the first exhaust gas purification device, for outputting a signal indicative of a concentration of oxygen in exhaust gases;
target output value-setting means for setting a target output value that serves as a target of an output value from said oxygen concentration-detecting means;
first fuel amount-calculating means for calculating the amount of the first fuel;
target air-fuel ratio parameter-calculating means for calculating a target air-fuel ratio parameter, which serves as a target of an air-fuel ratio parameter indicative of an air-fuel ratio of a combustion air-fuel mixture, such that the target air-fuel ratio parameter becomes leaner than an air-fuel ratio parameter of the combustion air-fuel mixture at which the output value from said oxygen concentration-detecting means becomes the target output value;
air-fuel ratio parameter correction value-calculating means for calculating an air-fuel ratio parameter correction value with a first control algorithm including a predetermined feedback control algorithm such that the exhaust system temperature is caused to converge to a predetermined target temperature;
corrected target air-fuel ratio parameter-calculating means for calculating a corrected target air-fuel ratio parameter by correcting the target air-fuel ratio parameter by the air-fuel ratio parameter correction value;
target fresh air amount-calculating means for calculating a target fresh air amount that serves as a target of the amount of the fresh air, according to the corrected target air-fuel ratio parameter and the amount of the first fuel;
target fuel amount-calculating means for calculating a fuel amount required for generating the combustion air-fuel mixture which makes the output value from said oxygen concentration-detecting means become the target output value, as a target fuel amount, according to the target fresh air amount;

fuel amount correction value-calculating means for calculating a fuel amount correction value with a second control algorithm including a predetermined feedback control algorithm such that the output value from said oxygen concentration-detecting means is caused to converge to the target output value; and second fuel amount-calculating means for calculating the amount of the second fuel using the target fuel amount, the amount of the first fuel and the fuel amount correction value.

2. A control system as claimed in claim 1, wherein the first exhaust gas purification device is configured such that when the output value from said oxygen concentration-detecting means is within a predetermined output range including the target output value, the first exhaust gas purification device has a higher exhaust gas-purifying capability than when the output value from said oxygen concentration-detecting means is not within the predetermined output range, wherein the exhaust system of the engine further includes a second exhaust gas purification device separate from the first exhaust gas purification device, for purifying exhaust gases, wherein the predetermined target temperature is set to a value within a predetermined temperature range, and wherein the second exhaust gas purification device is configured such that when the exhaust system temperature is within the predetermined temperature range, the second exhaust gas purification device has a higher exhaust gas-purifying capability than when the exhaust system temperature is not within the predetermined temperature range.

3. A control system as claimed in claim 2, wherein the engine includes a variable inert gas amount mechanism that is capable of changing an amount of inert gases supplied to the cylinder, the control system further comprising load parameter-detecting means for detecting a load parameter indicative of load on the engine, wherein said first fuel amount-calculating means calculates the amount of the first fuel according to the load parameter, the control system further comprising:

target gas amount-calculating means for calculating a target gas amount, which serves as a target of the amount of the inert gases, according to the amount of the first fuel;

gas amount correction value-calculating means for calculating a gas amount correction value with a third control algorithm including a predetermined feedback control algorithm such that the output value from said oxygen concentration-detecting means is caused to converge to the target output value;

corrected target gas amount-calculating means for calculating a corrected target gas amount by correcting the target gas amount by the gas amount correction value; and inert gas amount control means for controlling the amount of the inert gases by controlling the variable inert gas amount mechanism according to the corrected target gas amount.

4. A control system as claimed in claim 3, wherein in the third control algorithm, a predetermined filtering process is performed on the output value from said oxygen concentration-detecting means, whereby an output filtered value is calculated in a state where high-frequency components of the output value are cut off and at the same time the output filtered value has no phase delay with respect to the output value, and the gas amount correction value is calculated such that the output filtered value converges to the target output value.

5. A control system as claimed in claim 4, wherein in the first control algorithm, when the exhaust system temperature is within the predetermined temperature range, a convergence rate of the exhaust system temperature to the predetermined target temperature is configured to be lower than a convergence rate of the output filtered value to the target output value in the third control algorithm, whereas when the exhaust system temperature is not within the predetermined temperature range, the convergence rate of the exhaust system temperature to the predetermined target temperature is configured to be higher than the convergence rate of the output filtered value to the target output value in the third control algorithm.

6. A control system as claimed in claim 4, wherein in the third control algorithm, a convergence rate of the output filtered value to the target output value is configured to be lower than a convergence rate of the output value from said oxygen concentration-detecting means to the target output value in the second control algorithm.

7. A control system as claimed in claim 2, wherein the engine includes a variable fresh air amount mechanism that is capable of changing the amount of the fresh air, the control system further comprising load parameter-detecting means for detecting a load parameter indicative of load on the engine, wherein said first fuel amount-calculating means calculating the amount of the first fuel according to the load parameter, the control system further comprising:

fresh air amount correction value-calculating means for calculating a fresh air amount correction value with a fourth control algorithm including a predetermined feedback control algorithm such that the output value from said oxygen concentration-detecting means is caused to converge to the target output value;

corrected target fresh air amount-calculating means for calculating a corrected target fresh air amount by correcting the target fresh air amount by the fresh air amount correction value; and fresh air amount control means for controlling the amount of the fresh air by controlling the variable fresh air amount mechanism according to the corrected target fresh air amount.

8. A control system as claimed in claim 7, wherein said fresh air amount correction value-calculating means performs a predetermined filtering process on the output value from said oxygen concentration-detecting means, to thereby calculate an output filtered value in a state where high-frequency components of the output value are cut off and at the same time the output filtered value has no phase delay with respect to the output value, and calculates the fresh air amount correction value with the fourth control algorithm such that the output filtered value converges to the target output value.

9. A control system as claimed in claim 8, wherein in the first control algorithm, when the exhaust system temperature is within the predetermined temperature range, a convergence rate of the exhaust system temperature to the predetermined target temperature is configured to be lower than a convergence rate of the output filtered value to the target output value in the fourth control algorithm, whereas when the exhaust system temperature is not within the predetermined temperature range, the convergence rate of the exhaust system temperature to the predetermined target temperature is configured to be higher than the convergence rate of the output filtered value to the target output value in the fourth control algorithm.

10. A control system as claimed in claim 8, wherein in the fourth control algorithm, a convergence rate of the output filtered value to the target output value is configured to be lower than a convergence rate of the output value from said oxygen concentration-detecting means to the target output value in the second control algorithm.

11. A control system as claimed in claim 2, wherein in the first control algorithm, when the exhaust system temperature is within the predetermined temperature range, a convergence rate of the exhaust system temperature to the predetermined target temperature is configured to be lower than when the exhaust system temperature is not within the predetermined temperature range.

12. A control system as claimed in claim 2, wherein the second exhaust gas purification device has a characteristic of being activated when the exhaust system temperature is within a predetermined activation temperature range,
   wherein when the exhaust system temperature is within a temperature range lower than the predetermined activation temperature range, said target air-fuel ratio parameter-calculating means calculates the target air-fuel ratio parameter as a leaner value than when the exhaust system temperature is within the predetermined activation temperature range.

13. A control system as claimed in claim 2, wherein the exhaust system temperature is a device temperature indicative of a temperature of the second exhaust gas purification device,
   wherein the second exhaust gas purification device is disposed in the exhaust system at a location downstream of the first exhaust gas purification device, and has a characteristic of being activated when the device temperature is within a predetermined activation temperature range, and
   wherein when one of a condition in which the device temperature is within a temperature range higher than the predetermined activation temperature range, and a condition in which the device temperature increases at a higher speed than a predetermined speed is satisfied, said target output value-setting means sets the target output value to an output value from said oxygen concentration-detecting means, which is to be output when the concentration of oxygen in exhaust gases is higher, than when the one of the conditions is not satisfied.

14. A control system as claimed in claim 1, wherein in the second control algorithm, the fuel amount correction value is calculated such that the fuel amount correction value includes a control input term for compensating for a steady-state deviation between the output value from said oxygen concentration-detecting means and the target output value, and the control input term is calculated while performing a predetermined forgetting process thereon.

15. A method of controlling an internal combustion engine that has an exhaust system provided with a first exhaust gas purification device for purifying exhaust gases, the engine having fresh air drawn into a cylinder, fuel for combustion in the cylinder being supplied to the cylinder as first fuel, and unburned fuel being supplied to the first exhaust gas purification device as second fuel, the method controlling an amount of the fresh air, an amount of the first fuel and an amount of the second fuel to thereby control an exhaust system temperature as a temperature of the exhaust system, and an air-fuel ratio of exhaust gases on a downstream side of the first exhaust gas purification device, the method comprising:
   an exhaust system temperature-detecting step of detecting the temperature of the exhaust system;
   an oxygen concentration-detecting step of detecting a concentration of oxygen in exhaust gases provided at a location downstream of the first exhaust gas purification device, and outputting a signal indicative of the detected concentration of oxygen;
   a target output value-setting step of setting a target output value that serves as a target of an output value output in said oxygen concentration-detecting step;
   a first fuel amount-calculating step of calculating the amount of the first fuel;
   a target air-fuel ratio parameter-calculating step of calculating a target air-fuel ratio parameter, which serves as a target of an air-fuel ratio parameter indicative of an air-fuel ratio of a combustion air-fuel mixture, such that the target air-fuel ratio parameter becomes leaner than an air-fuel ratio parameter of the combustion air-fuel mixture at which the output value output in said oxygen concentration-detecting step becomes the target output value;
   an air-fuel ratio parameter correction value-calculating step of calculating an air-fuel ratio parameter correction value with a first control algorithm including a predetermined feedback control algorithm such that the exhaust system temperature is caused to converge to a predetermined target temperature;
   a corrected target air-fuel ratio parameter-calculating step of calculating a corrected target air-fuel ratio parameter by correcting the target air-fuel ratio parameter by the air-fuel ratio parameter correction value;
   a target fresh air amount-calculating step of calculating a target fresh air amount that serves as a target of the amount of the fresh air, according to the corrected target air-fuel ratio parameter and the amount of the first fuel;
   a target fuel amount-calculating step of calculating a fuel amount required for generating the combustion air-fuel mixture which makes the output value output in said oxygen concentration-detecting step become the target output value, as a target fuel amount, according to the target fresh air amount;
   a fuel amount correction value-calculating step of calculating a fuel amount correction value with a second control algorithm including a predetermined feedback control algorithm such that the output value output in said oxygen concentration-detecting step is caused to converge to the target output value; and
   a second fuel amount-calculating step of calculating the amount of the second fuel using the target fuel amount, the amount of the first fuel and the fuel amount correction value.

16. A method as claimed in claim 15, wherein the first exhaust gas purification device is configured such that when the output value output in said oxygen concentration-detecting step is within a predetermined output range including the target output value, the first exhaust gas purification device has a higher exhaust gas-purifying capability than when the output value output in said oxygen concentration-detecting step is not within the predetermined output range,
   wherein the exhaust system of the engine further includes a second exhaust gas purification device separate from the first exhaust gas purification device, for purifying exhaust gases,
   wherein the predetermined target temperature is set to a value within a predetermined temperature range, and wherein the second exhaust gas purification device is configured such that when the exhaust system temperature is within the predetermined temperature range, the second exhaust gas purification device has a higher exhaust gas-purifying capability than when the exhaust system temperature is not within the predetermined temperature range.

17. A method as claimed in claim 16, wherein the engine includes a variable inert gas amount mechanism that is capable of changing an amount of inert gases supplied to the cylinder,
the method further comprising a load parameter-detecting step of detecting a load parameter indicative of load on the engine,
wherein said first fuel amount-calculating step includes calculating the amount of the first fuel according to the load parameter,
the method further comprising:
a target gas amount-calculating step of calculating a target gas amount, which serves as a target of the amount of the inert gases, according to the amount of the first fuel;
a gas amount correction value-calculating step of calculating a gas amount correction value with a third control algorithm including a predetermined feedback control algorithm such that the output value output in said oxygen concentration-detecting step is caused to converge to the target output value;
a corrected target gas amount-calculating step of calculating a corrected target gas amount by correcting the target gas amount by the gas amount correction value; and
an inert gas amount control step of controlling the amount of the inert gases by controlling the variable inert gas amount mechanism according to the corrected target gas amount.

18. A method as claimed in claim 17, wherein in the third control algorithm, a predetermined filtering process is performed on the output value output in said oxygen concentration-detecting step, whereby an output filtered value is calculated in a state where high-frequency components of the output value are cut off and at the same time the output filtered value has no phase delay with respect to the output value, and the gas amount correction value is calculated such that the output filtered value converges to the target output value.

19. A method as claimed in claim 18, wherein in the first control algorithm, when the exhaust system temperature is within the predetermined temperature range, a convergence rate of the exhaust system temperature to the predetermined target temperature is configured to be lower than a convergence rate of the output filtered value to the target output value in the third control algorithm, whereas when the exhaust system temperature is not within the predetermined temperature range, the convergence rate of the exhaust system temperature to the predetermined target temperature is configured to be higher than the convergence rate of the output filtered value to the target output value in the third control algorithm.

20. A method as claimed in claim 18, wherein in the third control algorithm, a convergence rate of the output filtered value to the target output value is configured to be lower than a convergence rate of the output value output in said oxygen concentration-detecting step to the target output value in the second control algorithm.

21. A method as claimed in claim 16, wherein the engine includes a variable fresh air amount mechanism that is capable of changing the amount of the fresh air,
the method further comprising a load parameter-detecting step of detecting a load parameter indicative of load on the engine,
wherein said first fuel amount-calculating step includes calculating the amount of the first fuel according to the load parameter,
the method further comprising:
a fresh air amount correction value-calculating step of calculating a fresh air amount correction value with a fourth control algorithm including a predetermined feedback control algorithm such that the output value output in said oxygen concentration-detecting step is caused to converge to the target output value;
a corrected target fresh air amount-calculating step of calculating a corrected target fresh air amount by correcting the target fresh air amount by the fresh air amount correction value; and
a fresh air amount control step of controlling the amount of the fresh air by controlling the variable fresh air amount mechanism according to the corrected target fresh air amount.

22. A method as claimed in claim 21, wherein said fresh air amount correction value-calculating step includes performing a predetermined filtering process on the output value output in said oxygen concentration-detecting step, to thereby calculate an output filtered value in a state where high-frequency components of the output value are cut off and at the same time the output filtered value has no phase delay with respect to the output value, and calculating the fresh air amount correction value with the fourth control algorithm such that the output filtered value converges to the target output value.

23. A method as claimed in claim 22, wherein in the first control algorithm, when the exhaust system temperature is within the predetermined temperature range, a convergence rate of the exhaust system temperature to the predetermined target temperature is configured to be lower than a convergence rate of the output filtered value to the target output value in the fourth control algorithm, whereas when the exhaust system temperature is not within the predetermined temperature range, the convergence rate of the exhaust system temperature to the predetermined target temperature is configured to be higher than the convergence rate of the output filtered value to the target output value in the fourth control algorithm.

24. A method as claimed in claim 22, wherein in the fourth control algorithm, a convergence rate of the output filtered value to the target output value is configured to be lower than a convergence rate of the output value output in said oxygen concentration-detecting step to the target output value in the second control algorithm.

25. A method as claimed in claim 16, wherein in the first control algorithm, when the exhaust system temperature is within the predetermined temperature range, a convergence rate of the exhaust system temperature to the predetermined target temperature is configured to be lower than when the exhaust system temperature is not within the predetermined temperature range.

26. A method as claimed in claim 16, wherein the second exhaust gas purification device has a characteristic of being activated when the exhaust system temperature is within a predetermined activation temperature range,
wherein when the exhaust system temperature is within a temperature range lower than the predetermined activation temperature range, said target air-fuel ratio parameter-calculating step includes calculating the target air-fuel ratio parameter as a leaner value than when the exhaust system temperature is within the predetermined activation temperature range.

27. A method as claimed in claim 16, wherein the exhaust system temperature is a device temperature indicative of a temperature of the second exhaust gas purification device,
wherein the second exhaust gas purification device is disposed in the exhaust system at a location downstream of the first exhaust gas purification device, and has a characteristic of being activated when the device temperature is within a predetermined activation temperature range, and
wherein when one of a condition in which the device temperature is within a temperature range higher than the predetermined activation temperature range, and a condition in which the device temperature increases at a higher speed than a predetermined speed is satisfied, said target output value-setting step sets the target output value to an output value output in said oxygen concentration-detecting step, which is to be output when the concentration of oxygen in exhaust gases is higher, than when the one of the conditions is not satisfied.

28. A method as claimed in claim 15, wherein in the second control algorithm, the fuel amount correction value is calculated such that the fuel amount correction value includes a control input term for compensating for a steady-state deviation between the output value output in said oxygen concentration-detecting step and the target output value, and the control input term is calculated while performing a predetermined forgetting process thereon.

29. An engine control unit including a control program for causing a computer to execute a method of controlling an internal combustion engine that has an exhaust system provided with a first exhaust gas purification device for purifying exhaust gases, the engine having fresh air drawn into a cylinder, fuel for combustion in the cylinder being supplied to the cylinder as first fuel, and unburned fuel being supplied to the first exhaust gas purification device as second fuel, the method controlling an amount of the fresh air, an amount of the first fuel and an amount of the second fuel to thereby control an exhaust system temperature as a temperature, of the exhaust system, and an air-fuel ratio of exhaust gases on a downstream side of the first exhaust gas purification device,
wherein the method comprises:
an exhaust system temperature-detecting step of detecting the temperature of the exhaust system;
an oxygen concentration-detecting step of detecting a concentration of oxygen in exhaust gases provided at a location downstream of the first exhaust gas purification device, and outputting a signal indicative of the detected concentration of oxygen;
a target output value-setting step of setting a target output value that serves as a target of an output value output in said oxygen concentration-detecting step;
a first fuel amount-calculating step of calculating the amount of the first fuel;
a target air-fuel ratio parameter-calculating step of calculating a target air-fuel ratio parameter, which serves as a target of an air-fuel ratio parameter indicative of an air-fuel ratio of a combustion air-fuel mixture, such that the target air-fuel ratio parameter becomes leaner than an air-fuel ratio parameter of the combustion air-fuel mixture at which the output value output in said oxygen concentration-detecting step becomes the target output value;
an air-fuel ratio parameter correction value-calculating step of calculating an air-fuel ratio parameter correction value with a first control algorithm including a predetermined feedback control algorithm such that the exhaust system temperature is caused to converge to a predetermined target temperature;
a corrected target air-fuel ratio parameter-calculating step of calculating a corrected target air-fuel ratio parameter by correcting the target air-fuel ratio parameter by the air-fuel ratio parameter correction value;
a target fresh air amount-calculating step of calculating a target fresh air amount that serves as a target of the amount of the fresh air, according to the corrected target air-fuel ratio parameter and the amount of the first fuel;
a target fuel amount-calculating step of calculating a fuel amount required for generating the combustion air-fuel mixture which makes the output value output in said oxygen concentration-detecting step become the target output value, as a target fuel amount, according to the target fresh air amount;
a fuel amount correction value-calculating step of calculating a fuel amount correction value with a second control algorithm including a predetermined feedback control algorithm such that the output value output in said oxygen concentration-detecting step is caused to converge to the target output value; and
a second fuel amount-calculating step of calculating the amount of the second fuel using the target fuel amount, the amount of the first fuel and the fuel amount correction value.

30. An engine control unit as claimed in claim 29, wherein the first exhaust gas purification device is configured such that when the output value output in said oxygen concentration-detecting step is within a predetermined output range including the target output value, the first exhaust gas purification device has a higher exhaust gas-purifying capability than when the output value output in said oxygen concentration-detecting step is not within the predetermined output range,
wherein the exhaust system of the engine further includes a second exhaust gas purification device separate from the first exhaust gas purification device, for purifying exhaust gases,
wherein the predetermined target temperature is set to a value within a predetermined temperature range, and
wherein the second exhaust gas purification device is configured such that when the exhaust system temperature is within the predetermined temperature range, the second exhaust gas purification device has a higher exhaust gas-purifying capability than when the exhaust system temperature is not within the predetermined temperature range.

31. An engine control unit as claimed in claim 30, wherein the engine includes a variable inert gas amount mechanism that is capable of changing an amount of inert gases supplied to the cylinder,
the method further comprising a load parameter-detecting step of detecting a load parameter indicative of load on the engine,
wherein said first fuel amount-calculating step includes calculating the amount of the first fuel according to the load parameter,
the method further comprising:
a target gas amount-calculating step of calculating a target gas amount, which serves as a target of the amount of the inert gases, according to the amount of the first fuel;
a gas amount correction value-calculating step of calculating a gas amount correction value with a third control algorithm including a predetermined feedback control algorithm such that the output value output in said oxygen concentration-detecting step is caused to converge to the target output value;

a corrected target gas amount-calculating step of calculating a corrected target gas amount by correcting the target gas amount by the gas amount correction value; and an inert gas amount control step of controlling the amount of the inert gases by controlling the variable inert gas amount mechanism according to the corrected target gas amount.

32. An engine control unit as claimed in claim 31, wherein in the third control algorithm, a predetermined filtering process is performed on the output value output in said oxygen concentration-detecting step, whereby an output filtered value is calculated in a state where high-frequency components of the output value are cut off and at the same time the output filtered value has no phase delay with respect to the output value, and the gas amount correction value is calculated such that the output filtered value converges to the target output value.

33. An engine control unit as claimed in claim 32, wherein in the first control algorithm, when the exhaust system temperature is within the predetermined temperature range, a convergence rate of the exhaust system temperature to the predetermined target temperature is configured to be lower than a convergence rate of the output filtered value to the target output value in the third control algorithm, whereas when the exhaust system temperature is not within the predetermined temperature range, the convergence rate of the exhaust system temperature to the predetermined target temperature is configured to be higher than the convergence rate of the output filtered value to the target output value in the third control algorithm.

34. An engine control unit as claimed in claim 32, wherein in the third control algorithm, a convergence rate of the output filtered value to the target output value is configured to be lower than a convergence rate of the output value output in said oxygen concentration-detecting step to the target output value in the second control algorithm.

35. An engine control unit as claimed in claim 30, wherein the engine includes a variable fresh air amount mechanism that is capable of changing the amount of the fresh air, the method further comprising a load parameter-detecting step of detecting a load parameter indicative of load on the engine, wherein said first fuel amount-calculating step includes calculating the amount of the first fuel according to the load parameter, the method further comprising:

a fresh air amount correction value-calculating step of calculating a fresh air amount correction value with a fourth control algorithm including a predetermined feedback control algorithm such that the output value output in said oxygen concentration-detecting step is caused to converge to the target output value;

a corrected target fresh air amount-calculating step of calculating a corrected target fresh air amount by correcting the target fresh air amount by the fresh air amount correction value; and a fresh air amount control step of controlling the amount of the fresh air by controlling the variable fresh air amount mechanism according to the corrected target fresh air amount.

36. An engine control unit as claimed in claim 35, wherein said fresh air amount correction value-calculating step includes performing a predetermined filtering process on the output value output in said oxygen concentration-detecting step, to thereby calculate an output filtered value in a state where high-frequency components of the output value are cut off and at the same time the output filtered value has no phase delay with respect to the output value, and calculating the fresh air amount correction value with the fourth control algorithm such that the output filtered value converges to the target output value.

37. An engine control unit as claimed in claim 36, wherein in the first control algorithm, when the exhaust system temperature is within the predetermined temperature range, a convergence rate of the exhaust system temperature to the predetermined target temperature is configured to be lower than a convergence rate of the output filtered value to the target output value in the fourth control algorithm, whereas when the exhaust system temperature is not within the predetermined temperature range, the convergence rate of the exhaust system temperature to the predetermined target temperature is configured to be higher than the convergence rate of the output filtered value to the target output value in the fourth control algorithm.

38. An engine control unit as claimed in claim 36, wherein in the fourth control algorithm, a convergence rate of the output filtered value to the target output value is configured to be lower than a convergence rate of the output value output in said oxygen concentration-detecting step to the target output value in the second control algorithm.

39. An engine control unit as claimed in claim 30, wherein in the first control algorithm, when the exhaust system temperature is within the predetermined temperature range, a convergence rate of the exhaust system temperature to the predetermined target temperature is configured to be lower than when the exhaust system temperature is not within the predetermined temperature range.

40. An engine control unit as claimed in claim 30, wherein the second exhaust gas purification device has a characteristic of being activated when the exhaust system temperature is within a predetermined activation temperature range, wherein when the exhaust system temperature is within a temperature range lower than the predetermined activation temperature range, said target air-fuel ratio parameter-calculating step includes calculating the target air-fuel ratio parameter as a leaner value than when the exhaust system temperature is within the predetermined activation temperature range.

41. An engine control unit as claimed in claim 30, wherein the exhaust system temperature is a device temperature indicative of a temperature of the second exhaust gas purification device, wherein the second exhaust gas purification device is disposed in the exhaust system at a location downstream of the first exhaust gas purification device, and has a characteristic of being activated when the device temperature is within a predetermined activation temperature range, and wherein when one of a condition in which the device temperature is within a temperature range higher than the predetermined activation temperature range, and a condition in which the device temperature increases at a higher speed than a predetermined speed is satisfied, said target output value-setting step sets the target output value to an output value output in said oxygen concentration-detecting step, which is to be output when the concentration of oxygen in exhaust gases is higher, than when the one of the conditions is not satisfied.

42. An engine control unit as claimed in claim 29, wherein in the second control algorithm, the fuel amount correction value is calculated such that the fuel amount correction value includes a control input term for compensating for a steady-state deviation between the output value output in said oxygen concentration-detecting step and the target output value, and the control input term is calculated while performing a predetermined forgetting process thereon.

* * * * *